(12) United States Patent
Astilean et al.

(10) Patent No.: US 12,059,590 B2
(45) Date of Patent: Aug. 13, 2024

(54) STABLE TREADMILL SLAT

(71) Applicant: Speedfit LLC, East Hampton, NY (US)

(72) Inventors: Alex Astilean, East Hampton, NY (US); Dan Bostan, Beaconsfield (CA)

(73) Assignee: Speedfit LLC, East Hampton, NY (US)

( * ) Notice: Subject to any disclaimer, the term of this patent is extended or adjusted under 35 U.S.C. 154(b) by 184 days.

(21) Appl. No.: 17/504,149

(22) Filed: Oct. 18, 2021

(65) Prior Publication Data
US 2022/0096894 A1    Mar. 31, 2022

Related U.S. Application Data

(63) Continuation-in-part of application No. 16/242,830, filed on Jan. 8, 2019, now Pat. No. 11,148,005, which
(Continued)

(51) Int. Cl.
*A63B 22/02* (2006.01)
*A63B 22/00* (2006.01)
(Continued)

(52) U.S. Cl.
CPC ...... *A63B 22/0285* (2013.01); *A63B 22/0017* (2015.10); *A63B 22/02* (2013.01); *A63B 24/0087* (2013.01); *B62K 5/00* (2013.01); *B62K 7/00* (2013.01); *B62M 1/34* (2013.01); *B62M 6/40* (2013.01); *F03G 5/00* (2013.01);
(Continued)

(58) Field of Classification Search
CPC .............................................. A63B 22/02–04
See application file for complete search history.

(56) References Cited

U.S. PATENT DOCUMENTS 4,334,676 A * 6/1982 Schonenberger ...... A63B 22/02
482/54
6,042,514 A * 3/2000 Abelbeck ............... A63B 22/02
482/54
(Continued)

OTHER PUBLICATIONS

"Why is an I section commonly used in beam design?"; Quora.com; download Oct. 16, 2021; http://www.quora.com/Why-is-an-I-section-commonly-used-in-beam-design.

*Primary Examiner* — Nyca T Nguyen
(74) *Attorney, Agent, or Firm* — Alfred M. Walker; John F. Vodopia

(57) ABSTRACT

A motor-less leg-powered curved treadmill produced that allows people to walk, jog, run, and sprint without making any adjustments to the treadmill other than shifting the user's center of gravity forward and backwards. A closed loop treadmill belt running between front and rear pulley rollers is formed with a low friction running surface of transverse aluminum, wooden, plastic, rubber or carbon fiber slats attached to each other in a resilient fashion. An essential feature of treadmill is the concave shape of the upper portion of the belt running surface, the treadmill configurations ensure that this shape is maintained during actual use. These configurations prevent the concave upper running surface portion from being pulled taut into a flat shape between the front and rear pulley rollers. The slats of the treadmill each have an end view crossectional I-beam shape, for strength and stability of the slat positioned upon the treadmill belt.

13 Claims, 59 Drawing Sheets

Related U.S. Application Data is a continuation of application No. 15/166,088, filed on May 26, 2016, now Pat. No. 10,183,191, which is a continuation-in-part of application No. 14/683,051, filed on Apr. 9, 2015, now Pat. No. 9,352,188, which is a continuation of application No. 13/831,212, filed on Mar. 14, 2013, now Pat. No. 9,005,085, which is a continuation-in-part of application No. 13/711,074, filed on Dec. 11, 2012, now Pat. No. 8,690,738, which is a continuation of application No. 12/925,892, filed on Nov. 1, 2010, now Pat. No. 8,343,016, which is a continuation-in-part of application No. 12/925,770, filed on Oct. 29, 2010, now Pat. No. 8,308,619.

(60) Provisional application No. 61/280,265, filed on Nov. 2, 2009.

(51) Int. Cl.

| | | |
|---|---|---|
| *A63B 24/00* | (2006.01) | |
| *B62K 5/00* | (2013.01) | |
| *B62K 7/00* | (2006.01) | |
| *B62M 1/34* | (2013.01) | |
| *B62M 6/40* | (2010.01) | |
| *F03G 5/00* | (2006.01) | |
| *F03G 5/02* | (2006.01) | |
| *A63B 21/00* | (2006.01) | |
| *A63B 21/005* | (2006.01) | |
| *A63B 71/00* | (2006.01) | |
| *B62J 17/086* | (2020.01) | |

(52) U.S. Cl.
CPC .......... *F03G 5/025* (2013.01); *A63B 21/0051* (2013.01); *A63B 21/0053* (2013.01); *A63B 21/0054* (2015.10); *A63B 21/157* (2013.01); *A63B 22/0023* (2013.01); *A63B 22/0207* (2015.10); *A63B 22/0235* (2013.01); *A63B 2022/0278* (2013.01); *A63B 2024/0093* (2013.01); *A63B 2071/0081* (2013.01); *A63B 2209/02* (2013.01); *A63B 2209/08* (2013.01); *B62J 17/086* (2020.02)

(56) References Cited

U.S. PATENT DOCUMENTS

| | | | |
|---|---|---|---|
| 10,010,748 B1 * | 7/2018 | Weinstein | A63B 22/0285 |
| 2012/0184413 A1 * | 7/2012 | Lo | A63B 22/0235 |
| | | | 482/54 |
| 2021/0121737 A1 * | 4/2021 | Vujicic | A63B 22/02 |

* cited by examiner

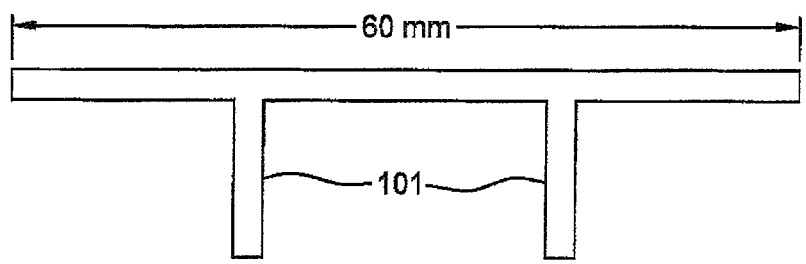
FIG. 7AA
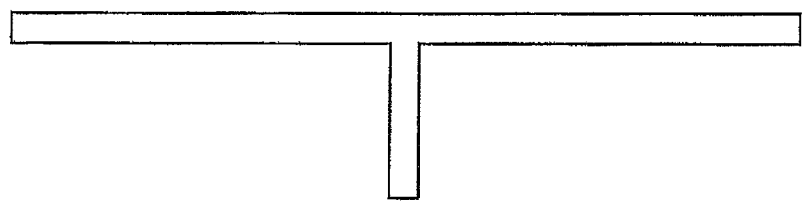
FIG. 7AA1
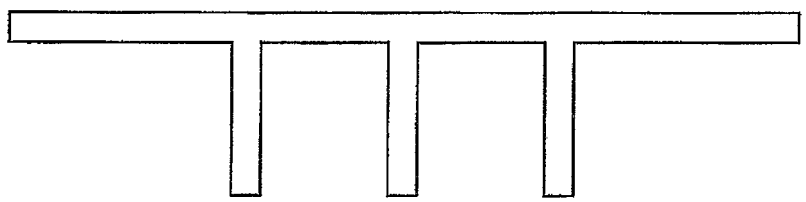
FIG. 7AA2

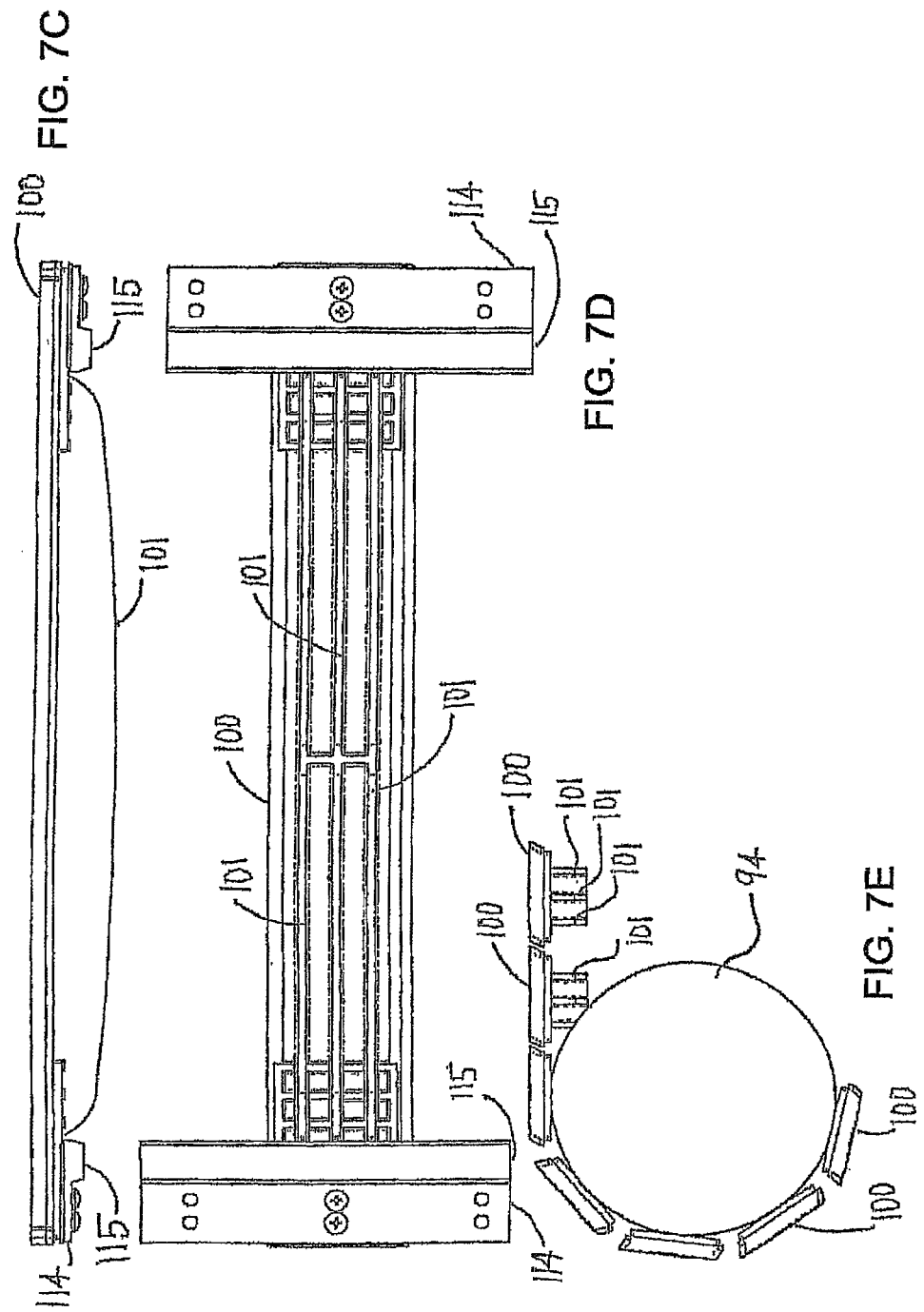

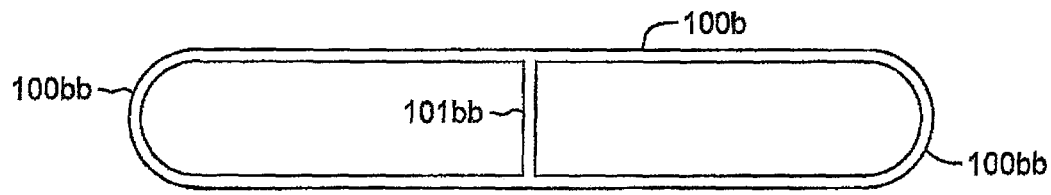
FIG. 7M
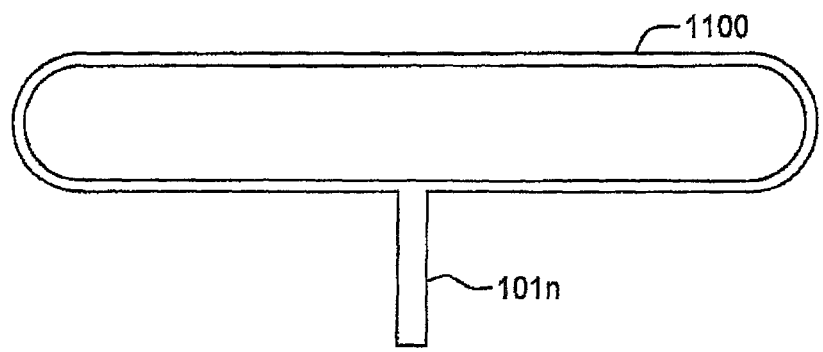
FIG. 7N
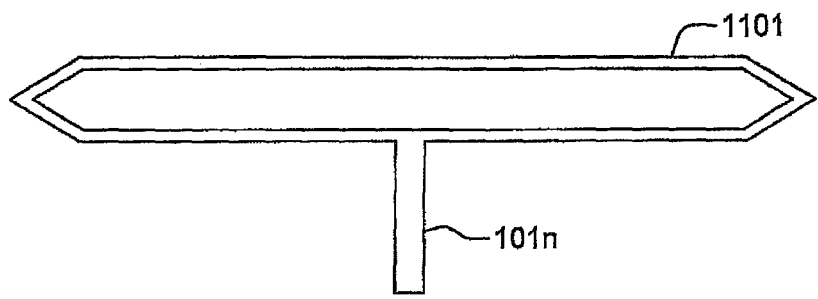
FIG. 7NN
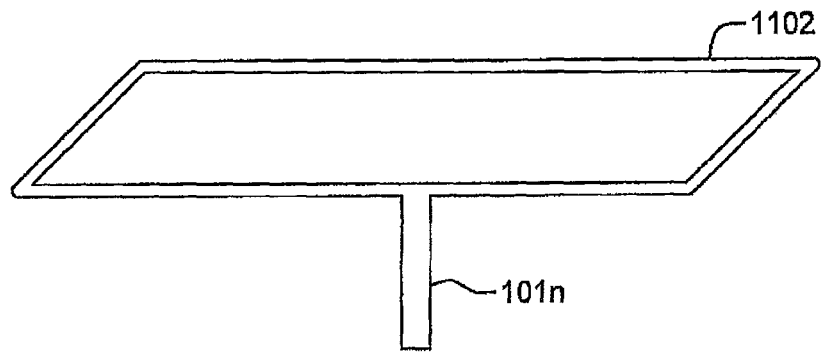
FIG. 7NNN

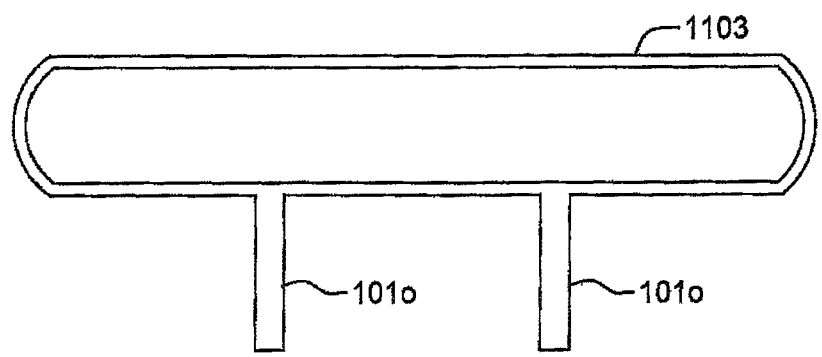
FIG. 7O
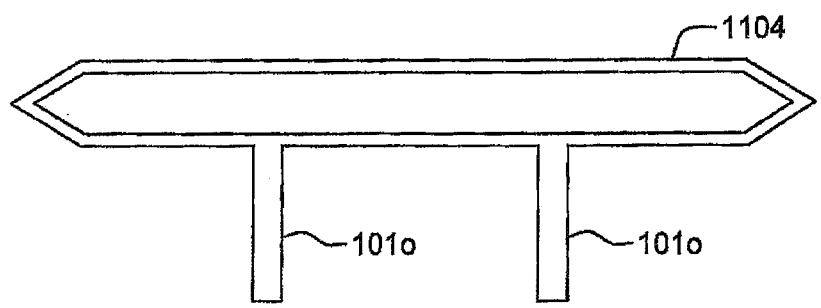
FIG. 7OO
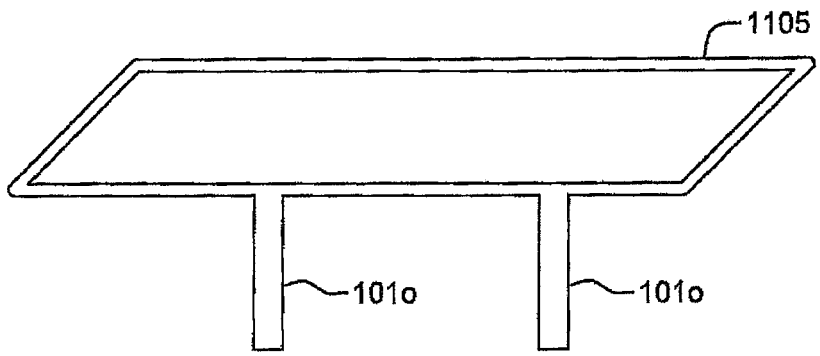
FIG. 7OOO

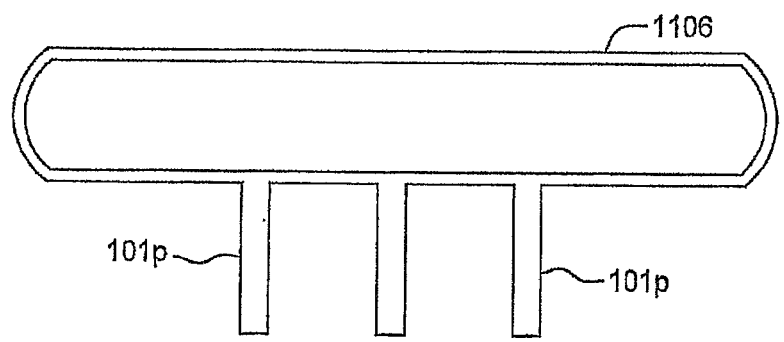
FIG. 7P
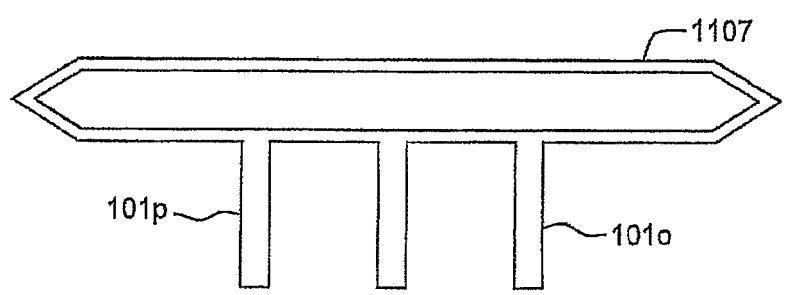
FIG. 7PP
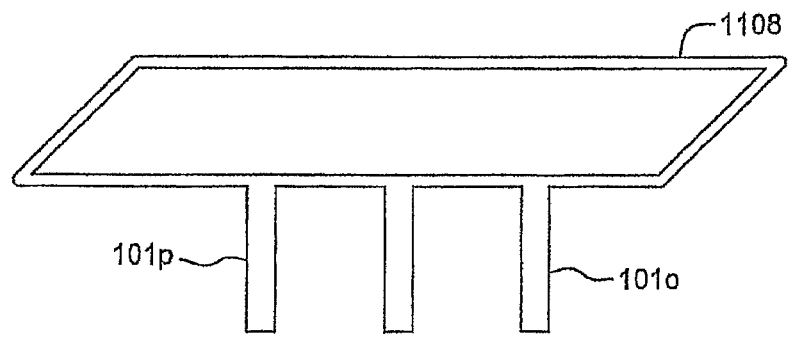
FIG. 7PPP

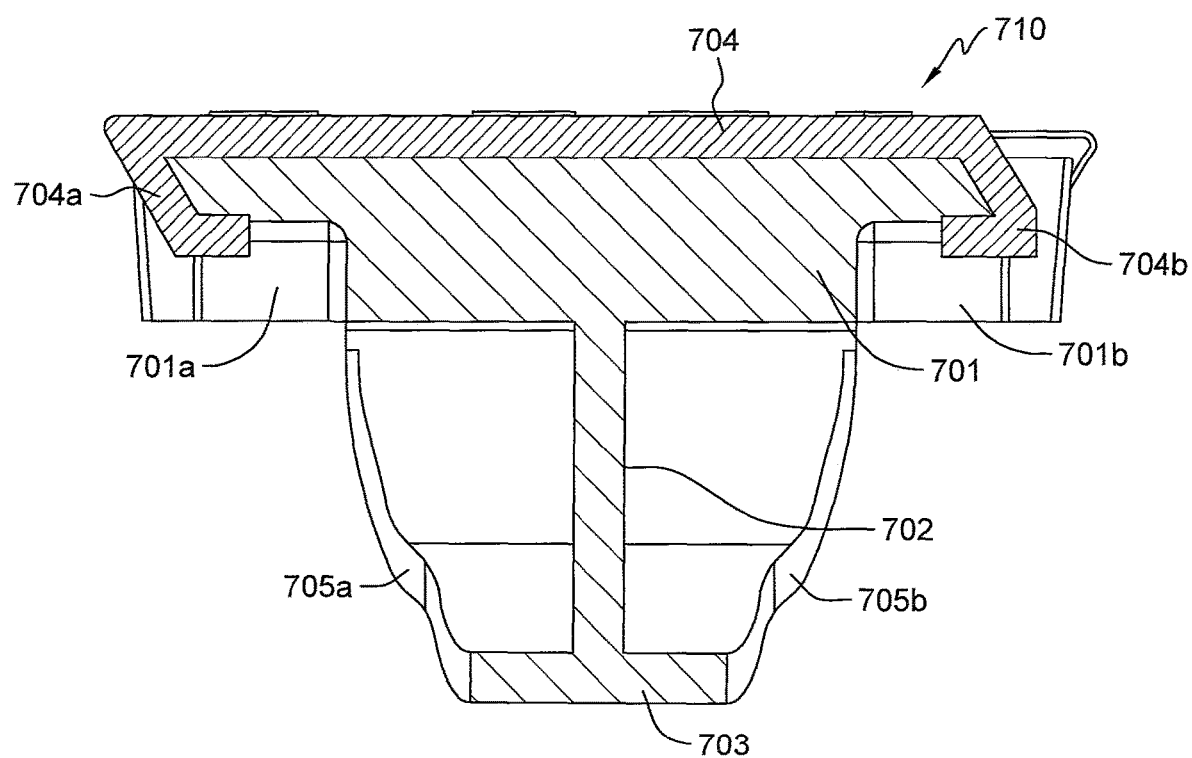
FIG. 7Q1

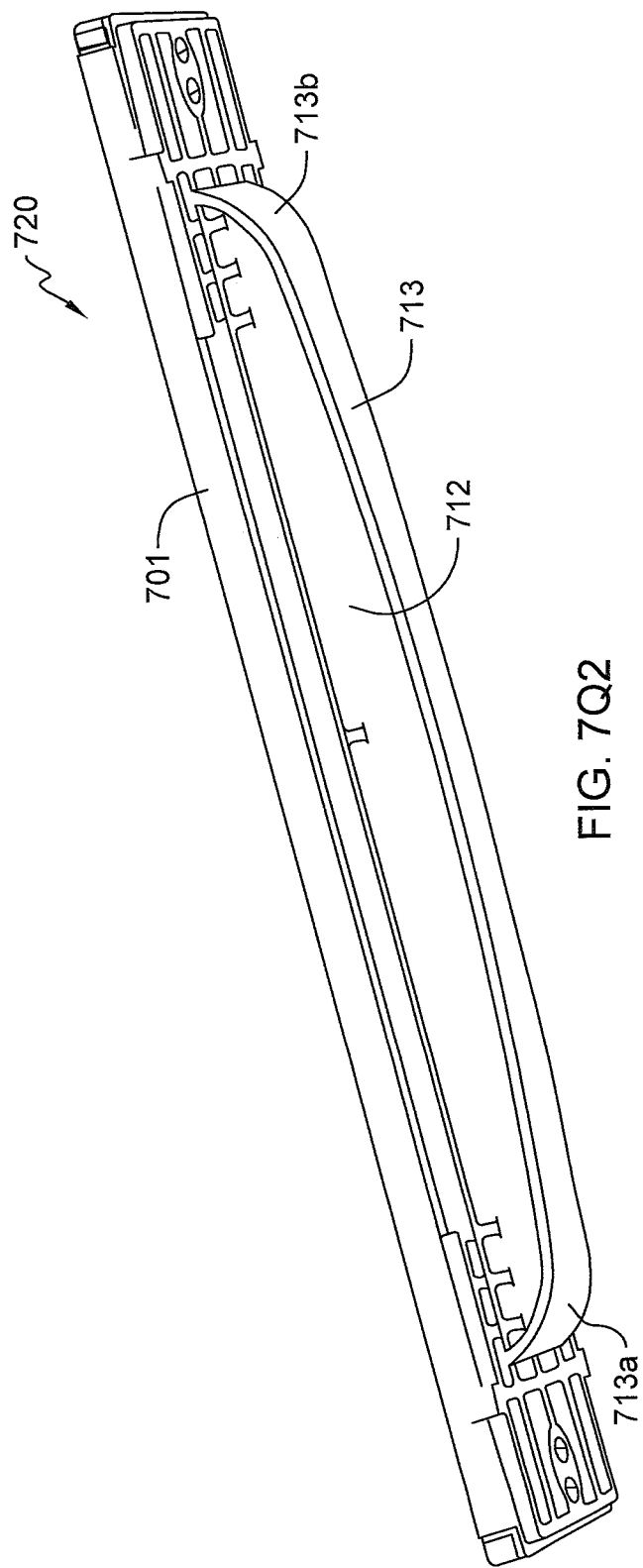
FIG. 7Q2

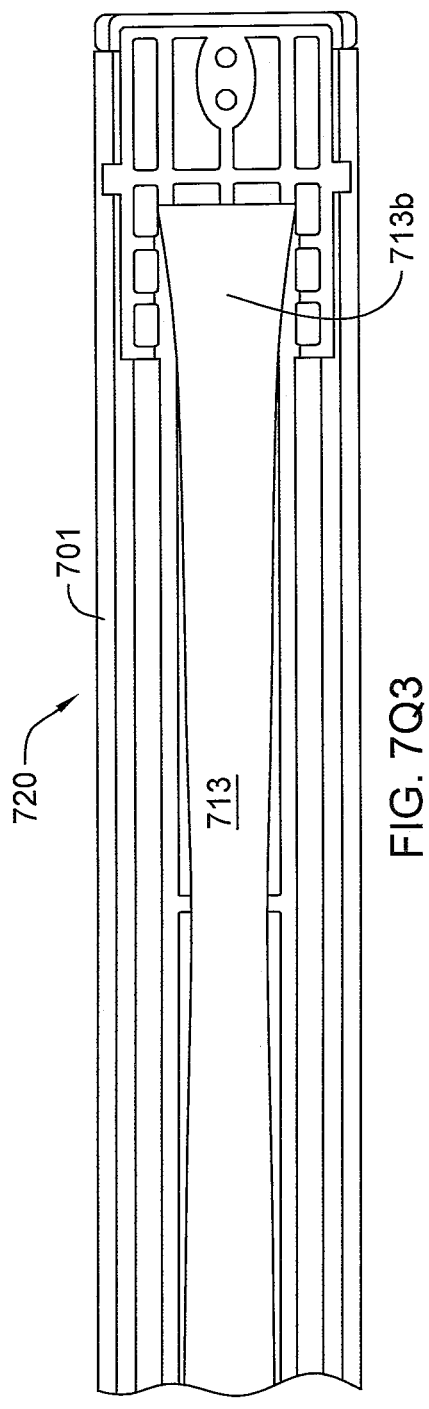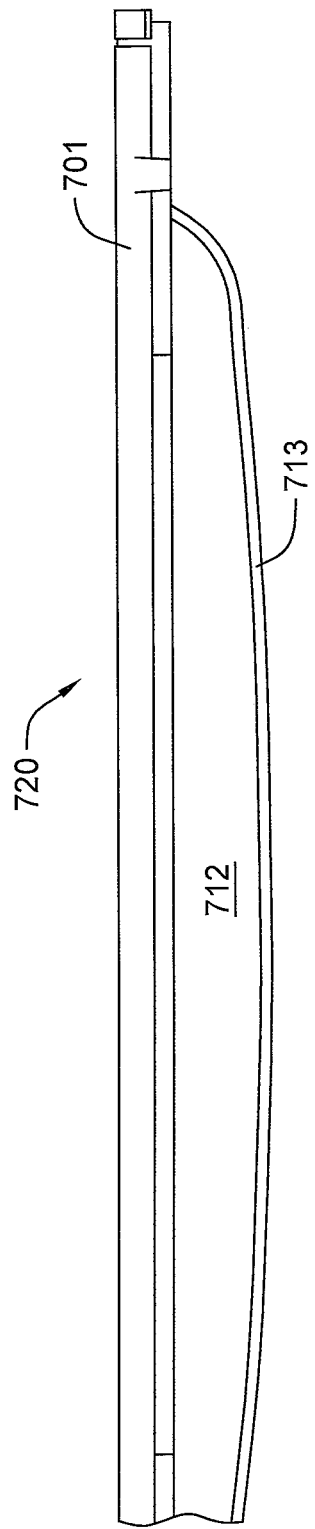
FIG. 7Q3
FIG. 7Q4

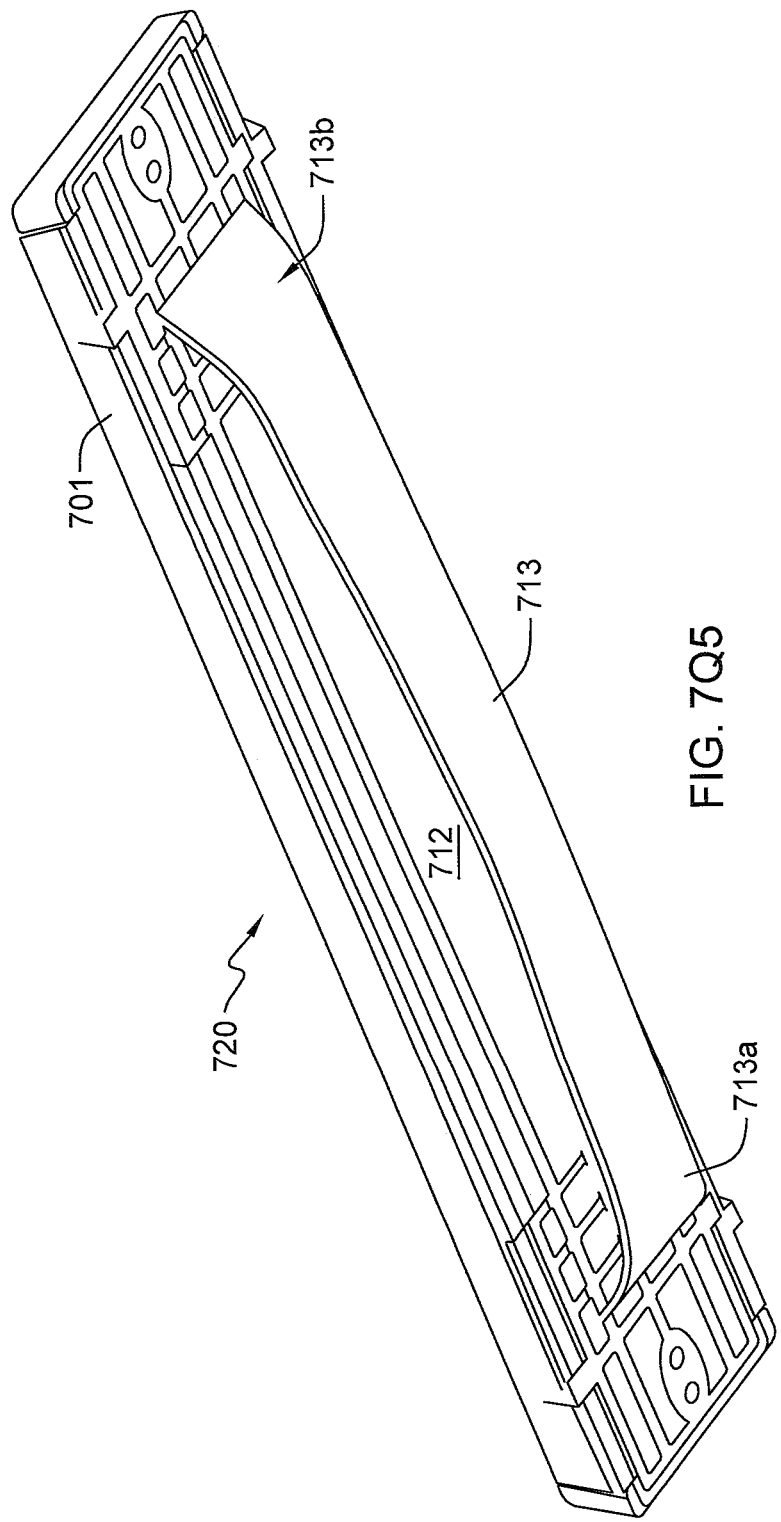
FIG. 7Q5

CATENARY CURVE (156)

S = LENGTH OF BELT SECTION BETWEEN POINTS 162 AND 163
L = LENGTH OF SPAN
h = SAG (UPPER BELT SECTION)
w = LINEAR DENSITY OF BELT (eg. POUNDS / FOOT)
H = HORIZONTAL COMPONENT OF BELT TENSION, a CONSTANT

F1: $a = H/w$

F2: $y = a \cosh(x/a)$

F3: $H = (w/8h)(S^2 - 4h^2)$

F4: $T = \sqrt{H^2 + (wS/2)^2}$

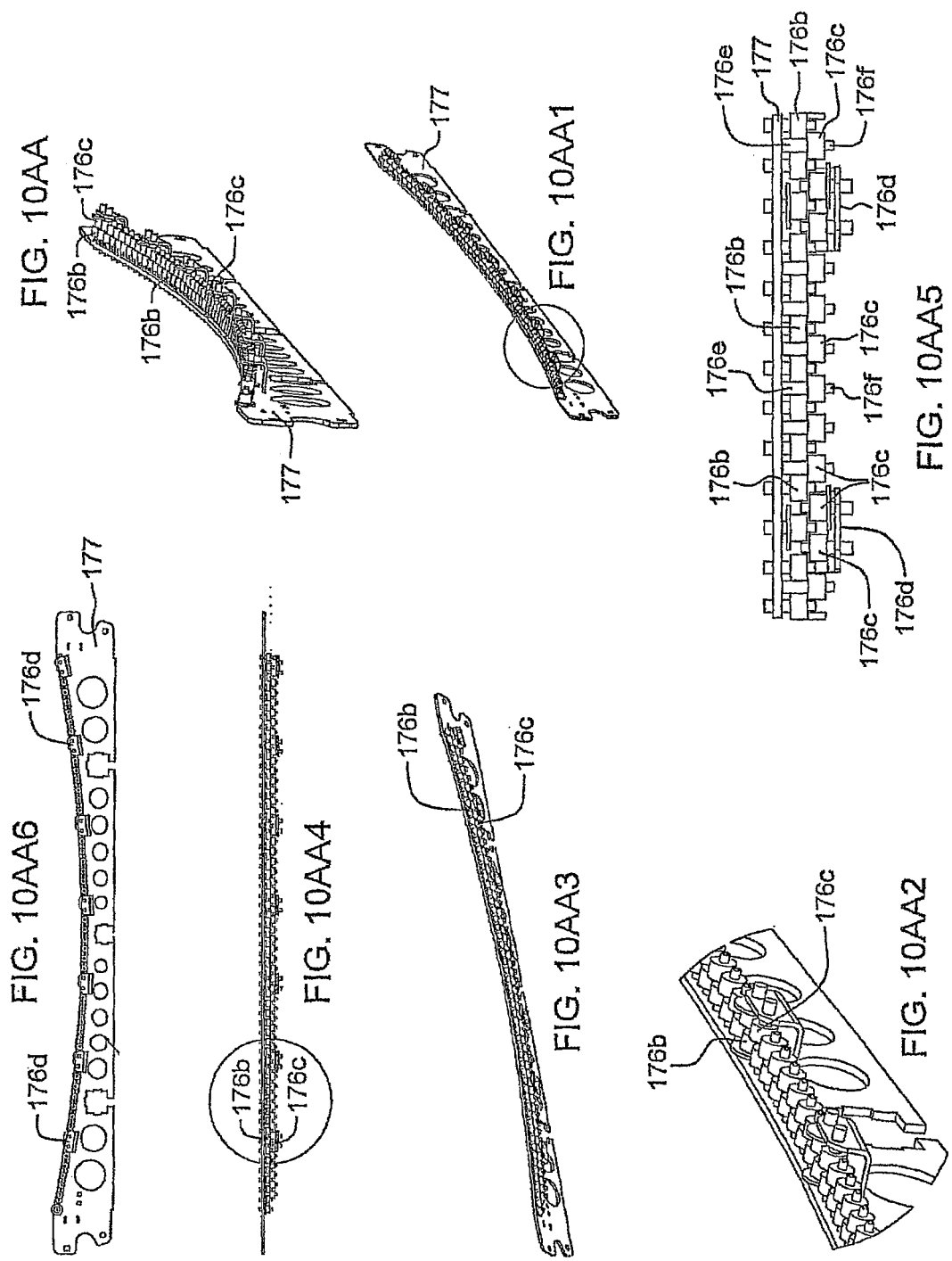

28 ROLLERS
280 WASHERS
742 CU IN OF URETHANE

42 ROLLERS
630 WASHERS
248 CU IN OF URETHANE

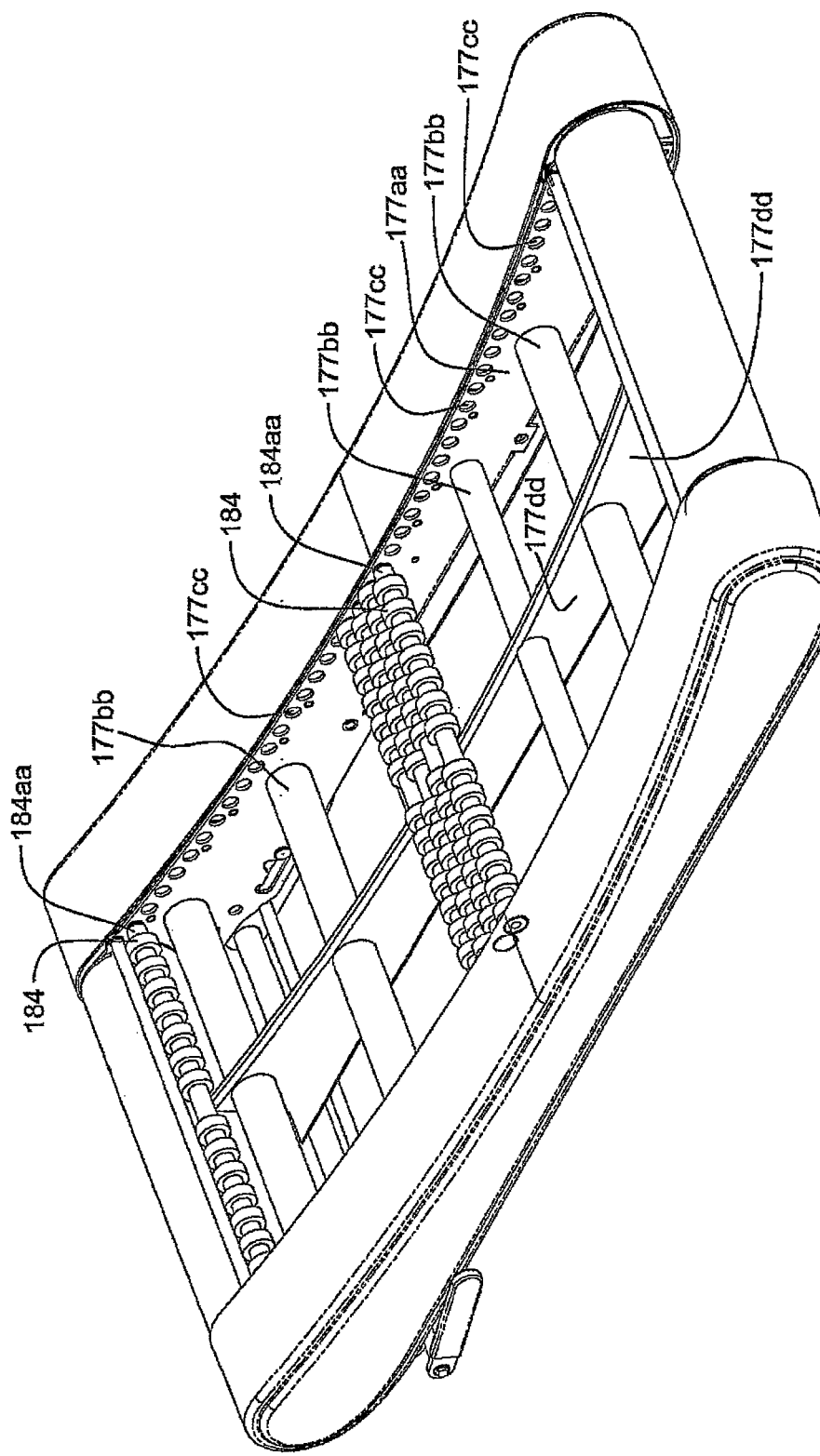

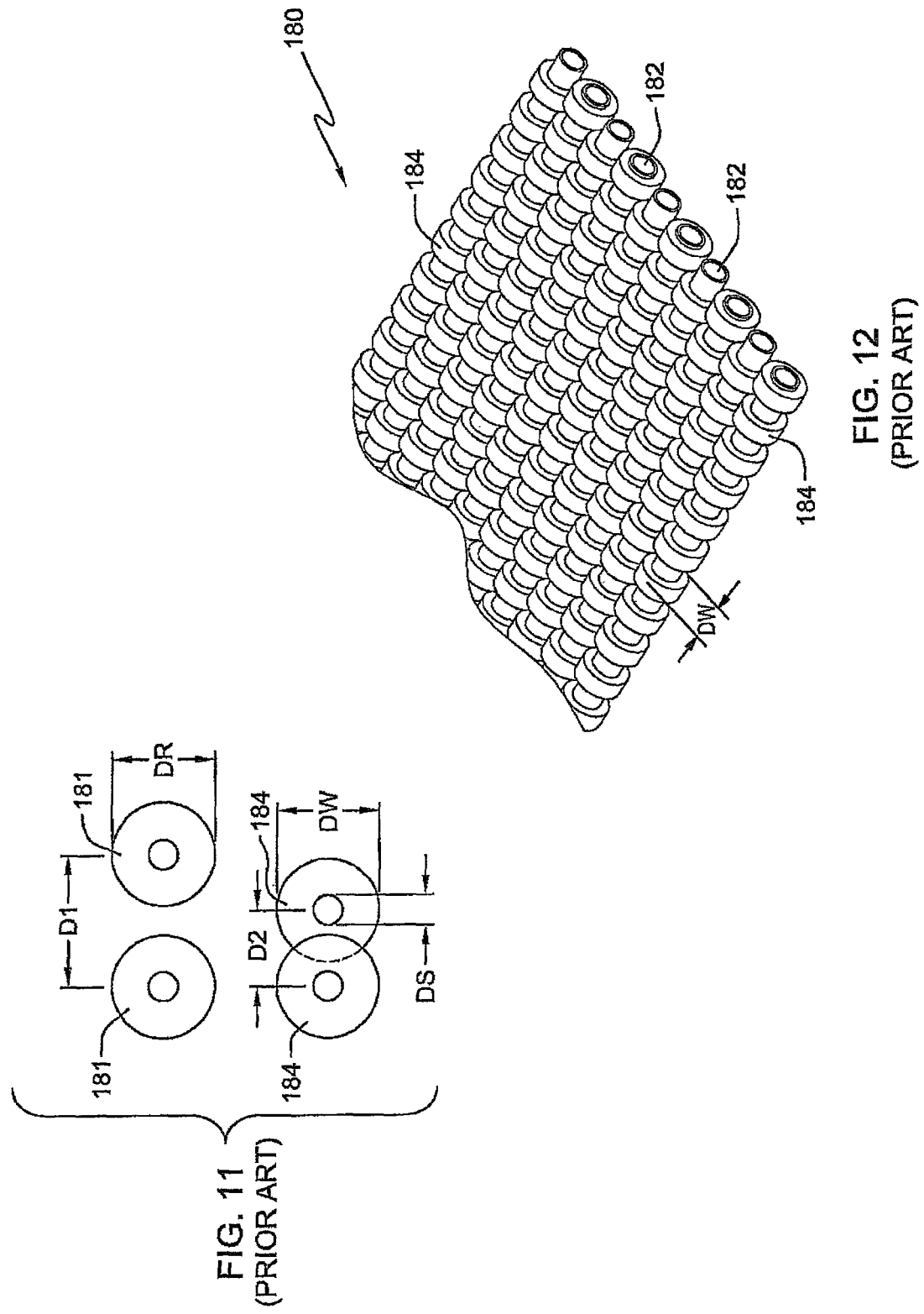

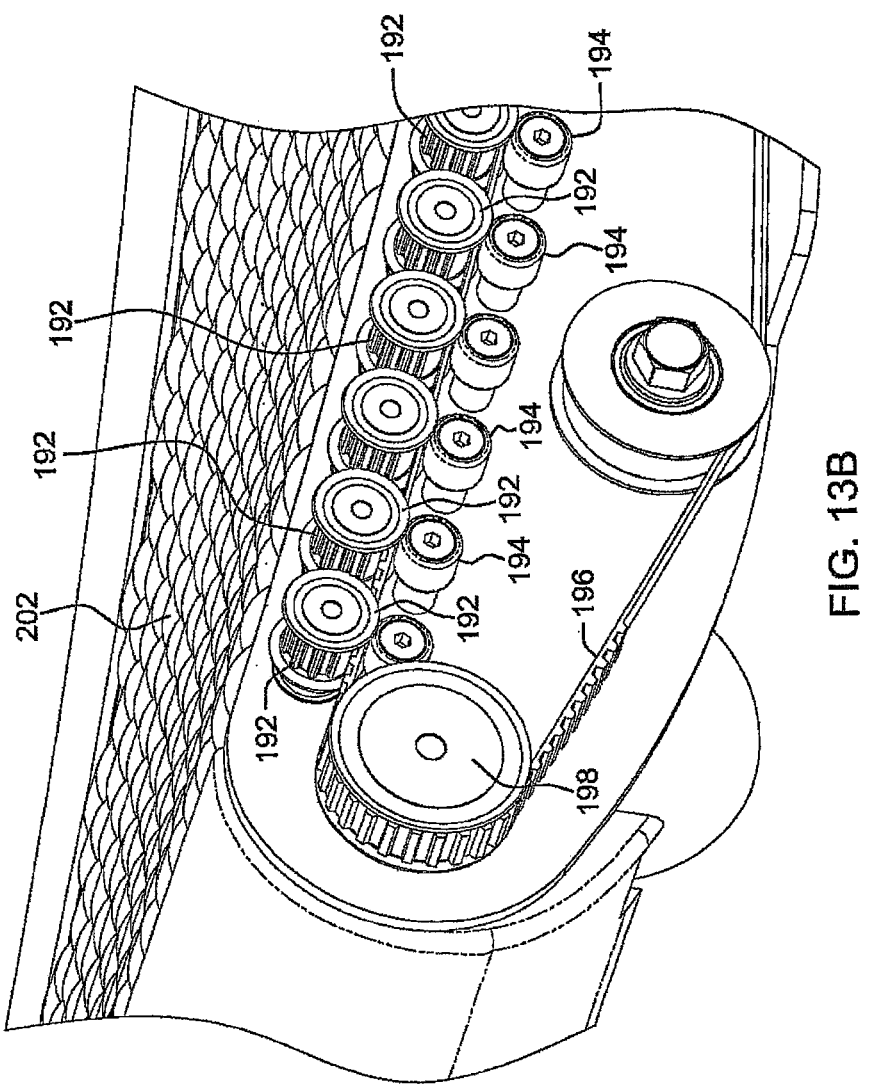

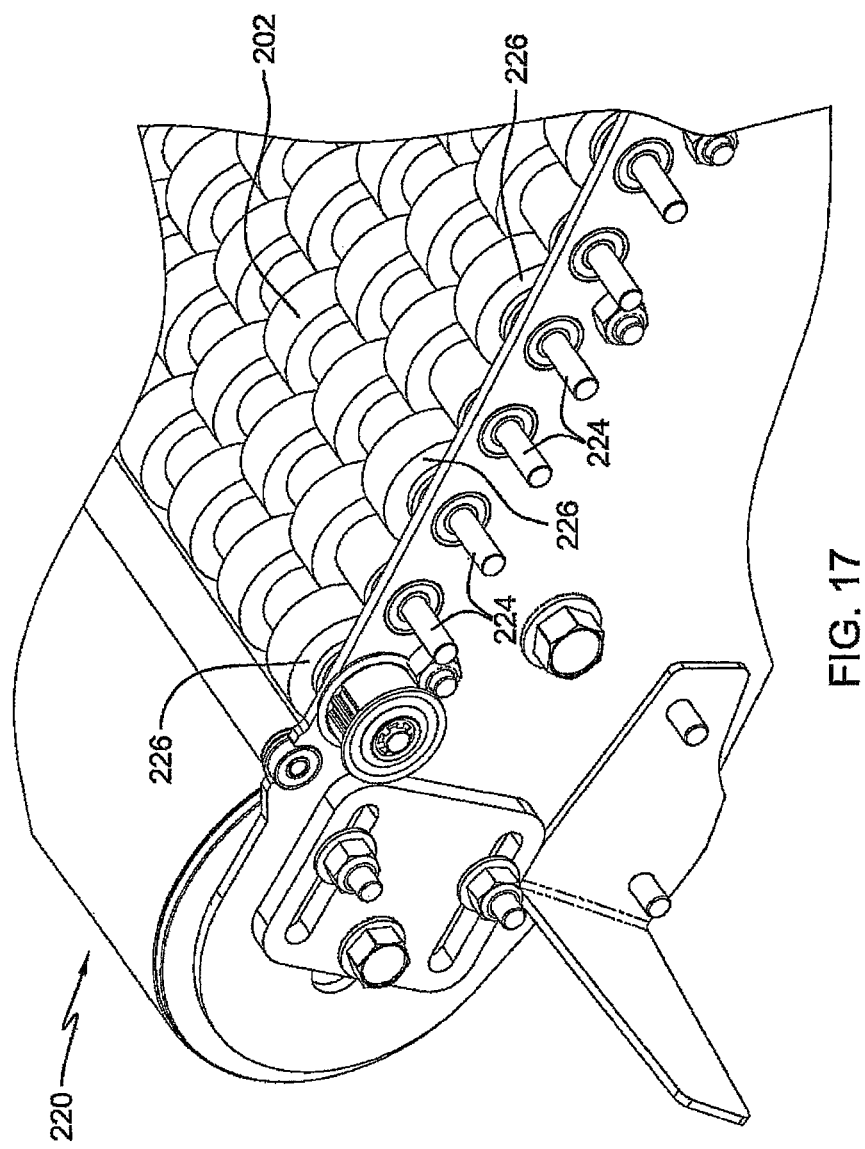

STABLE TREADMILL SLAT

RELATED APPLICATIONS

This application is a continuation-in-part of application Ser. No. 16/242,830, filed Jan. 8, 2019, which '830 application is a continuation of application Ser. No. 15/166,088, filed on May 26, 2016, now U.S. Pat. No. 10,183,191, dated Jan. 22, 2019, which '088 is a continuation-in-part of application Ser. No. 14/683,051, filed Apr. 9, 2015, now U.S. Pat. No. 9,352,188, which '051 application is a continuation of application Ser. No. 13/831,212, filed Mar. 14, 2013, now U.S. Pat. No. 9,005,085, dated Apr. 14, 2015, which '830, '088, '051 and '212 application are incorporated by reference herein. The '212 application is a continuation-in-part of a regular examinable utility application Ser. No. 13/711,074, filed Dec. 11, 2012, now U.S. Pat. No. 8,690,738 B1 dated Apr. 8, 2014, which '074 application is a continuation of regular examinable utility patent application Ser. No. 12/925,892, filed on Nov. 1, 2010, now U.S. Pat. No. 8,343,016 B1, dated Jan. 1, 2013, which '892 application is a continuation-in-part of a regular examinable utility patent application Ser. No. 12/925,770, filed on Oct. 29, 2010, now U.S. Pat. No. 8,308,619, dated Nov. 13, 2012, the entire disclosures both of which are incorporated by reference herein. Applicant claims priority in part under 35 U.S.C. § 120 therefrom. This application and the '088, 051, '212, '074, '892 and '770 applications claim benefit and priority in part under 35 U.S.C. 119(e) from provisional Application No. 61/280,265 filed Nov. 2, 2009, the entire disclosure of which is incorporated by reference herein.

FIELD OF THE INVENTION

The present invention relates to a motor-less leg-powered treadmill produced that allows people to walk, jog, run, and sprint without making any adjustments to the treadmill other than shifting the user's center of gravity forward and backwards, wherein the treadmill belt has stable parallel treadmill slats with an I-beam configuration in end view crossection, to provide stabilization and strength to the treadmill slat as it traverses on the treadmill belt.

BACKGROUND OF THE INVENTION

Exercise treadmills allow people to walk, jog, run, and sprint on a stationary machine with an endless belt moving over a front and rear sets of pulleys.

Arrays of rollers have been used to support objects so they can be moved linearly with low friction. The minimum distance between the roller axes necessarily must be greater than the diameter of the roller. This leaves an undesirable distance from the top of one roller to the next in supporting an object. To overcome this, the array of rollers for such support applications has been replaced by a nested array of casters or wheels where the wheels on adjacent axes are offset laterally so that support distances from the top of one wheel to the next is smaller than that of adjacent rollers of similar diameter. The patent of Janitsch (U.S. Pat. No. 4,195,724) shows a similar technique in staggered rollers in a conveying elevator for granular material. The patent of Kornylak (U.S. Pat. No. 3,964,588) for a manual box conveyor illustrates the use of wheel arrays partially nested in several embodiments.

In the design of treadmills using rollers to support a lightweight belt along the length of a concave top surface, the problem of the upper belt surface lifting up away from the support rollers and presenting a flattened appearance has been addressed by the US patent application 2012/0157267 of Lo by the use of an array of guiding elements on either side of the belt in contact with the upper face of the upper concave surface. These elements are small wheels which physically extend above the belt surface to hold it down against the underlying rollers. In construction, I-beams require less materials such as steel, than square hollow or solid beams. The upper and lower flanges of the beam are connected by the vertical web portion. I-beams are more stable, because the horizontal upper and lower flanges resist undesirable bending movements while the vertical connecting web resists shear forces exerted from above against the I-beam.

OBJECTS OF THE INVENTION

It is an object of the present invention to provide a motor-less leg-powered curved treadmill produced that allows people to walk, jog, run, and sprint without making any adjustments to the treadmill other than shifting the user's center of gravity forward and backwards.

It is also an object of the present invention to provide a treadmill slat for continuous leg-powered or motorized treadmill belts, where the treadmill slat has an end view crossectional I-beam shape, to provide stability and strength of the slat positioned upon the treadmill belt, with less weight required than a treadmill slat with multiple vertical fins and a single upper flange.

It is also an object of the present invention to provide a closed loop curved treadmill belt in a concave shape supported by end rollers in a low friction manner in a substantial stationary frame.

It is also an object of the present invention to provide a curved treadmill that assumes a concave upper contour and a taut lower portion.

It is also an object of the present invention to provide a curved treadmill that assumes a concave upper contour with a drooping lower belt portion.

It is also an object of this invention to provide curved as well as flat treadmills using a nested array of support wheels.

It is also an object of this invention to provide leg powered vehicles using the structure and elements of a treadmill.

Other objects which become apparent from the following description of the present invention.

SUMMARY OF THE INVENTION

The present invention is a motor-less leg-powered curved treadmill produced wherein the curved, low friction surface allows people to walk, jog, run, and sprint without making any adjustments to the treadmill other than shifting the user's center of gravity forward and backwards. This novel speed control due to the curve allows people of any weight and size to adjust their own speed in fractions of a second. The user controls the speed by positioning their body along the curved running surface. Stepping forward initiates movement, as the user propels themselves up the curve the speed increases. To slow down, the user simply drifts back towards the rear curve. For running athletes, no handrails are needed. Handrails are optional for non-athletes with balance or stability limitations. The motor-less leg-powered treadmill permits low foot impact on the running surface through its new design, forcing the user to run correctly on the ball of the feet and therefore reducing pressure and strain of the leg joints. This unique design of the curve in a low friction surface allows any user, regardless of weight and size, to find and maintain the speed they desire. The user steps on the concave curved treadmill belt section and begins walking, steps up further and begins running, steps up even farther and starts to sprint. When stepping backward the motor-less leg-powered treadmill will stop.

Utilizing a closed loop treadmill belt supported by end rollers in a low friction manner in a substantial stationery frame, the curved treadmill of this invention makes it possible for the user to experience a free running session, with the potential to have the real feeling of running, and the ability to stop and sprint and walk instantly, thereby simulating running outside on a running track. This novel speed control in running was not possible in the prior art because of the lack of curved low friction running surfaces.

The closed loop treadmill belt must be of such a length as compared to the distance between the end rollers to permit it to assume the required concave upper contour. To keep it in that configuration in all operational modes, a method of slackening the curved upper portion while simultaneously keeping the lower portion taut (i.e.—preventing it from drooping down) is used. This method must not add significant friction to the treadmill belt since this would detract from the running experience of the user.

Several methods of controlling the treadmill belt configuration in a low friction manner are described. One method is to use a support belt under the treadmill belt lower portion. This support belt is kept in a taut configuration with a horizontal section by using springs pulling pulleys in opposite directions.

Another method uses a timing belt linking the treadmill belt end rollers such that after the desired configuration is achieved, the treadmill belt and end rollers must move synchronously thereby denying the treadmill belt the opportunity to have its lower section droop down.

Yet another method is to support the lower section of the treadmill belt from drooping down by directly supporting this section with one or more linear arrays of low friction bearings at the peripheral edges of the belt below the lower section.

In another embodiment of this invention, the treadmill belt is constructed of two loops of v-belt with a custom crossection attached with fasteners near each end of each transverse slat. Thus the adjacent slats cover the entire user surface on the outside of the v-belt loops. The slats themselves can be fabricated from wood, wood products, plastic, or even rubber. The v-belt custom crossection provides flat extensions on either side of the v-section for support of the treadmill belt away from the large v-belt pulleys at the front and back of the treadmill. By supporting on a resilient continuous belt surface instead of the slats themselves, smoothness of operation is insured.

The v-belt construction provides excellent lateral centering of the treadmill belt in the chassis. Ball bearing support rollers in a linear array at each side bearing on the outer flat v-belt extensions support the bottom portion of the belt to keep it from drooping. A concave array of ball bearings at each side of the chassis supports the treadmill belt by bearing on the inner v-belt extensions to support the top user-contact section. The weight of the treadmill belt itself helps it conform to this support contour.

In yet another embodiment of this invention, a continuous belt of slats running on two distal pulleys has a top concave surface and a drooping lower section depending on judicious selection of belt parameters compatible with ergonomically determined frame dimensions to maintain a stable belt configuration while affording a low friction belt path and acceptable belt inertia. This embodiment reduces cost and complexity as compared to other embodiments which rely on the use of elements to specifically keep the bottom section from drooping to create the desired concave upper surface. As the design parameters must be carefully matched for a workable design, an analytic method is presented as an adjunct to empirical experimentation.

In other embodiments of this invention, both curved top as well as flat top treadmills which use a top surface of an array of nested wheels to support the user are presented. The runner or walker can contact the surface of wheels directly, or in other embodiments a lightweight fabric belt loop is supported by the wheel array and becomes an interface between the user's feet and the wheel array. The wheels are of rigid material with a resilient bonded tire, such as a steel wheel with a polyurethane or rubber tire. A method using embedded magnetic elements in the side peripheral support wheels of the array (or between these wheels) interacting with ferromagnetic wire cable embedded in the edges of the belt is used to conform the belt to a curved upper surface without recourse to any elements extending over the upper surface of the belt where such elements can be a visual distraction and, at worse, a tripping hazard when mounting or dismounting. While the curved top treadmills of these embodiments are equipped with static front lift adjusters to accommodate a variety of user weights and speed requirements, the flat top treadmills incorporate a dynamically adjustable front lift mechanism which continuously adjusts the height based on the speed target as entered by the runner (or walker) to maintain the desired speed during use.

In yet other embodiments of this invention, leg powered vehicles using the structure and elements of the treadmills of the nested wheel array variety. The vehicles vary from a single user roadster to a two or four driver "sedan" with optional passenger seats, to a twelve runner powered bus with separate driver. All vehicles described have optional battery powered hill-assist motor drives.

In a preferred embodiment with transverse parallel slats each having an I-beam crossectional shape, the exercise treadmill includes a treadmill frame, where the treadmill frame supports a continuous treadmill running surface belt moving over a set of pulleys communicating with the treadmill running surface belt.

The continuous treadmill running surface belt is a closed loop array of a plurality of transverse parallel slats, wherein each transverse parallel slat includes an upper running surface flange, at least one web fin descending downward from each running surface flange of the transverse slat. The at least one web fin of each slat extends perpendicular down therefrom.

To improve strength and stability, the downwardly vertical descending web fin of each transverse parallel slat extends downward from the upper slat flange and has a distal end with a lower horizontal flange portion, extending horizontally at the downward distal end of the vertical web fin portion.

Therefore, the treadmill slat forms an I-beam shape in crossection.

While the lower slat flange can be equal in width to the upper slat flange, preferably the upper treadmill slat flange is greater than the width of the lower stabilizing horizontally extending flange portion of the treadmill slat.

Optionally, the lower flange of the I-beam shaped transverse slat can have an small, arcuate shape or cover extending the length of said horizontally extending lower flange portion. Additionally, the arcuate shaped lower slat flange or cover can have opposite ends wider than a narrower mid portion of the cover.

Preferably, the downwardly extending web fin, extending between the upper and lower flanges, also may extend continuously over substantially an entire length of each of the transverse slats between the opposing peripheral sides of the treadmill frame, wherein the continuous treadmill running surface belt moves over a set of pulleys which is powered by the legs of the treadmill user or optionally, the continuous treadmill running surface belt moving over the set of pulleys is powered by a motor.

The benefits of an I-beam configuration for a treadmill slat, when viewed in end crossection, are that when the runner is running on the slats, the weight and force of the runner exerts a significant amount of load force downward against the top of the slat. This load also causes other problems, such as the exertion of bending moments on the slat, as well as shear forces exerted on the slat. Generally, I-beam shape of each transverse parallel slat is preferably used, such as is used in steel construction of buildings in an analogous manner, when used with the slats of the treadmill belt. The I-beams, also known as H-beams, are beams, which have I- or H-shaped end cross sections. The top and bottom portions of the I-beam are referred to as the upper and lower flanges, which generally extend horizontally, or substantially horizontally, along the length of the slat. The upper and lower flanges are connected by the vertical element, which is referred to as a web in I-beam construction engineering.

Therefore, the downward fin of the present I-beam-shaped slat has the vertical element being the web fin. The reason for using the I-beam shape is, first, economical, because there is a reduction in the amount of material, such as plaster, rubber, synthetic material, metal, steel, aluminum, etc., needed for the slat, by the nature of only needing the top flange and the lower flange, each having a pre-designated width and length, and the central vertically extending web fin portion connecting the upper and lower flanges. Therefore, all the void area underneath the upper and lower flanges, excluding the actual central web fin, is not required. This reduces the amount of material required to substantially form a solid square or rectangular-shaped block for the fin, or even from a hollow, four-sided fin, having upper and lower flanges, and left and right vertically extending walls.

When a rectangular beam is subject to stresses, one side is under tension and is stretched longer and the other side is under compression, so that material is stressed laterally, which results in a constant problem of the one side of the beam having a compression force, with a shorter bent bending portions and the other side subject to pulling tension in opposite directions. The stresses due to these bending moments increases where the height of the axis of a solid beam, or hollow rectangular beam, has a general mid X-Y axis, and where one side flange is under pressure and the other side flange is under tension. But in contrast, with a treadmill slat having an I-beam configuration, the vertically extending central web fin resists shear forces, while the upper and lower horizontal flanges resist most of the bending moments imposed upon the beam. Therefore, the use of I-beam shaped transverse parallel treadmill slats is a very efficient way for stable treadmill slats, where the I-beam shaped slat is strong, even with less material.

As the runner exerts force in the transverse direction perpendicular to the length of the slat, conventional slats tend to bend under bending stress, but the slat with an I-beam configuration reduces the bending stress. The I-beam shaped slat also has a higher moment of resistance. Therefore, when the I-beam configuration is used for a treadmill slat, the force of the runner is distributed and the shear force is reduced, as well as are reduced are the bending moments caused by the usual compression and tension along the different sides of the preferred I-beamed shaped treadmill slat.

The I-beam shaped slat can have a variable length or width of the upper and lower flanges so that the upper flange, which directly contacts the weight of the runner, may be wider than the width of the lower flange, located at the distal end of the web fin connecting the upper and lower flanges. Additionally, optionally there may be provided upon the top of the upper slat flange a running surface with textural running surface to make the top flange of the slat resistant to slippage by the runner's shoes.

Furthermore, optionally the lower flange should be substantially horizontal, but may have a slight bend to it so that there is just a slight arcuate bulge to the substantially horizontal lower flange. Also, the lower flange does not have to be parallel along its length. It may be wider at the edges than in the midsection.

The benefits of the I-beam shape for the treadmill slat are to create a stronger, more stable treadmill slat, which is resistant to shear forces and bending moments, during use, thereby making the slat's use last longer, and also reducing the amount of material needed to configure the slat, as opposed to a slat with one or more centrally located descending webs, but which has no lower flanges to make the slat stable in a strong I-beam shaped configuration, as in the present invention.

BRIEF DESCRIPTION OF THE DRAWINGS

The present invention can best be understood in connection with the accompanying drawings. It is noted that the invention is not limited to the precise embodiments shown in drawings, in which:

FIG. 7AA is an end crossectional view of the multi-finned treadmill slat with a pair of descending fins.

FIG. 7AA1 is an end crossectional view of the finned treadmill slat with one single descending fin.

FIG. 7AA2 is an end crossectional view of the multi-finned treadmill slat with a three descending fins.

FIG. 7C is a front view of the treadmill slat as in FIGS. 7, 7A and 7B, shown with attached v-belts.

FIG. 7D is a bottom view of the treadmill slat as in FIGS. 7, 7A and 7B, shown with attached v-belts.

FIG. 7E is a diagrammatic side view showing treadmill slats with fins engaging around pulley.

FIG. 7M shows a truncated oval treadmill slat 100*b* with curved side brace walls 100*bb* and a single descending fin 101*bb*.

FIGS. 7N, 7NN and 7NNN shows truncated oval, angularly braced and parallelogram shaped treadmill slats 1100, 1101 and 1102, each with one descending fin 101*n*.

FIGS. 7O, 7OO and 7OOO show truncated oval, angularly braced and parallelogram shaped treadmill slats 1103, 1104 and 1105 with pairs of fins 1010 descending therefrom.

FIGS. 7P, 7PP and 7PPP show truncated oval angularly braced and parallelogram shaped treadmill slats 1106, 1107 and 1108 with multiple fins 101*p* descending therefrom.

FIGS. 7Q to 7Q5 show alternate embodiments for treadmill slats having a crossectional end view of an I-beam configuration, wherein:

FIG. 7Q is a diagrammatic crossectional end view of a preferred treadmill slat having an I-beam shape;

FIG. 7Q1 is a crossectional end view of another treadmill slat with an I-beam shape;

FIG. 7Q2 is a perspective view from below of a treadmill slat with an I-beam shape, where the lower slat flange is covered by a slightly arcuate cover or bulge;

FIG. 7Q3 is a closeup detail bottom view of one end of the slat as in FIG. 7Q2 where the cover is wider at its opposite ends;

FIG. 7Q4 is a closeup detail side elevation view of one end of the slat shown in lengthwise crossection; and, FIG. 7Q5 is another closeup detail perspective view from below of a portion of the slat as in FIG. 7Q2.

FIGS. 10AA-10AA6 show a further alternate embodiment with two adjacent sets of guide rollers, which are staggered to provide better support for the treadmill slats.

FIG. 10BB is a close-up detail of staggered roller wheels showing minimal dimensions between horizontal and vertical gaps between adjacent rollers.

FIG. 10CC is a perspective view of a preferred embodiment for a treadmill with roller wheel axles directly rotating within holes provided in the respective side frames of the chassis of the treadmill.

FIG. 11 is an end view of a pair of adjacent rollers compared with a side view of a pair of nested wheels (prior art).

FIG. 12 is a perspective view of a flat array of nested wheels (prior art).

FIG. 13B is a detail view related to FIG. 13 showing a close-up of the nested wheels and timing belt, with upper and lower support rollers for the timing belt.

FIG. 17 is a perspective detail of the treadmill of FIG. 16 showing the array of nested wheels with magnetic edge wheels and no timing belt use.

DETAILED DESCRIPTION OF THE DRAWINGS

The description of the invention which follows, together with the accompanying drawing should not be construed as limiting the invention to the example shown and described, because those skilled in the art to which this invention appertains will be able to devise other forms thereof.

Figure 1:
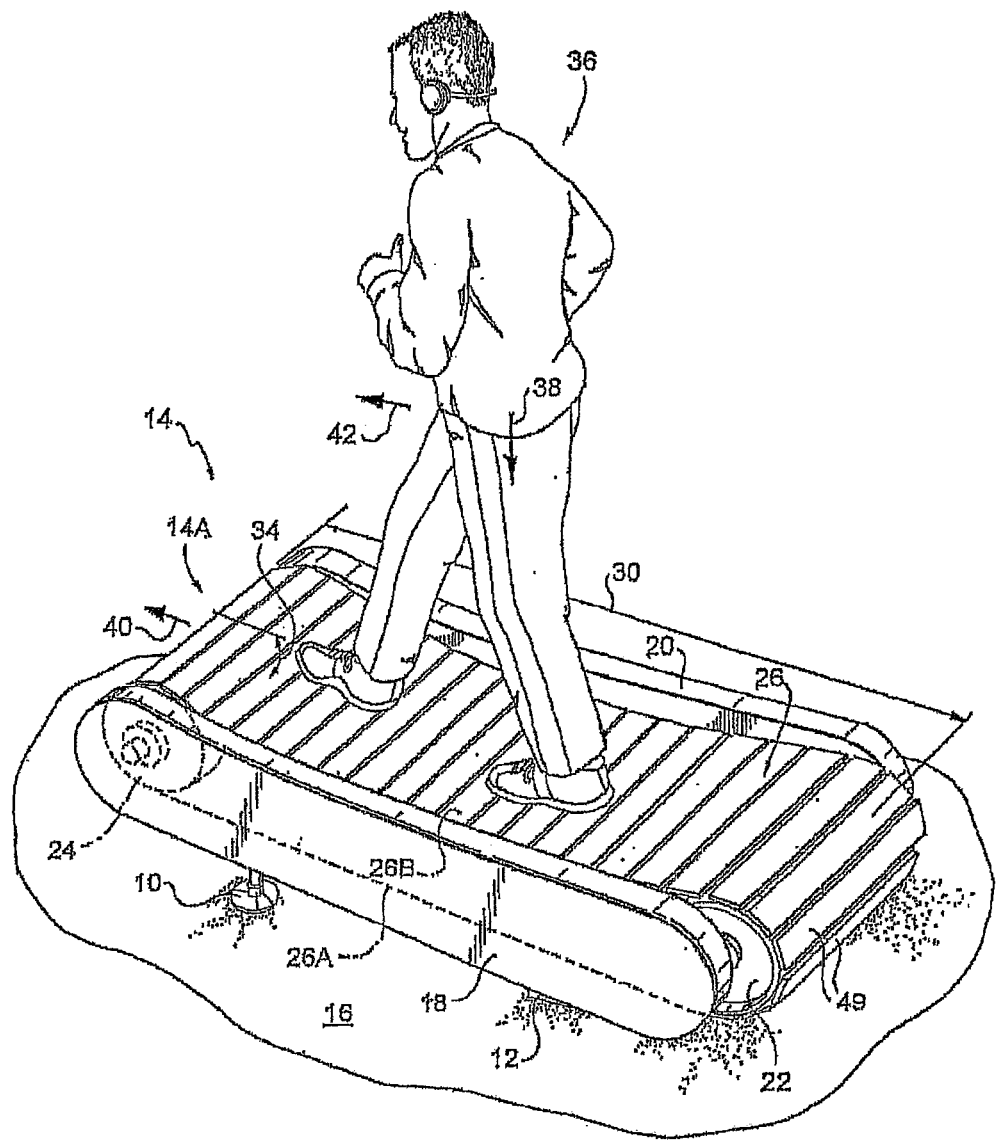
FIG. 1 is a perspective view of the exterior of one embodiment of the present invention; showing the runner in a slow walk in the droop of the concave upper portion of the treadmill ball.

FIG. 1 is a perspective view of a leg-powered treadmill 10 constructed and having an operating mode according to the present invention.

As noted in FIG. 1, no hand rails are shown. The curved treadmill 10 can be used without hand rails. Hand rails can be optionally provided for non-athletes with balance or running stabilities limitations.

Illustrated are two leg supports 10 and 12 which lift the treadmill 14 in a clearance position above a support surface 16, said treadmill 10 having space apart sides 18 and 20 which have journalled for rotation end rollers 22 and 24 which support a closed loop treadmill belt 26. Low friction methods to be described are used to hold taut the length of the lower belt portion 26A in a dimension of approximately forty-three inches denoted by dimension line 30. The upper belt portion 26B weighs approximately forty pounds is also denoted by the dimension line 30.

Figure 1A:
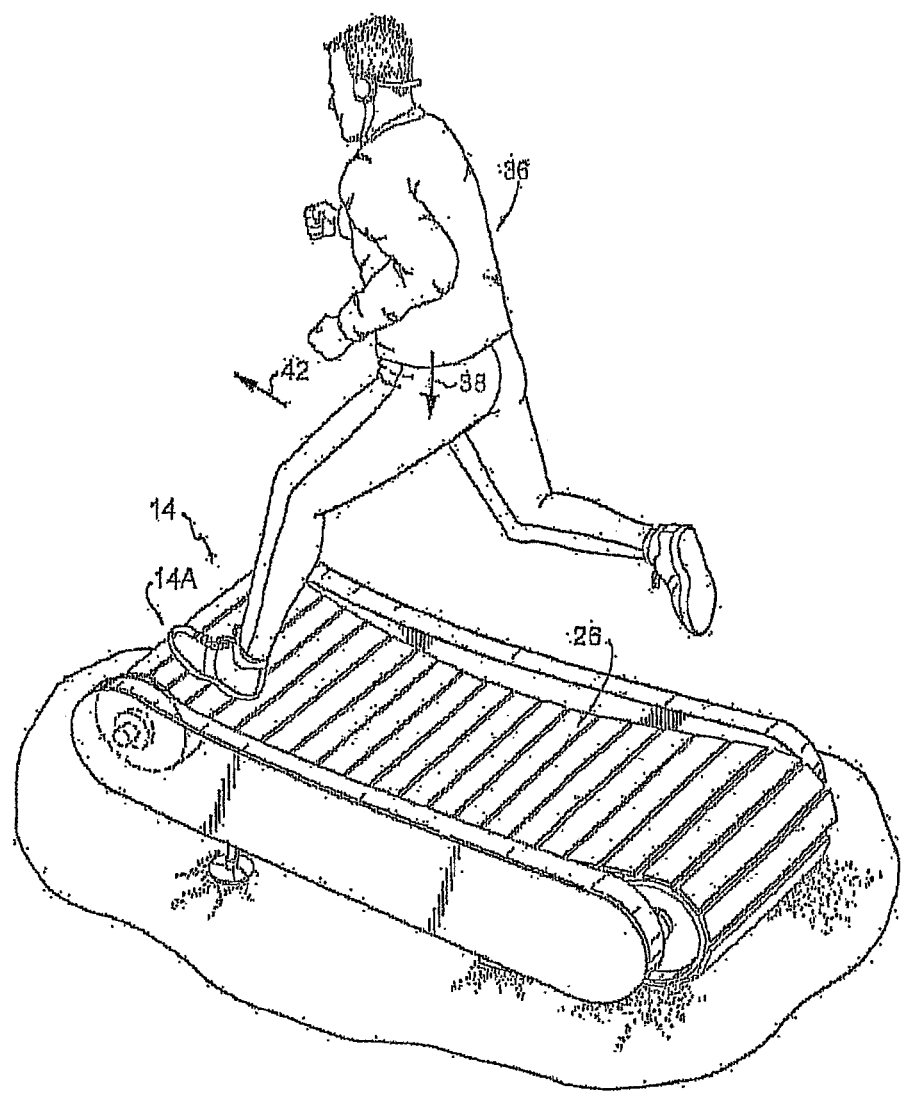
FIG. 1A is a perspective view of the exterior of the embodiment in FIG. 1, showing the runner running at a fast pace uphill.
Figure 1B:
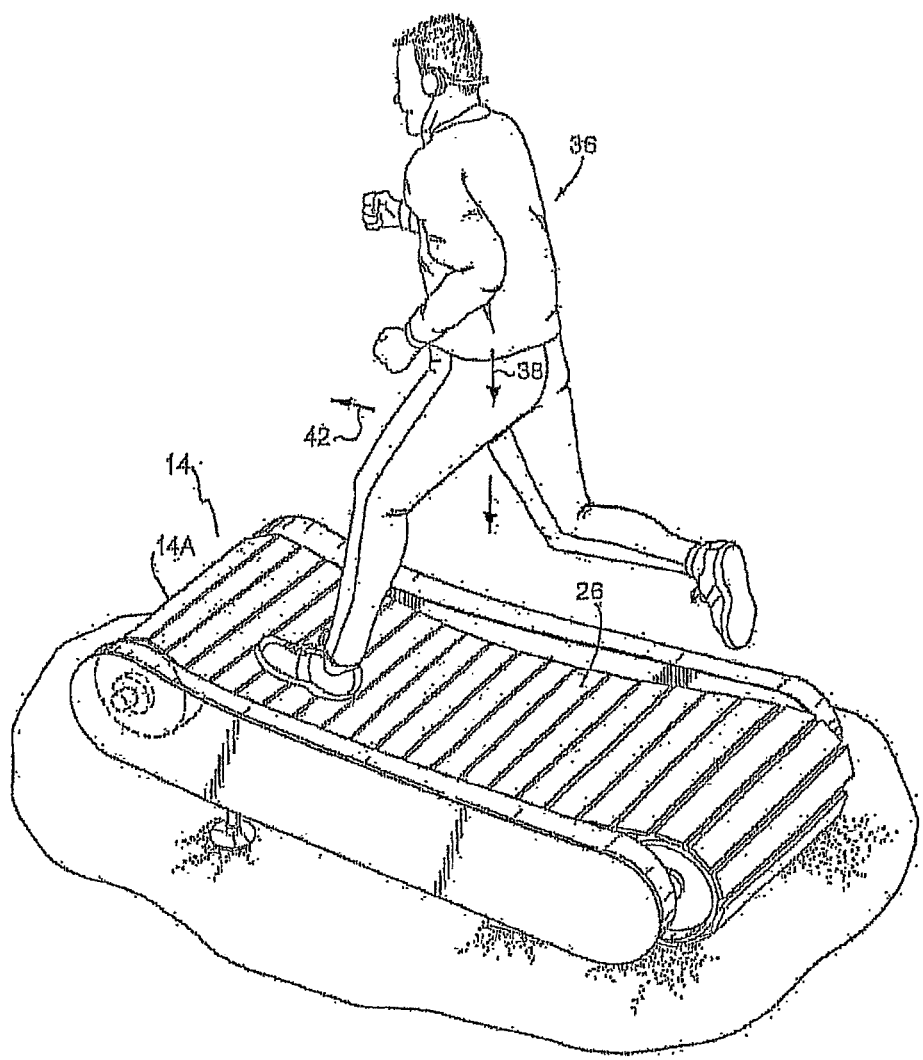
FIG. 1B is a perspective view of the exterior of the embodiment in FIG. 1, showing the runner running slowly in the droop of the concave portion.

It is to be noted that an essential feature of treadmill 10 is a concave shape subtending an acute angle 34 in the treadmill 10 front end 14A which in practice results in the exerciser 36 running uphill and concomitantly exerting body weight 38 that contributes to driving lengthwise 40 in the direction 42 in which the exerciser runs and achieves the benefits of the exercise. As the runner 36 encounters the different positions on the treadmill belt 26 of the treadmill 14, the angle of the surface of running changes For example, as shown in FIG. 1, when the center of gravity of body weight, indicated by downward directional arrow 38, below the hips of the user 36, is in the lower dropping portion of the concave upper portion 26B of the treadmill belt 26, the runner 36 walks or slowly jogs in a generally horizontal orientation, as indicated by directional arrow 42 in a first slow jogging speed. But, as shown in FIG. 1A, as the runner 36 speeds up and advances the runner's hips and center of gravity of body weight further forward up the angled slope at the front end 14A of the treadmill belt 26, the angle of movement 42 changes from a generally horizontal angle 42 in FIG. 1 to an acute angle 42 up off the horizontal as in FIG. 1A, which concurrently causes the runner 36 to run vigorously faster, at the acute angle 42 up the slope of the front 14A of the concave curve of upper belt portion 26B of treadmill belt 26, the runner 36 runs faster uphill. Furthermore, as shown in FIG. 1B, it does not matter where the runner 36 puts the forward foot to change the speed. In FIG. 1B the center of gravity in the hip region of the runner 36's body weight, indicated by downward directional arrow 38, is still in the lower part of the concave droop of the upper portion 26A of treadmill belt 26. So even though the runner 36 in FIG. 1B is jogging faster than walking or slowly jogging as in FIG. 1, so long as the runner 36 has the forward foot partially up the angled slope of the forward portion 14A of the upper belt portion 26B, the runner will still run slower in FIG. 1B, not because the forward foot is up the slope of upper belt portion 26B of the treadmill belt 26, but because the center of gravity of body weight, as indicated by downward directional arrow 38, is still within the lower confines of the droop of the concave upper belt portion 26B. Therefore, what changes the speed of the runner 36 and the treadmill belt 26, is when the runner 36 moves the center of gravity of the hips of the body weight indicated by downward directional arrow 38 higher up the slope of concave upper portion 26B of treadmill belt 26, which causes the runner to run faster and the belt 26 to concurrently move faster around pulleys 22 and 24 with the pace of the forward advancing runner 36.

It is known from common experience that in prior art treadmills, the upper length portion of their closed loops are flat due, it is believed, because of the inability to maintain the concave shape 34 in the length portion 26B. This shortcoming is overcome by the weight 30 which in practice has been found to hold the concave shape 34 during the uphill running of the exerciser 36.

A closed loop treadmill belt 26 is formed with a running surface of transverse wooden, plastic or rubber slats 49 (see FIG. 1) attached to each other in a resilient fashion. Since an essential feature of treadmill 10 is the concave shape of the low friction running surface of belt 26 in upper portion 26B, methods are used to insure that this shape is maintained during actual use. These methods must prevent the lower portion 26A of treadmill belt 26 from drooping down (i.e., must be held taut), otherwise top portion 26B would be pulled taut into a flat shape between rollers 22 and 24. Three methods are illustrated by the side view schematic drawings of FIGS. 2-4.

Figure 2:
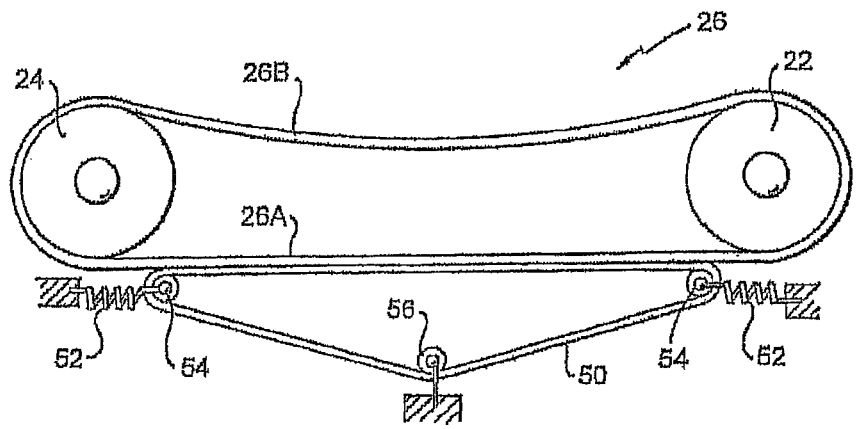
FIG. 2 is a diagrammatic side view of the system components for the embodiment of FIG. 1 for implementing the present invention.

The method of FIG. 2 shows a flat support belt loop 50 engaged with two side pulleys 54 and a third pulley 56 which is attached to treadmill 10 frame. Two springs 52 pulling in opposite directions hold belt 50 taut with a flat top configuration in contact with bottom treadmill belt portion 26A. Since pulleys 54 and 52 are low friction, and there is no relative movement between belt 50 and belt 26, belt 50 imposes very little drag on belt 26 while supporting lower belt portion 26A vertically preventing it from drooping down.

Figure 3:
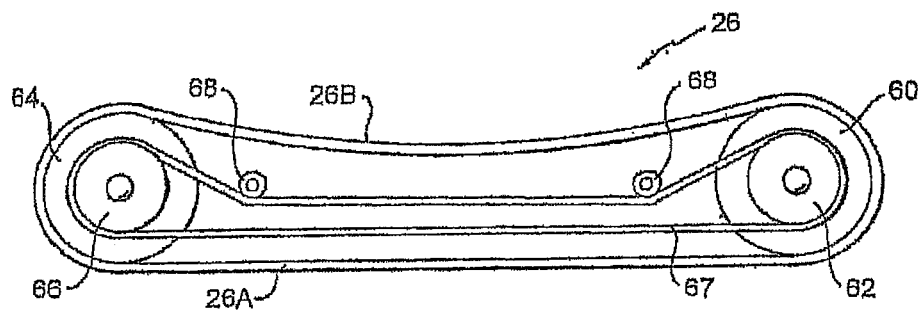
FIG. 3 is a diagrammatic side view of the system components for a second embodiment for implementing the present invention.

The method shown in FIG. 3 shows the use of a timing belt 67 in achieving a similar result. Here end rollers 60 and 64 are attached to timing belt pulleys 62 and 66 respectively. Timing belt idlers 68 are simply used to configure timing belt geometrically to fit within the constraints of the side contours of treadmill 10. If belt 26 is prevented from slipping relative to end rollers 60 and 64 by high friction coefficient (or by the use an integral timing belt on the inside of belt 26 and rollers with timing belt engagement grooves), once configured as shown, timing belt 67 will not permit drooping down of section 26A since all motion is now synchronous.

Figure 4:
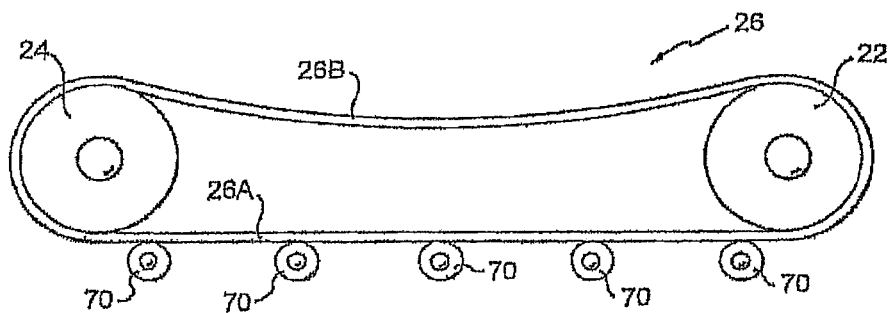
FIG. 4 is a diagrammatic side view of the system components for a third embodiment for implementing the present invention.

In another method shown in FIG. 4, one or more linear arrays of bearings 70 extending along opposite peripheral edges of said treadmill frame physically support lower section 26A of treadmill belt 26 thereby preventing drooping. Bearings 70 may be ball bearings or straight ball bearing casters attached and located at respective side peripheral edges to the bottom surface of the frame of treadmill 10.

Figure 5:
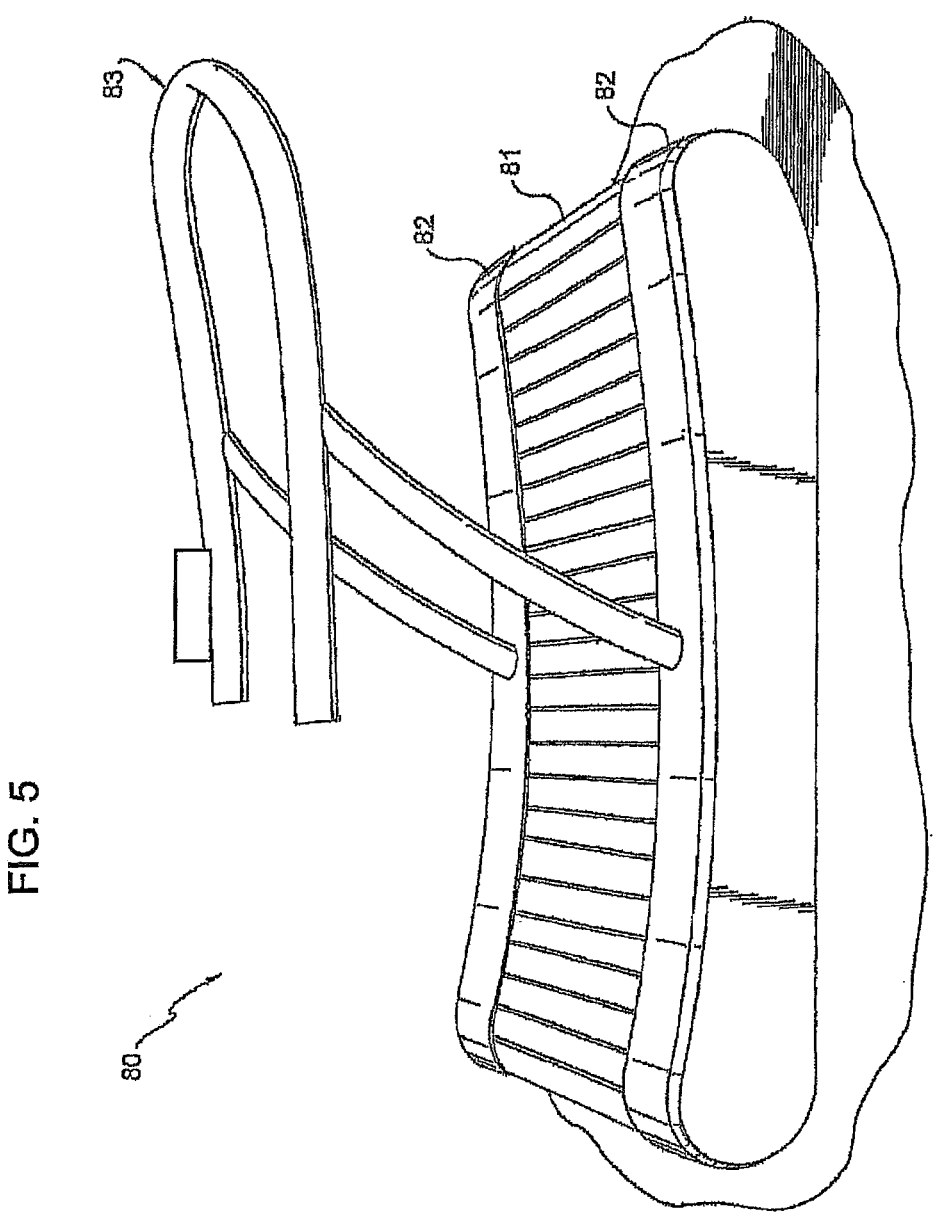
FIG. 5 is a perspective view of the third embodiment shown in FIG. 4, having a v-belt and a lower linear array of ball bearings in the curved treadmill, and showing an optional removable handlebar assembly.

In the v-belt treadmill embodiment 80 of FIG. 5, side covers 82 enclose the underlying chassis. Running surface 81 comprises a concave surface of transverse slats. Optional handle bar assembly 83 helps users who are balance-challenged to use treadmill 80; it is both optional and removable.

Figure 6:
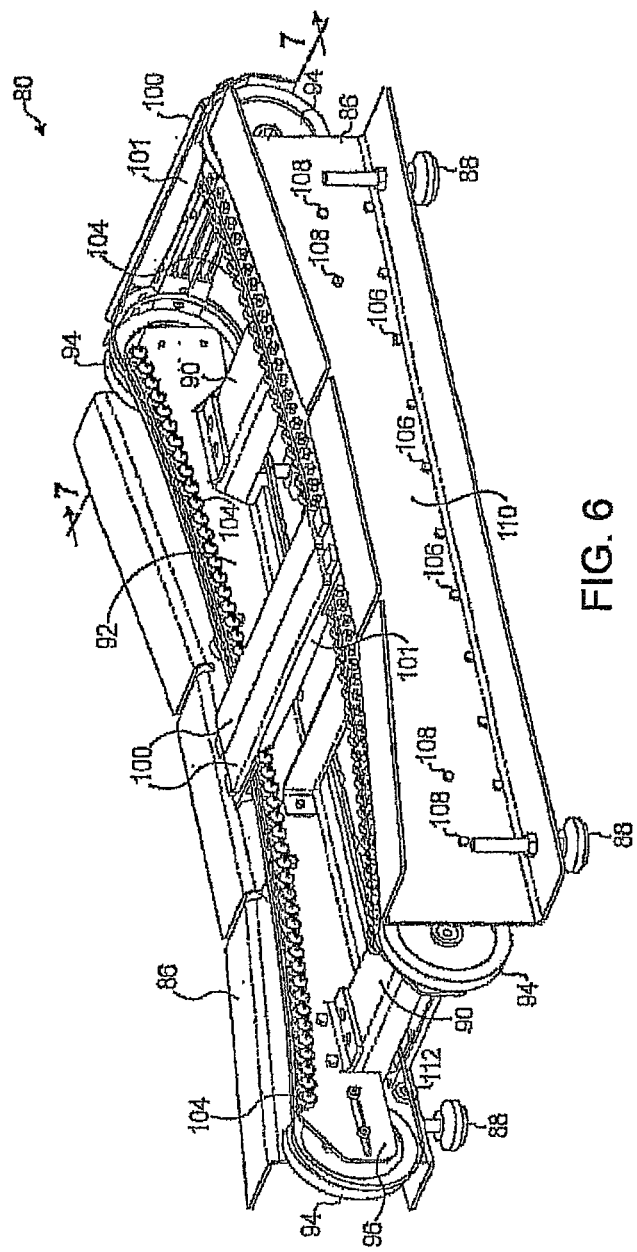
FIG. 6 is a perspective view of the curved treadmill embodiment of FIG. 5 having a v-belt and a lower linear array of ball bearings, with the side covers and treadmill belt removed to reveal the various operating parts.

FIG. 6 shows the chassis of the treadmill of FIG. 5. Robust cross beams 90 attach both outer frames 86 as well as inner frames 92 on each side to each other creating the roughly rectangular chassis. Bolts 108 attach the outer frames 86 to cross beams 90. A few slats 100 are shown; they each have one or more downwardly extending reinforcing fins 101 attached on the inner side. Regardless of the material selected for the slats, they must exhibit the desired resiliency and strength along with sufficient weight to lie on and conform to the concave row of upper support ball bearings 104 at each side. The peripheral bearings are spaced apart from each other on respective left and right sides of the curved treadmill 80, wherein the fins 101 of the transverse slats 100 extend cantilevered downward from each transverse slat 100 so that the transverse slats 100 are resilient to dip slightly under the weight of the user runner without any lower support directly below the transverse slats 100. FIGS. 7A and 7B show a treadmill slat 100 with multiple fins 101, as shown in FIG. 6.

FIG. 7AA shows the finned treadmill slat with a pair of descending fins. FIG. 7AA1 shows the finned treadmill slat with one single descending fin. FIG. 7AA2 shows the multi-finned treadmill slat with a three descending fins.

Figure 7:
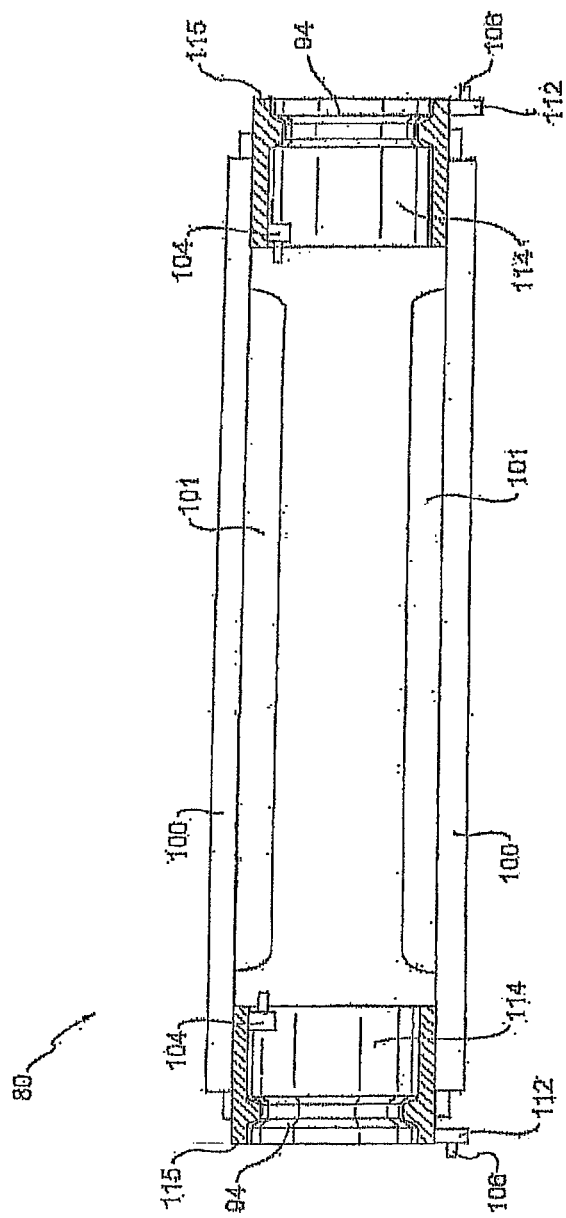
FIG. 7 is an end view of the curved treadmill embodiment of FIG. 5 having a v-belt and a lower linear array of ball bearings, illustrating the support of a top slat and a bottom slat using the side extension features of the custom v-belt.
Figure 7A:
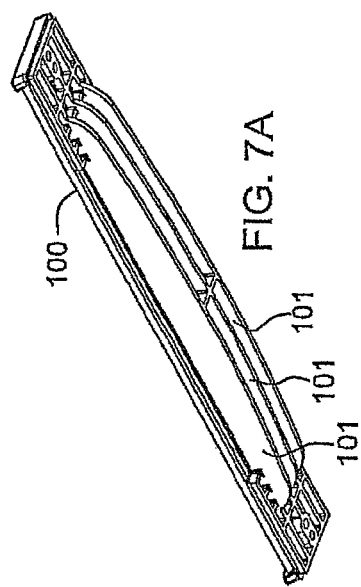
FIG. 7A is a perspective view viewed from below of a treadmill slat with multiple fins as shown in FIG. 6.
Figure 7B:
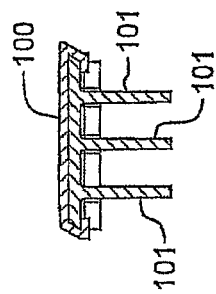
FIG. 7B is an end crossectional view of the multi-finned treadmill slat as in FIG. 7A.
Figure 8:
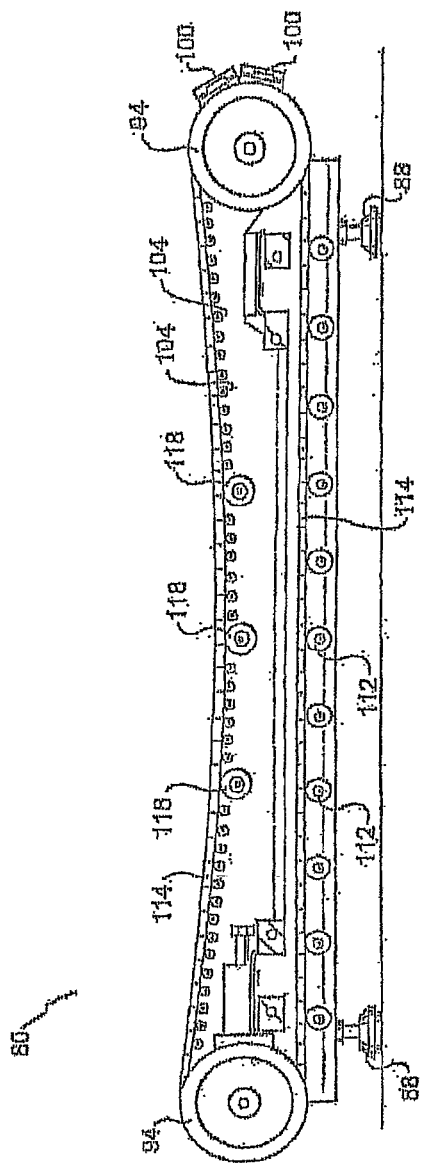
FIG. 8 is a side elevation of the v-belt treadmill chassis of the embodiment of FIG. 5 with a v-belt and a lower linear array of ball bearings, showing the supported path of the v-belt; wherein the vertical side of the outer frame member is rendered invisible for clarity of detail.

FIGS. 7C and 7D show the slats 100 with descending fins 101 and with v-belts 114, each having crossectional v-belt extensions 115, which engage pulley 94, as shown in FIGS. 7 and 7E, where slats 100 with fins 101 engage around pulleys 94. FIG. 7 shows slat 100 with at least one fin 101, where slat 100 is attached to belt 114 having crossectional extensions 115, and where belt 114 goes around pulleys 94, as shown in FIG. 8, which also shows slats 100, belt 114 and pulleys 94.

Figure 7F:
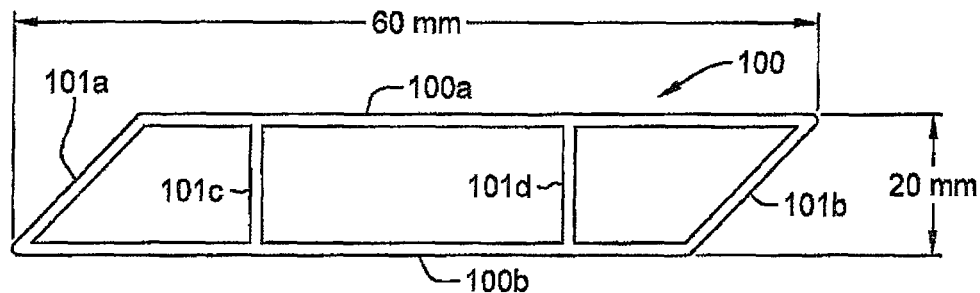
FIG. 7F is an end crossectional view of a parallelogram shaped treadmill slat.

FIG. 7F shows a parallelogram shaped treadmill slat 100 with top wall 100a and bottom wall 100b connected by fins 101c and 101d, as well as by oblique end walls 101a and 101b.

Figure 7G:
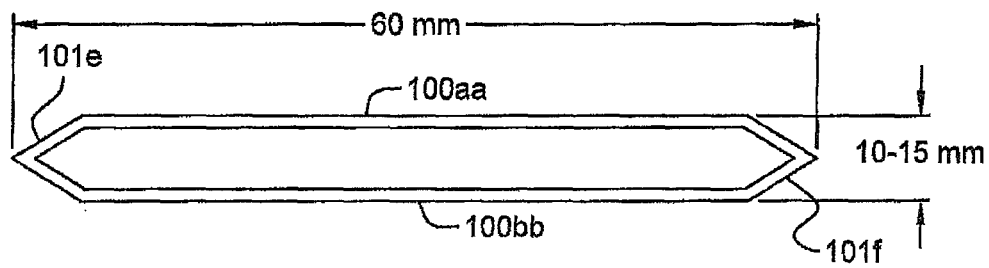
FIG. 7G is an end crossectional view of a treadmill slat with angular end walls.

FIG. 7G shows a treadmill slat with angular end walls 101e and 101f connecting top wall 100aa and bottom wall 100bb.

Figure 7H:
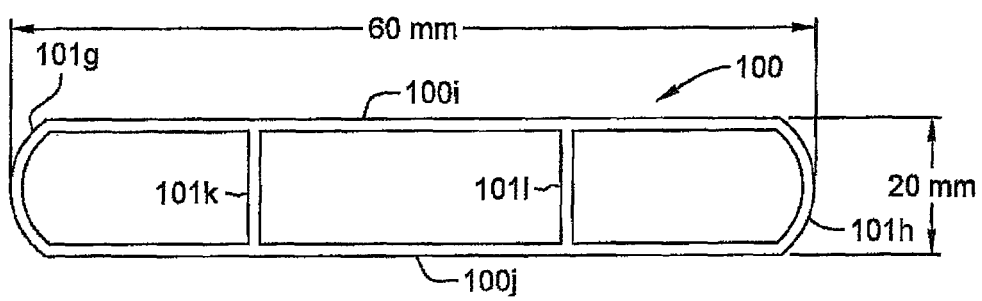
FIG. 7H is an end crossectional view of a truncated oval shaped treadmill slat.

FIG. 7H shows a truncated oval shaped treadmill slat 100 with top and bottom walls 100i and 100j connected by fins 100k and 100l. Convex side walls 101g and 101h are on opposite sides of truncated oval slat 100.

Figure 7J:
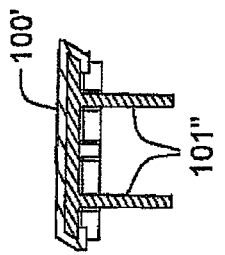
FIG. 7J is an end crossectional view of the slat with a pair of fins as in FIG. 7I.
Figure 7L:
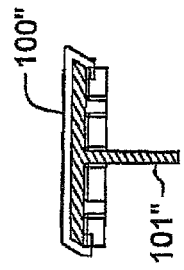
FIG. 7L is an end crossectional view of the slat with one fin as in FIG. 7K.
Figure 7I:
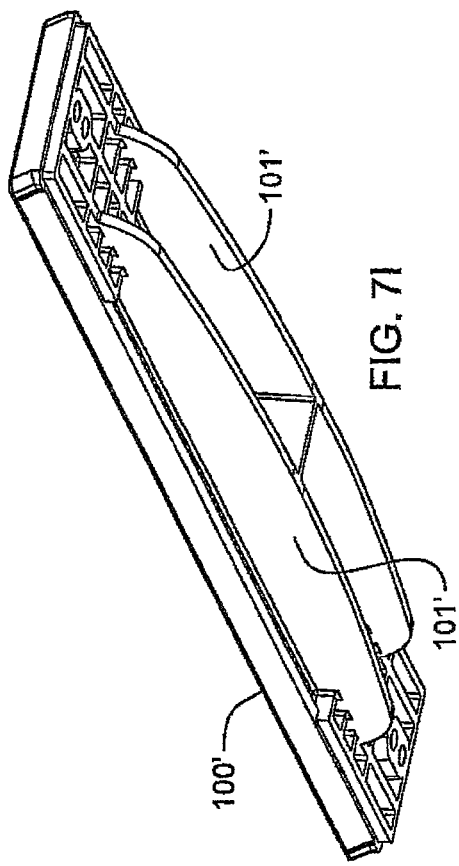
FIG. 7I is a perspective view viewed from below a treadmill slat with a pair of fins.

FIG. 7I depicts from below a treadmill slat 100' with a pair of descending fins 101', 101'.

FIG. 7J shows the slat 100' with a pair of fins 101', 101', as in FIG. 7I.

Figure 7K:
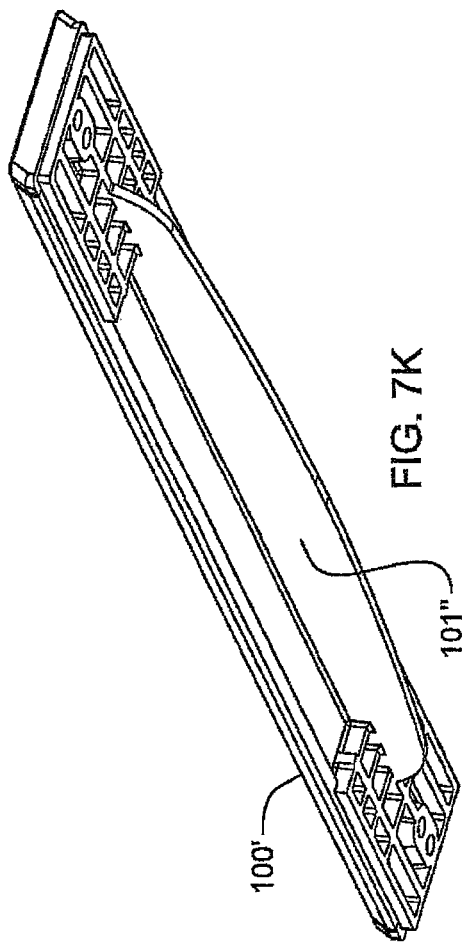
FIG. 7K is a perspective view viewed from below of a treadmill slat with one fin.

FIG. 7K depicts from below a treadmill slat 100' with one single fin 101"

FIG. 7L shows the slat 100' with one fin 101" as in FIG. 7K.

FIG. 7M shows a truncated oval treadmill slat 100b with curved side brace walls 100bb and a single descending fin 101bb.

FIGS. 7N, 7NN and 7NNN shows truncated oval, angularly braced and parallelogram shaped treadmill slats 1100, 1101 and 1102, each with one descending fin 101n.

FIGS. 7O, 7OO and 7OOO show truncated oval, angularly braced and parallelogram shaped treadmill slats 1103, 1104 and 1105 with pairs of fins 101o descending therefrom.

FIGS. 7P, 7PP and 7PPP show truncated oval angularly braced and parallelogram shaped treadmill slats 1106, 1107 and 1108 with multiple fins 101p descending therefrom.

While transverse slats 100, 100', 1100, 1101, 1102, 1103, 1104, 1105, 1106, 1107 and 1108 may be made of aluminum, rubber, wood or synthetic plastic materials such as fiberglass, in a preferred embodiment, a pultrusion process is used to make the transverse slats 100, 100', 1100, 1101, 1102, 1103, 1104, 1105, 1106, 1107 and 1108 from a composite material, such as, for example, preferably carbon fiber composite material. Because of the pultrusion process, the composite carbon fiber material transverse slats are much thinner in the walls and have more resistance than the fiberglass or plastic slats.

Besides having a crossection shown in FIG. 7AA with an upper horizontal shape for a running surface transverse slats 100 can have on or more descending fins 101, shown in FIGS. 7A, 7AA, 7AA1, 7AA2 and 7B, other slats made of thin carbon fiber composite can have parallelogram shapes, as in FIG. 7F, where the descending fins 101 are replaced by oblique, slanted side braces 101a, 101b connecting an upper surface 100a and lower surface 100b, with optional descending fins 101c, 101d as shown in FIG. 7F or with just side braces 101e, 101f connecting upper surface 100aa and lower surface 100bb, as shown in FIG. 7G respectively. While sizes may vary, in FIG. 7F, the width is about 60 mm and the vertical height between upper and lower horizontal walls is about 20 mm. In FIG. 7G, the width is about 60 mm and the vertical height is about 10-15 mm.

Additionally, as a further option shown in FIG. 7H, transverse slats 100 can have a truncated oval shape with rounded side braces 101g, 101h, connecting upper surface 100i and lower surface 100j and optional fin braces 100k, 100l extending therein. The truncated oval shaped slats 100 in FIG. 7H preferably has a width of 60 mm, and a height of about 20 mm.

FIGS. 7I and 7J show treadmill slats 100' with a pair of descending fins 101'.

FIGS. 7K and 7L show treadmill slats 100" with a single descending fin 101".

FIG. 7M shows a truncated oval treadmill slat 100*b* with curved side brace walls 100*bb* and a single descending fin 101*bb*.

FIGS. 7N, 7NN and 7NNN shows truncated oval, angularly braced and parallelogram shaped treadmill slats 1100, 1101 and 1102, each with one descending fin 101*n*.

FIGS. 7O, 7OO and 7OOO show truncated oval, angularly braced and parallelogram shaped treadmill slats 1103, 1104 and 1105 with pairs of fins 1010 descending therefrom.

FIGS. 7P, 7PP and 7PPP show truncated oval angularly braced and parallelogram shaped treadmill slats 1106, 1107 and 1108 with multiple fins 101*p* descending therefrom.

While size may vary, transverse slats 100 with descending fins 101 shown in FIGS. 7A and 7B are typically about 60 millimeters (mm) in width, with a height including descending fins 101 of about 30 mm.

While transverse slats 100 may be made of aluminum, rubber, wood or synthetic plastic materials such as fiberglass, in a preferred embodiment, a pultrusion process is used to make the transverse slats 100 from a composite material, such as, for example, preferably carbon fiber composite material. Because of the pultrusion process, the composite carbon fiber material transverse slats are much thinner in the walls and have more resistance than the fiberglass plastic slats.

Besides having a crossection shown in FIG. 7AA with an upper horizontal shape for a running surface, transverse slats 100 can have two or more descending fins 101, shown in FIGS. 7A, 7AA and 7B, slats made of thin carbon fiber composite can have parallelogram shapes where the descending fins 101 are replaced by oblique, slanted side braces 101*a*, 101*b* connecting an upper surface 100*a* and lower surface 100*b*, with optional descending fins 101*c*, 101*d* as shown in FIG. 7AA, or with just side braces 101*e*, 101*f* connecting upper surface 100*aa* and lower surface 100*bb*, as shown in FIGS. 7F and 7G respectively. While sizes may vary, in FIG. 7F, the width is about 60 mm and the vertical height between upper and lower horizontal walls is about 20 mm. In FIG. 7G, the width is about 60 mm, and the vertical height is about 10-15 mm.

Additionally, as a further option shown in FIG. 7H, transverse slats 100 can have a truncated oval shape with rounded side braces 101*g*, 101*h*, connecting upper surface 100*i* and lower surface 100*j*. The truncated oval shaped slats 100 in FIG. 7H preferably has a width of 60 mm, and a height of about 20 mm.

Shown in millimeters, thickness of the slats can go from 1.5-2 mm up to 4-5.5 mm depends on the shape and fins or no fins.

The treadmill slats made of carbon fiber composites can have enough thickness between 1.5 mm and 5.5 mm of thickness, in any of the shapes described above.

It is further noted that the transverse slats may optionally be provided with a continuous uninterrupted bottom surface with no fin or fins descending downward therefrom. See, for example, see the slats of FIGS. 7F, 7G, 7H and 7M.

The construction of the treadmill belt and its path around the chassis contour will be illustrated in FIGS. 7 and 8. The v-belt (not shown in this FIG. 6) rides in v-belt pulleys 94 at front and back. Since the treadmill belt formed from two v-belt loops with transverse slats 100 attached is itself a large heavy loop, adjusters 96 on the rear (and/or front) pulleys 94 are used during initial installation and to fine tune the distance between the front and back pulleys 94 for precise smooth operation that is not so tight as to bind, nor too loose as to be noisy. Bolts 106 (on both sides) attach a linear array of ball bearings 112 to support the bottom of treadmill belt 81 to prevent drooping. Level adjusters 88 are used to adjust the tilt of treadmill 80.

FIG. 7 shows the two v-belts 114 in an inner end view near front end pulleys 94. The two v-belt crossections 115 are plainly illustrated showing the short outer extension and the longer inner extension on each side of the "v". Top slat 100 with fin 101 facing downward is shown at the top. In this view, at each crossection 115, two bolt heads are clearly shown; they fasten the longer inner flat belt extension to the end of slat 100. At each side the belt "v" is clearly positioned within the top groove of pulley 94 with ball bearing 104 supporting the edge of treadmill belt 81 through the resilient smooth continuous inner extension of belt 114. Similarly, at the bottom slat 100 fin 101 is now positioned facing up into the vacant midsection. Larger ball bearings 112 supporting the bottom belt 81 section are seen impinging on short outer v-belt 114 extensions at each side.

Figure 7Q:
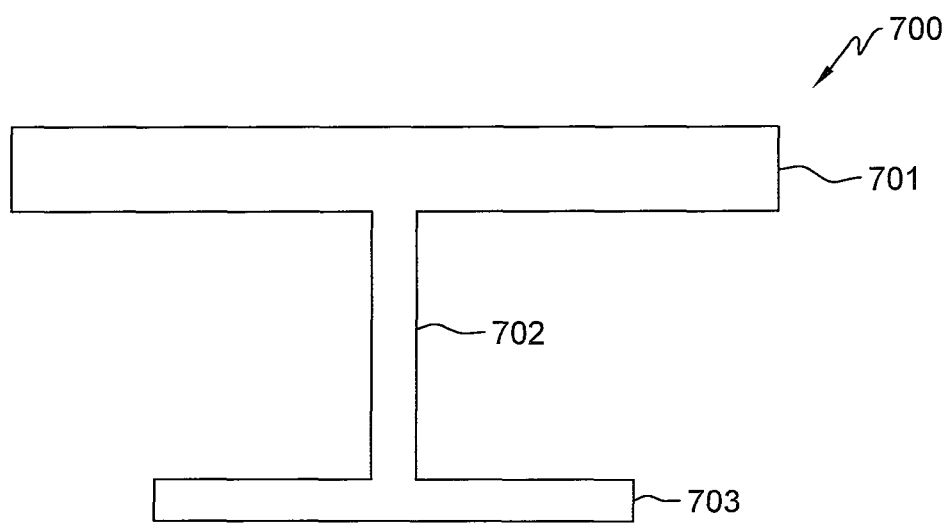

FIG. 7Q shows a treadmill slat including an upper load supporting flange 701, and a web fin 702 descending downward from the upper flange 701 of the slat 700, where the web fin 702 of each slat extends perpendicular vertically down from the upper load supporting flange 701, and where the downwardly descending web fin 702 of the treadmill slat 700 has a distal end having a stabilizing lower horizontal flange portion extending horizontally at the downward distal end of the vertical web fin 702. The upper and lower flanges 701 and 703 resist undesirable bending moments exerted on slat 700, and the vertically expanding connecting web fin 702 resists shear forces exerted on the slat 700.

Therefore, slat 700 forms an I-beam shape in crossection.

While upper and lower flanges 701 and 703 can be equal in width, preferably the width of the upper flange 701 of the treadmill slat is greater than the width of the stabilizing lower horizontally extending flange 703 of the treadmill slat 700.

FIG. 7Q1 shows treadmill slat 710 having a textured slippage reducing, friction-enhancing, foot engaging surface 704 and an optional cover 705*a*, 705*b* extending on both sides of the length of the stabilizing vertically extended web fin 702 and optionally along the length of the lower flange 703. For stability, the foot engaging surface 704 may have wrap around shoulder 704*a*, 704*b* enveloping over upper flange 701 of slat 720. The horizontal upper flange 701 may have cutout areas 701*a*, 701*b* to accommodate the frame of the treadmill (not shown).

FIGS. 7Q2 to 7Q5 show treadmill slat 720 where the downwardly extending web fin 712 connects to lower flange 713, which is substantially horizontal, but includes a slight arcuate bulge that joins to bottom of web fin 712. As shown in FIG. 7Q3, the lower flange 713 can optionally be narrower in its midsection, than at its opposite ends 713*a*, 713*b*.

FIG. 8 is a side view of the chassis of FIG. 7 with outer vertical side 110 of outer frame 86 rendered invisible to reveal the relative position of the other components in the v-belt support pathway. Only two slats 100 are shown attached to v-belt 114 (on the right pulley 94) for clarity. Note the taut, non-sagging position of the bottom section of belt 114 as supported by array of ball bearings 112. On top, the drooping concave belt 114 is supported by the concave array of ball bearings 104. The three centrally located v-belt idler pulleys 118 keep belt 114 from moving laterally far from large end v-belt pulleys 94. The weight of treadmill belt 81 keeps it in contact with the concave contour of ball bearings 104 at any speed from stopped to full running.

In the next embodiment, a workable configuration similar to treadmill 80 of FIGS. 5-8 will be described. The major difference from treadmill 80 is that there is no effort to force the bottom of the belt into a flat shape (there are no ball bearings 112). In fact no mechanism such as underbelt 50 of FIG. 2, timing belt 67 of FIG. 3, nor support bearings 70 of FIG. 4 is used. Although these elements provide the flexibility of accommodating a wide variety of frame dimensions, belt weights, and degrees of concavity, they also add frictional drag and cost.

Figure 9:
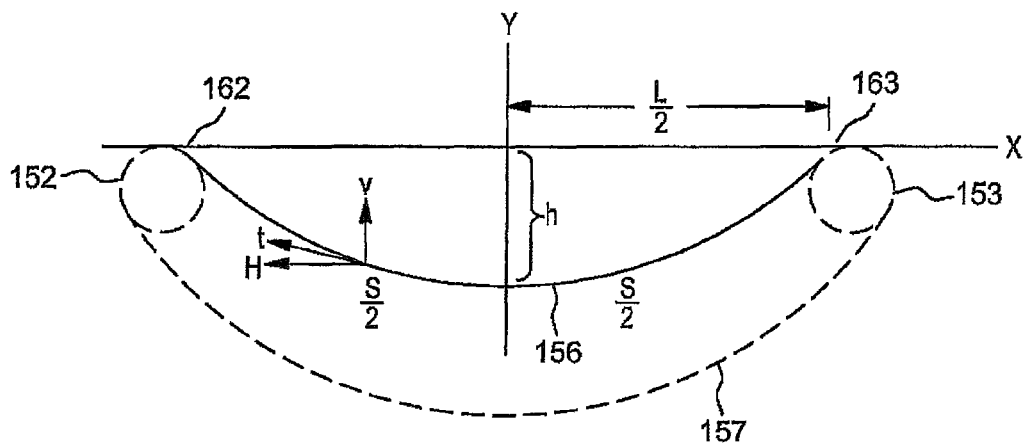
FIG. 9 is a schematic side view of a belt suspended by two pulleys set apart horizontally; an analytic model using the catenary curve is presented.

In FIG. 9 is shown a side view 150 of a belt comprised of top concave section 156 and drooping bottom section 157 looped around pulleys 152 and 153. Assuming the belt is a rather heavy slat belt as in the previous treadmill embodiments and pulleys are set in low friction bearings, some insight with design ramifications may be gleaned from an analytic model.

The curve described by a uniform chain hanging from two supports is called a catenary. Although not exactly the same as a chain, the slat belt can be fairly accurately represented and modeled as a catenary. (An alternative, closely related curve model would be to use a parabola). FIG. 9 represents a stable static configuration. If the pulleys are not turning, the turning moments on them provided by the tension in the top section 156 is exactly balanced by the tension caused by the weight of the bottom section 157. We can therefore analyze top section 156 as if it were a "chain" suspended by its "supports" at points 162 and 163. Using the four formulas F1-F4, we can merge known parameters as set by ergonomic (and economic) requirements and solve for the unknowns to complete a design. Obviously, empirical "tweaking" will be necessary to "fine tune" the final design.

A suggested method of model use would be to first select key frame dimensions from which the span, L, is derived. The amount of desired sag, h, is then determined. A slat belt is selected thereby determining the linear density, w, in units such as pounds/foot. S is then determined by fitting a catenary curve that passes through 162 and 163 and also has droop h. Then H is calculated from formula F3. From that, T is calculated using formula F4; this is the tension at point 163. It should be close to half of the weight of bottom belt section 157. From that information, the total circumference of the belt is determined as S+2T/w plus about ⅔ of the circumference of pulley 153.

Figure 10:
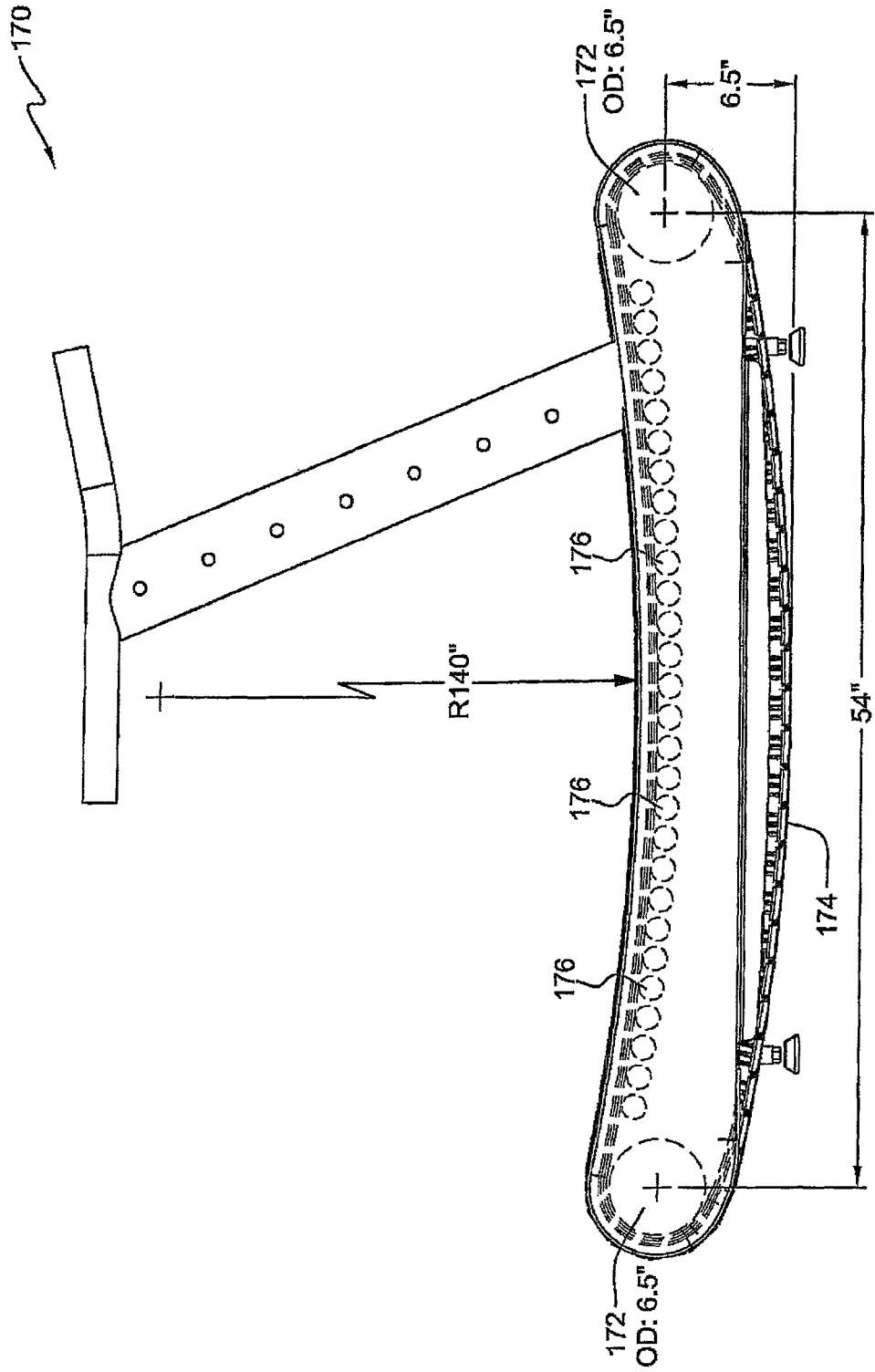
FIG. 10 is a side elevation of a curved top treadmill with a drooping bottom section.

FIG. 10 shows the actual dimensions of a treadmill 170 that runs with a bottom droop or sag. The whole purpose of a non-motorized treadmill is to emphasize the outdoors motion of running, by adding less friction possible and not using an electric motor to propel the treadmill belt. Applicant's treadmill 170 is the closest concept ever to these goals. The key element is finding the right relationship in between the size and weight of the treadmill's belt 174, the radius of the curve of the belt 174 and the distance in between the pulleys 172 to create the right amount of drooping on the bottom to keep the belt curved by also taut on the top without any extra help, such as with a timing belt as in FIG. 3 herein, a support belt underneath as in FIG. 2 herein or with a linear array of bearings underneath, as in FIG. 4 herein. Therefore treadmill 170, as in FIGS. 10 and 13-18 herein, is a unique leg powered treadmill with operates without any auxiliary lifting required in the treadmill belts 26 of FIGS. 2, 3 and 4 herein.

As also shown in FIG. 10 herein, the key design parameters are the 54" pulley 172 spacing, concave top surface as a circular arc with a 140" radius, 42.8 pound belt 174 with 134.6" circumference. The resultant sag from the center of pulley 172 is 6.5". The top contour is circular as determined by the circular array of side support bearings 176. A best-fit circular arc can be determined from a plot of the top side catenary; it is very close and in practice is much easier to lay out. Although other usable solutions may be found with heavier belts, at some point the inertia of the belt would be difficult for a user during start-up acceleration; also there might be cost issues in terms of material and shipping for a heavier belt. Preferably the radius of the circular arc shown in FIG. 10 for belt 174 is at least 140 inches or more. Also, when the radius of the circular arc is 140 inches or higher, the bottom of belt 174 can be flat or with a drooping slack.

Figure 10A:
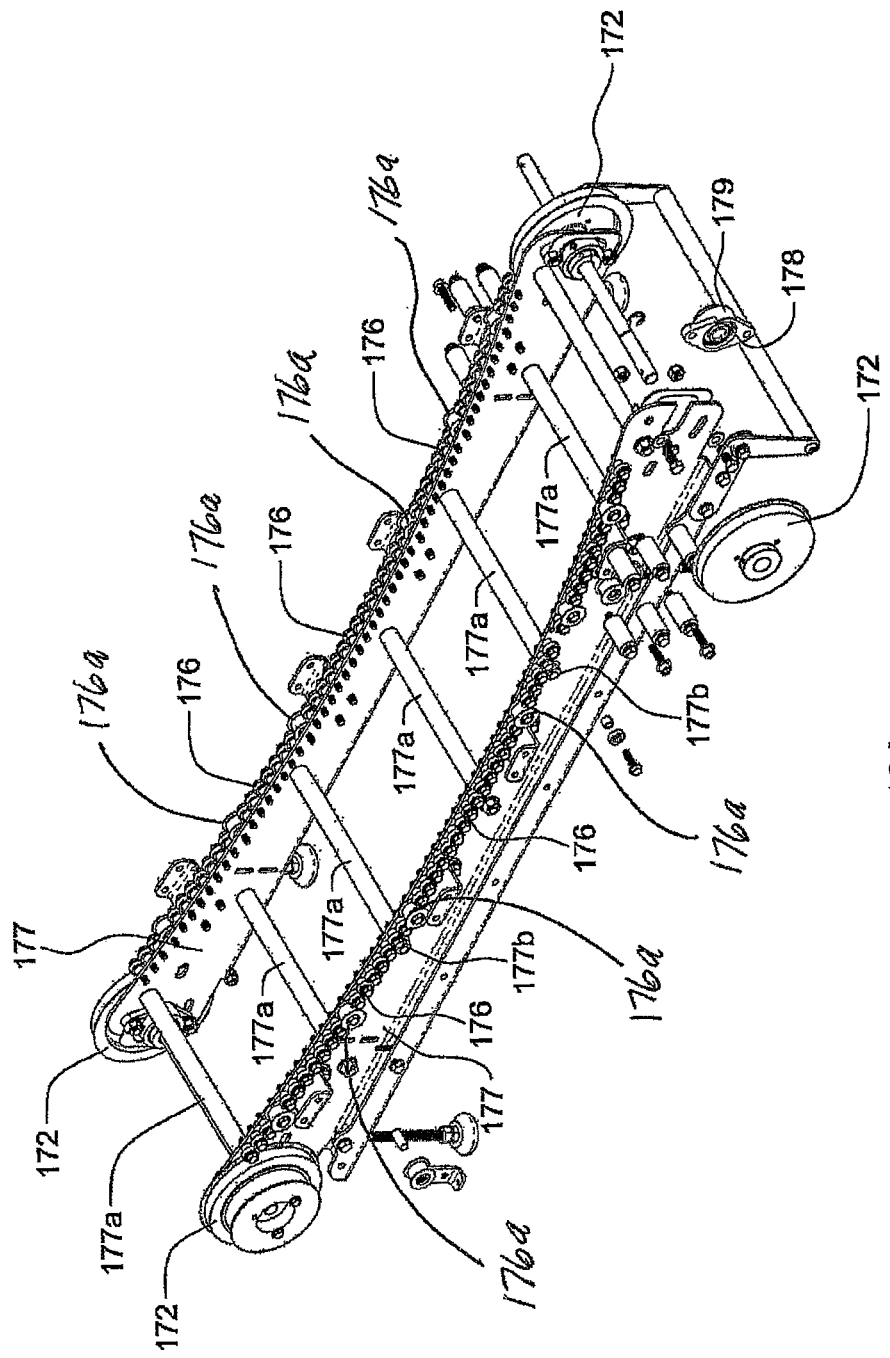
FIG. 10A is a perspective view for the chassis frame of the leg powered treadmill of FIG. 10.

FIG. 10A shows the chassis of the treadmill of FIG. 10. Robust cross beams 177*a* attach frames 177 on each side to each other creating the roughly rectangular chassis. Bolts 177*b* attach the side frames 177 to cross beams 177*a*. The peripheral side support bearings 176 are spaced apart from each other on respective left and right sides of the curved treadmill 170. Guide rollers 176*a* hold the belt 174 in place so it will not go erratically side to side. FIG. 10A also shows one way bearing 178 within house bearing 179, to keep the treadmill belt moving in one direction, while the runner runs on the treadmill. For example, FIG. 1A shows runner 36 running in the direction 42. Therefore, the treadmill belt 26 moves in an opposite direction under the runner's feet. The pulley shaft of the rear pulleys 172 goes through the one way bearing 178, which is attached to side frame 177. One way bearing 178 can be provided as a single one way bearing attached to one side frame 177, or a pair of one way bearings can be provided each on the respective opposite side frames 177.

Unlike in FIG. 10A, where a single set of guide rollers 176*a* are provided, FIGS. 10AA-10AA6 show a further alternate embodiment with two adjacent sets of guide rollers 176*b* and 176*c*, wherein brackets 176*d* hold selected pairs of staggered rollers 176*c*, whereas other selected staggered rollers 176*c* are connected by screws 176*e* and nuts 176*f* directly to frame 177. Guide rollers 176*c* are staggered from adjacent guide rollers 176*b* to provide better support for the treadmill slats and to prevent the belt from moving side to side.

Figure 10B:
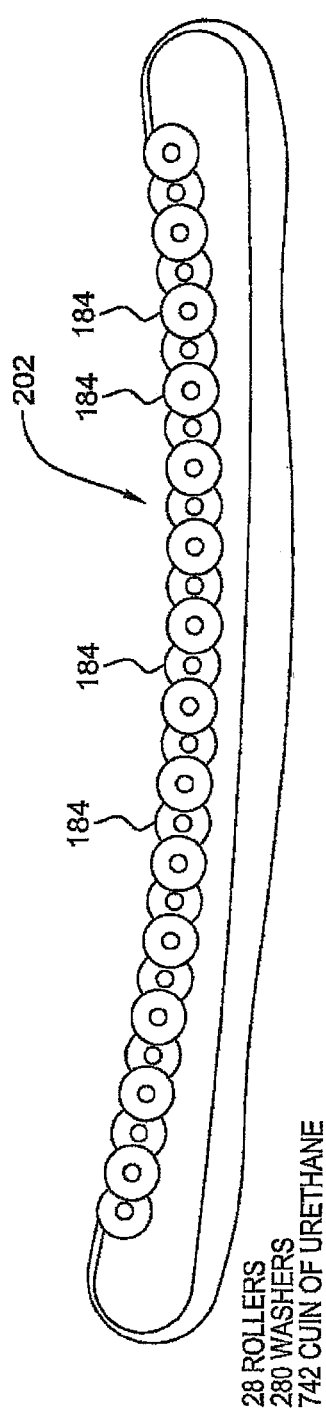
FIG. 10B is a side elevation view of an embodiment with a curved array of staggered nested roller wheels.
Figure 10C:
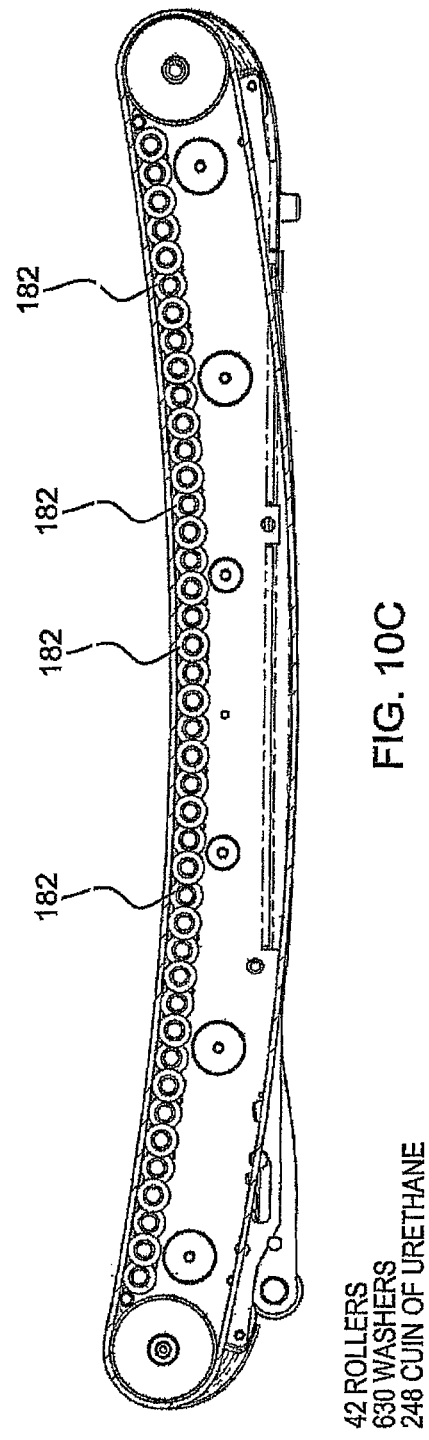
FIG. 10C is a side elevation view of an embodiment with a curved array of support shafts for the array of staggered nested roller wheels.
Figure 10B:
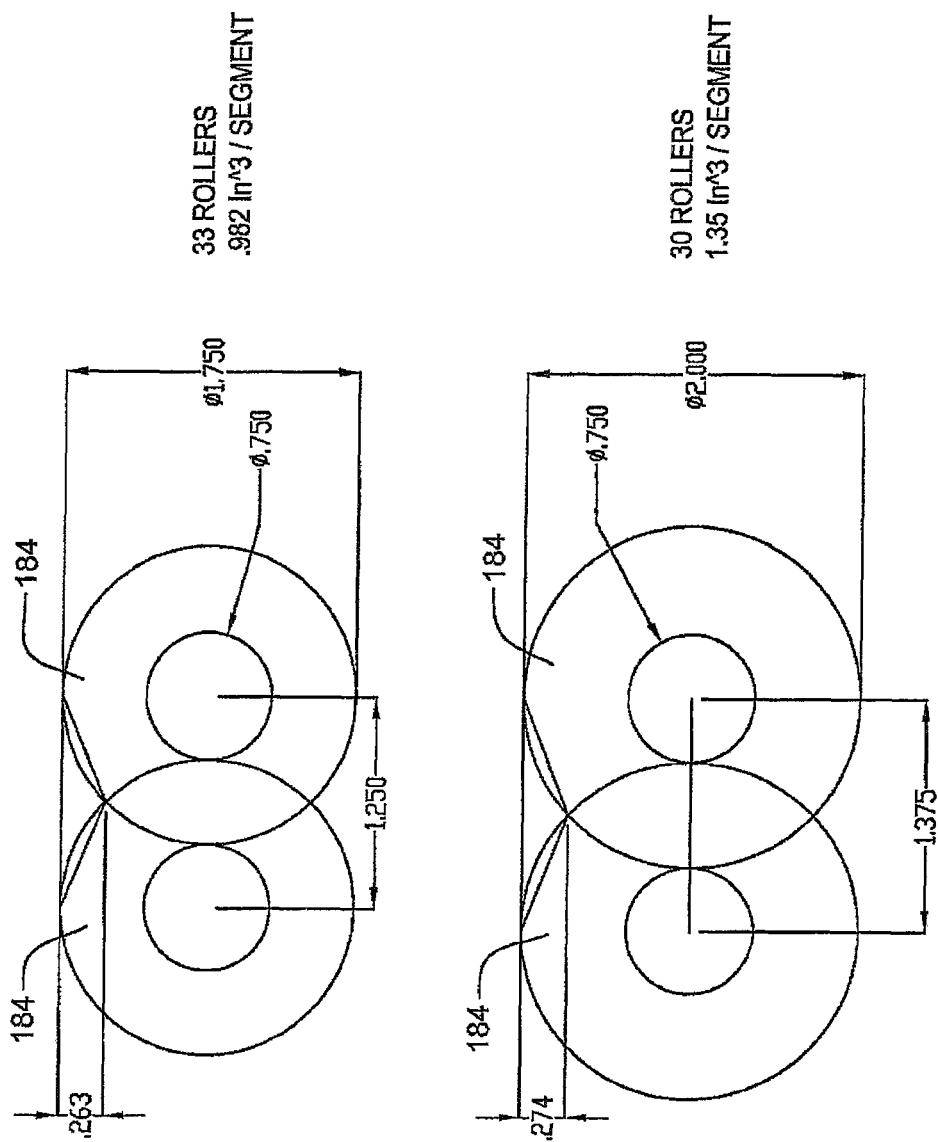
Figure 10D:
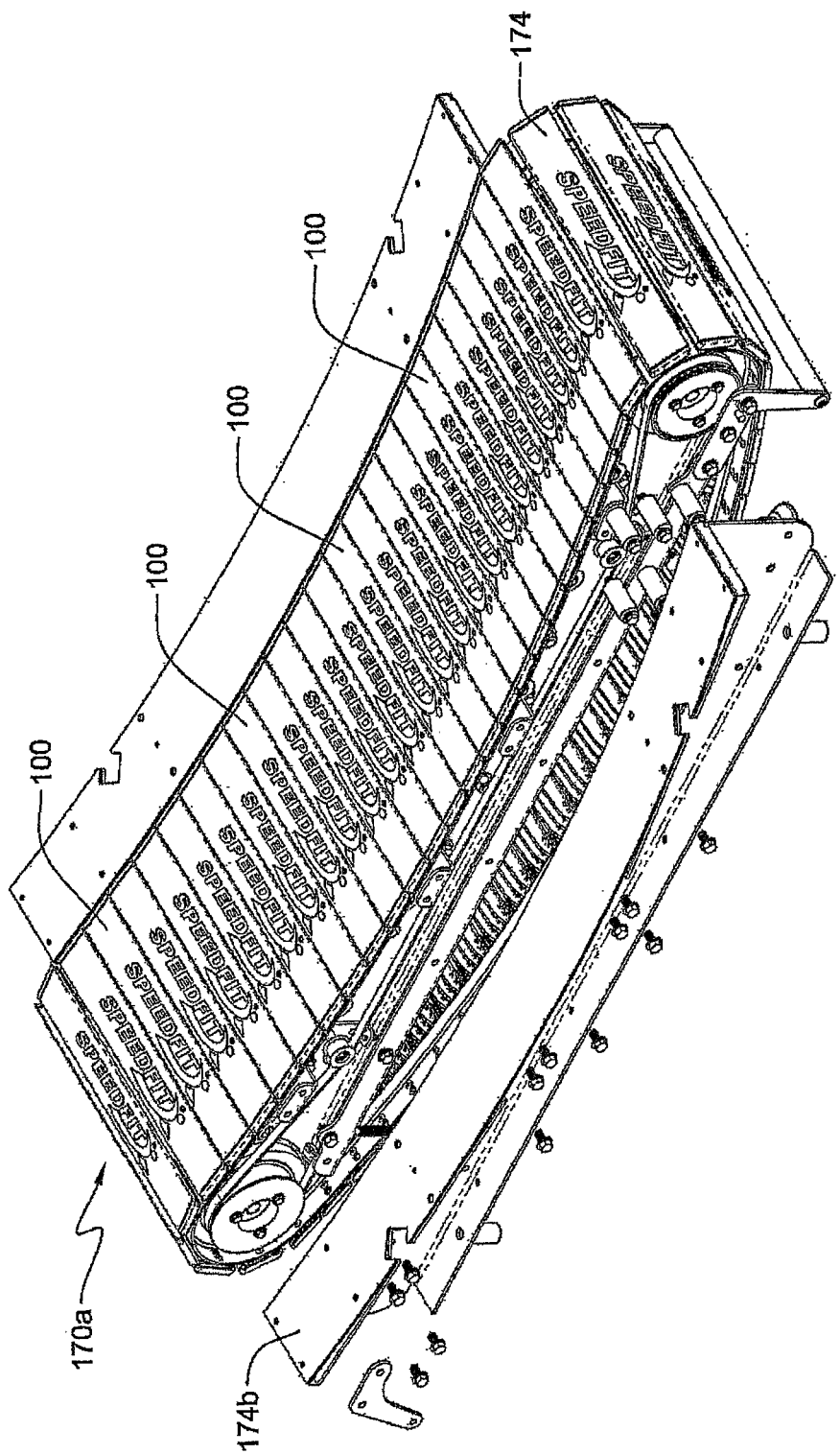
FIGS. 10D and 10E are perspective views of an alternate embodiment for a leg powered treadmill with a drooping bottom section, as in FIG. 10, with an array of parallel slats as in FIGS. 7A and 7B.
Figure 10E:
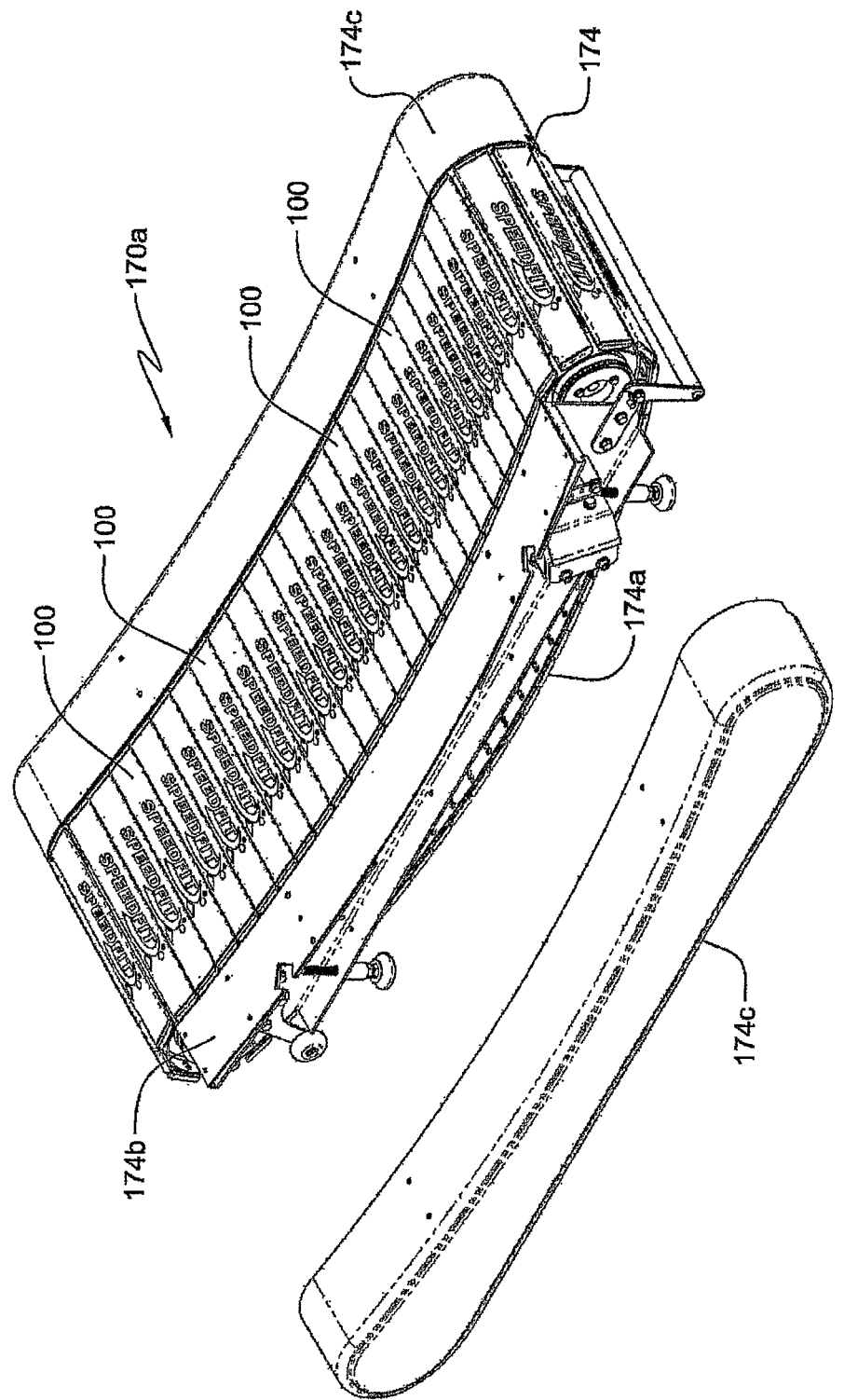
Figure 10F:
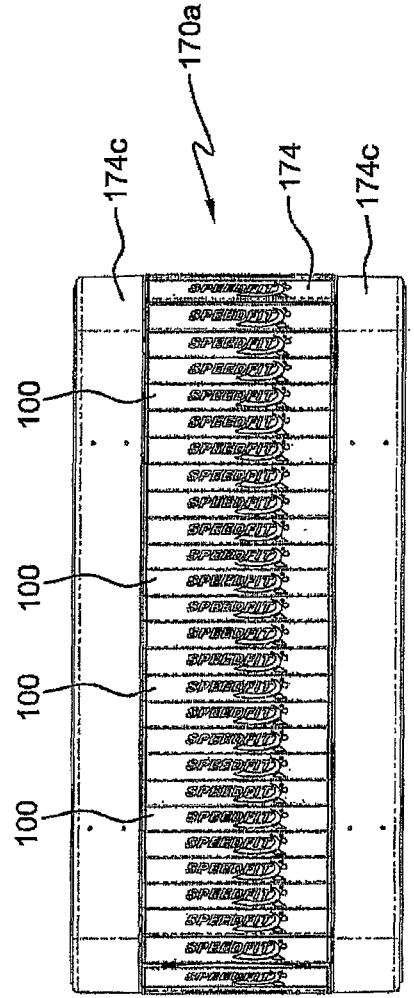
FIGS. 10F, 10G and 10H are respective top plan, side elevation and front views thereof.
Figure 10H:
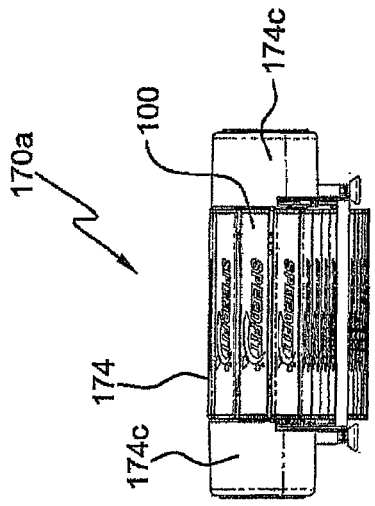
Figure 10G:
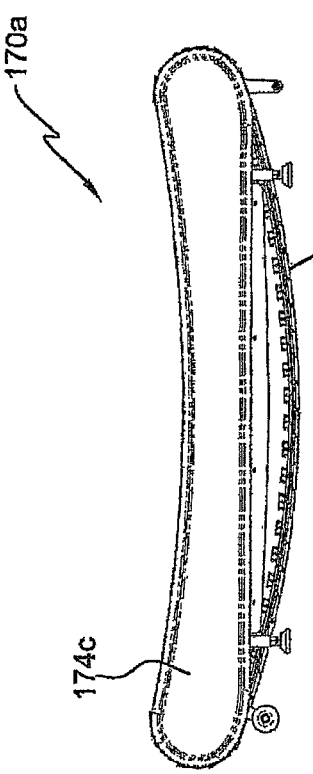

FIG. 10B shows an embodiment for a curved array of staggered nested roller wheels 184 and FIG. 10C shows a curved array of support shafts 182 for the array of staggered nested roller wheels 184 of FIG. 10B. FIG. 10BB shows staggered roller wheels 184 showing minimal dimensions between horizontal and vertical gaps between adjacent roller wheels 184, thereby rattle vibration of said rotating roller wheels 184 against a foot of a runner is minimized FIG. 10CC shows treadmill chassis 170*a* including side frames 177*aa* connected by one or more cross beams 177*bb*. Each side frame 177*aa* includes an array of holes 177*cc* in which shoulders 184*aa* of roller wheel members 184 rotate. Optional longitudinal brace 177*dd* may be provided, however, in a preferred embodiment no longitudinal brace is required. It is further noted that no timing belt is required to operate the treadmill. All that is required is an exterior belt, such as belt 202*a* of FIG. 15A.

FIGS. 10D, 10E, 10F, 10G and 10F show an alternate embodiment for a leg powered treadmill 170*a* with a belt 174 having a drooping bottom section 174*a*, as in FIG. 10, but with an array of parallel slats 100 as in FIGS. 7A and 7B. Treadmill 170*a* also includes side support frame members 174*b*, covered by side edge covers 174*c* for easy of mounting and dismounting from belt 174. While parallel slats preferably have each a plurality of descending fins, optionally the slats can be provided with a single descending fin.

FIGS. 11 and 12 show some prior art considerations comparing parallel rollers 181 with nested wheels 184. In FIG. 11 rollers 181 cannot be closer than D1 since some clearance must be allowed; whereas nested wheels 184 can be closer than D2, since clearance is between outside diameter of wheel 184 DW and shaft diameter DS. FIG. 12 shows an array of wheels 184 and shafts 182. In the prior art use for gravity or manual conveyors, each wheel 184 in the array is free-wheeling in its own bearing. Low inertia as afforded by individual bearings on wheels is an advantage here. In a preferred embodiment, the rollers are about ½ inch in thickness and are spaced apart from each other by a distance of about ½ inch. These dimensions may vary. The roller wheels 184 are staggered to minimize the horizontal and vertical gaps between adjacent overlapping roller wheels 184 created by one descending surface of a roller wheel 184 from its apex and one ascending surface of an adjacent roller wheel 184 to its respective apex, thereby rattle vibration of said rotating roller wheels 184 against a foot of a runner is minimized.

Figure 13:
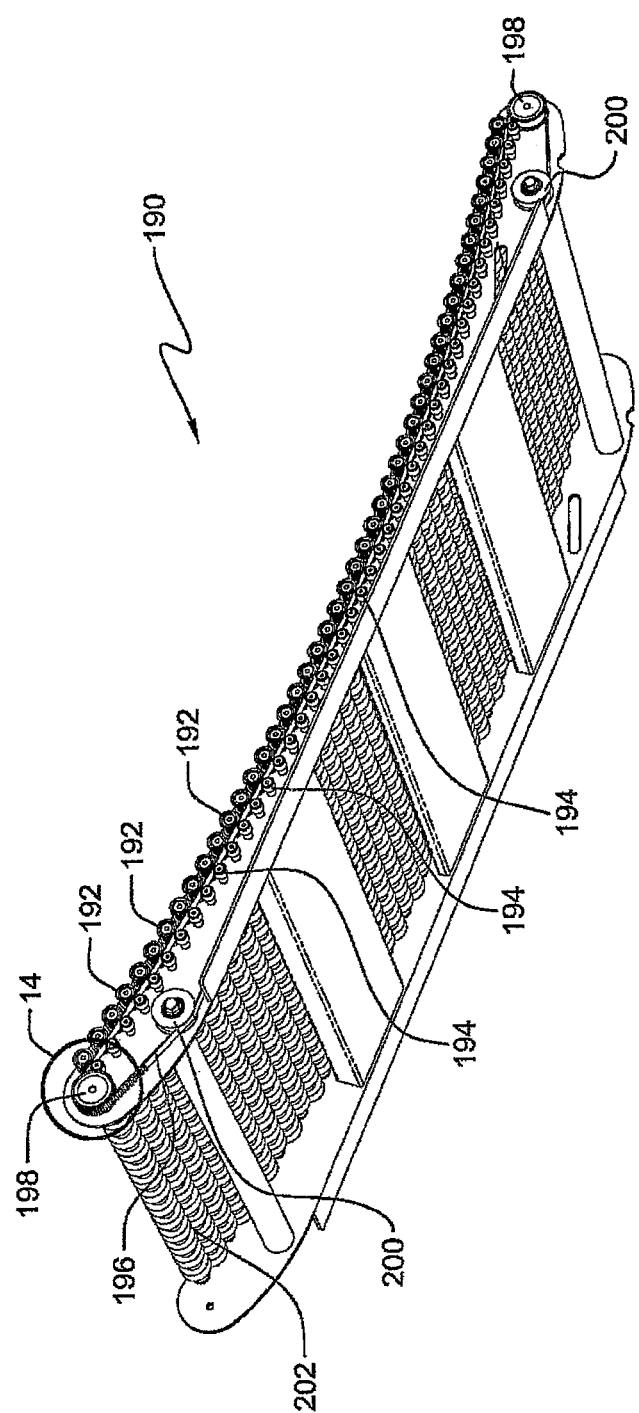
FIG. 13 is a perspective view of the chassis of a treadmill using a curved array of nested wheels interconnected by a timing belt.
Figure 13A:
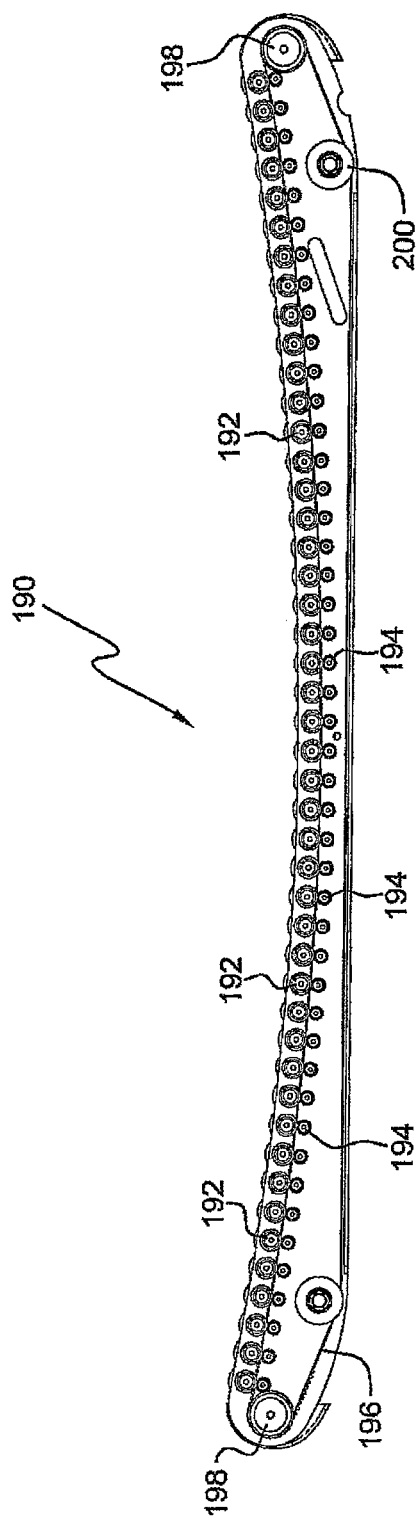
FIG. 13A is a side elevation view of the chassis of the treadmill as in FIG. 13, shown with the timing belt.
Figure 14:
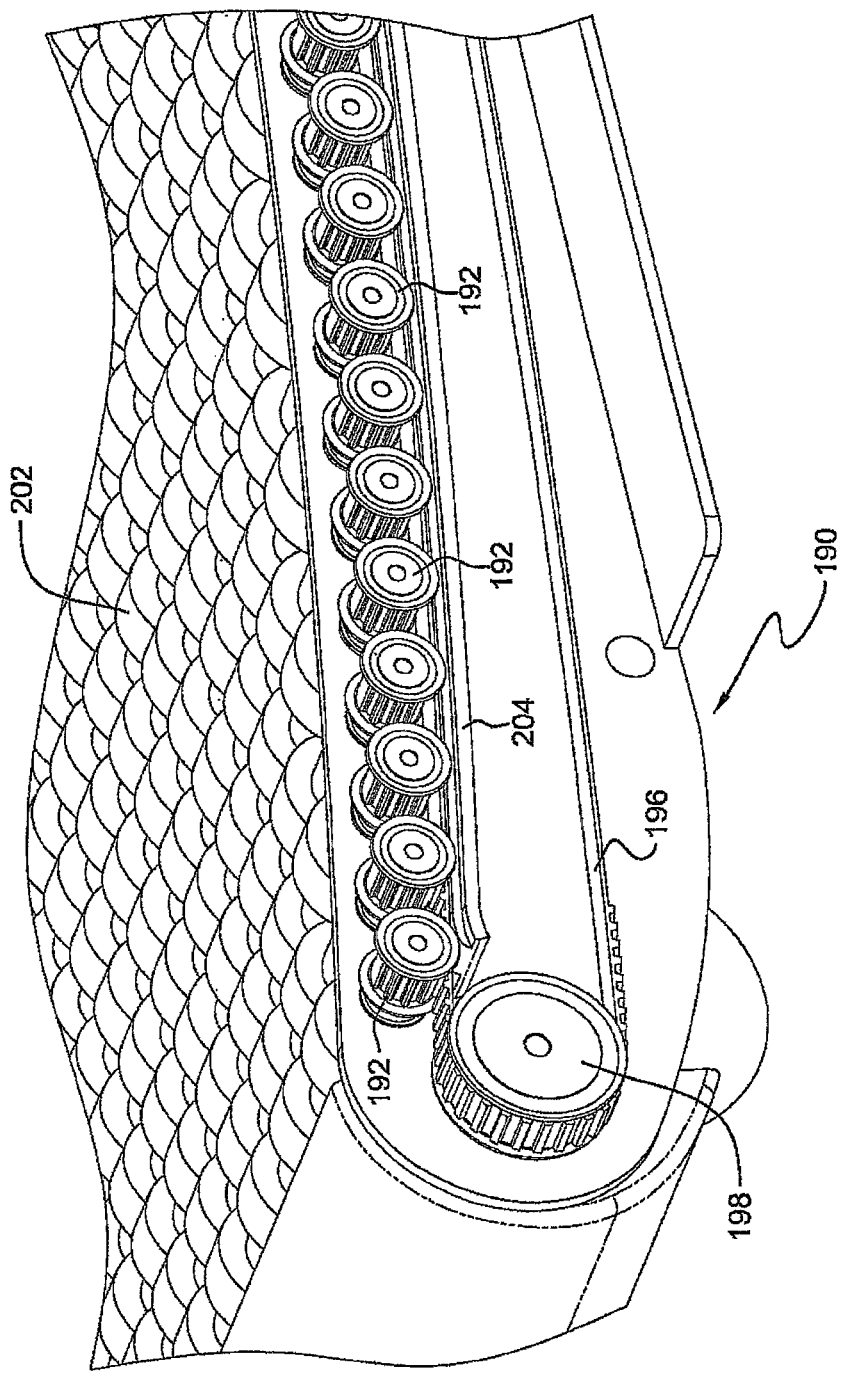
FIG. 14 is a detail related to FIG. 13 showing a close-up of an alternate embodiment for the nested wheels and timing belt, with upper rollers and a lower support plate for the timing belt.

FIGS. 13, 13A and detail FIG. 14 show a chassis 190 of a treadmill with a curved upper surface nested wheel array 202. Wheels 184 which form array 202 are bonded to parallel shafts which extend out on one side of frame to end in timing belt pulleys 192. Long timing belt 196 rotates around main timing belt pulleys 198 and engages all shafts such that if only one wheel 184 of array 202 is turned, all wheels of the entire array 202 turn. This multiplies the inertia resistance many fold which is the desired situation here. Minor details are different in the two views showing possible alternatives. In FIG. 13 idlers 200 are used, but are eliminated in FIG. 14. Support rollers 194 are used under timing belt 196 in FIGS. 13, 13A and 13B, but in an option, a continuous support rail 204 is used in FIG. 14.

Figure 15:
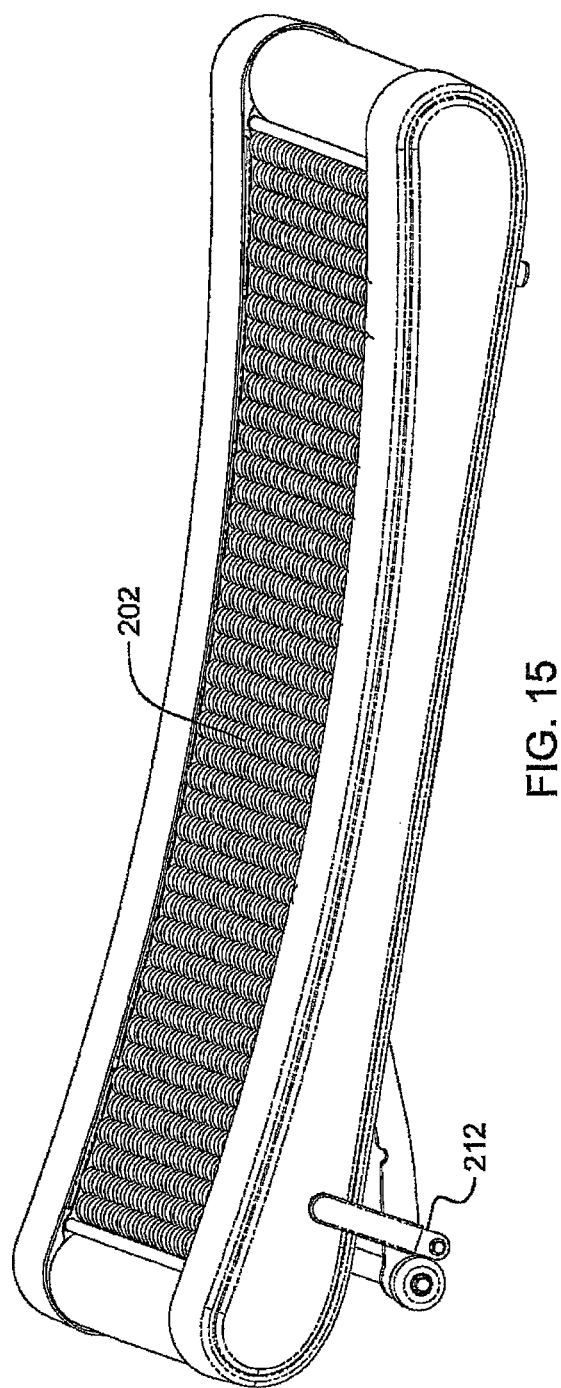
FIG. 15 is a perspective view of a treadmill with a curved surface of nested roller wheels used directly.

FIG. 15 shows completed treadmill 210 with exposed wheel array 202 and manually adjustable lift mechanism 212 at the front. Optionally the lift mechanism can be electrically powered, as disclosed in FIGS. 20 and 21.

Furthermore, when the runner touches the running surface of rollers 194 with the runner's foot, because of the timing belt 196, it catches. As soon as the runner gets running, the timing belt 196 gets engaged between footstep contacts, so the roller wheels 184 or 202 are freely spinning, but when the runner's foot touches the roller wheels 184 or 202, the roller wheels 184 or 202 spin with more force.

Figure 16:
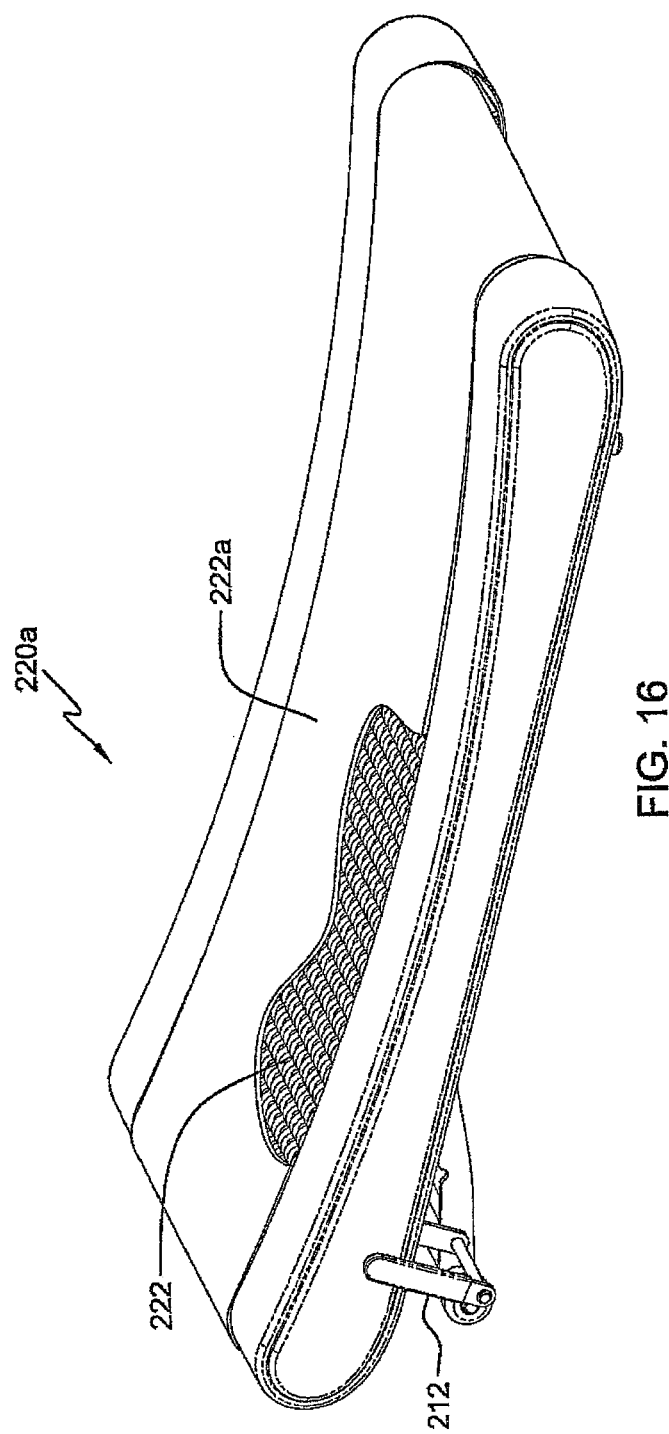
FIG. 16 is a perspective view of a treadmill with a curved surface of nested roller wheels used directly, or covered by an optional exterior running surface belt loop.

FIG. 16 shows a treadmill 220 with a curved surface of nested roller wheels 222 as a foot contacting direct running surface, with a manually adjustable lift mechanism 212 at the front. Optionally the lift mechanism can be electrically powered, as disclosed in FIGS. 20 and 21. FIG. 16 also shows a treadmill 220a with a curved surface of nested roller wheels 222, but with an optional exterior belt loop 222a functioning as a running surface.

FIG. 17 is a perspective detail of the treadmill of FIG. 16 showing the array of nested wheels with magnetic edge wheels and no timing belt use.

Figure 17A:
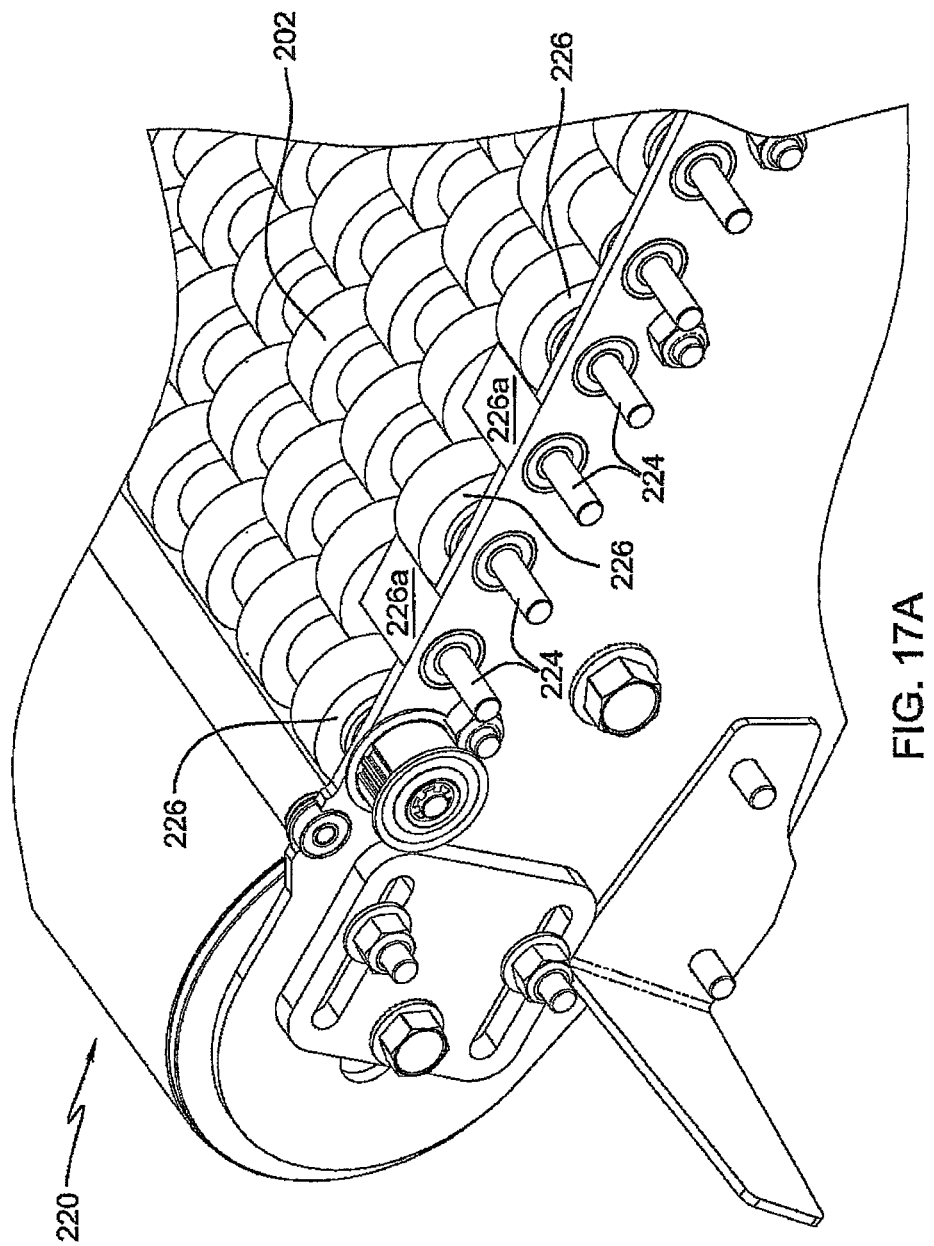
FIG. 17A is a perspective detail of the treadmill of FIG. 16 showing the array of nested wheels with small stationary bar magnets 226*a* shown attached to the frame between peripheral wheels.
Figure 18:
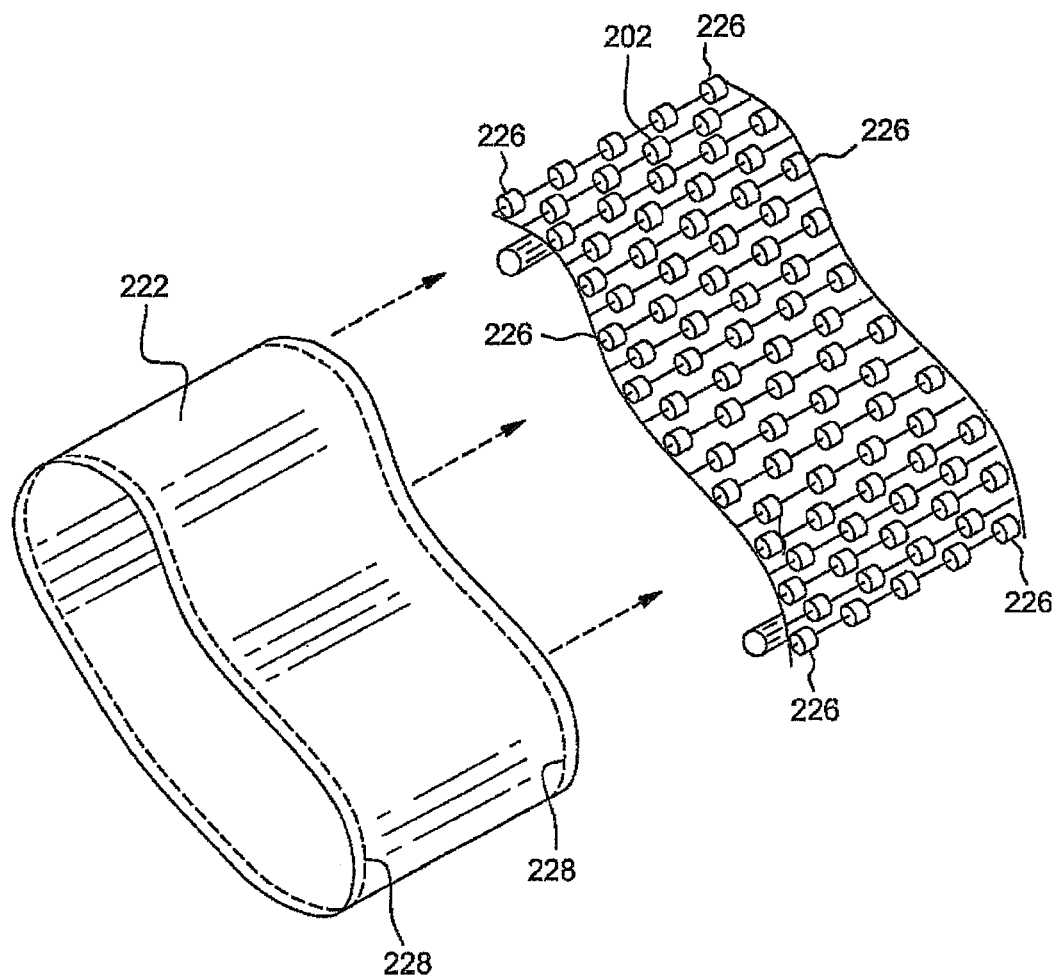
FIG. 18 is a perspective exploded view of a belt loop with embedded edge wire cable and its relation to a curved array of nested wheels with magnetic edge wheels.

FIG. 17 shows curved treadmill 220 with lightweight fabric or rubberized belt 222 looped over wheel array 202. FIG. 17 is a front detail internally showing that shafts 224 of array 202 do not sport timing belt pulleys. The shafts are interconnected by belt 222 instead thereby providing the same inertia coupling as in treadmill 210. Note that edge wheels 226 of array 202 are magnetic. When belt 222 is used over a curved array 202, some method of keeping it close to the surface of 202 is required. This is explained by the exploded view of FIG. 18 where it is shown that one or more parallel ferromagnetic cables 228 are embedded (or sewn into) the side edges of belt 222. They interact with magnetic peripheral wheels 226 to keep belt 222 from lifting away from array 202. Note that in lieu of magnetic wheels 226, as shown in FIG. 17A, small stationary bar magnets 226a can be attached to the frame between peripheral wheels 226 over the adjacent shafts. They would be attached slightly below the contact point of the adjacent wheels with belt 222. It is further noted that if no timing belt is provided, an exterior running surface belt is required. But if a timing belt 196 is provided, the treadmill can be provided either with an exterior loop belt 222 to run or, or the runner can run directly on the roller wheels 194 or 202, or if slats are provided, upon a slat belt, such as belt 174 of FIG. 10.

Figure 19:
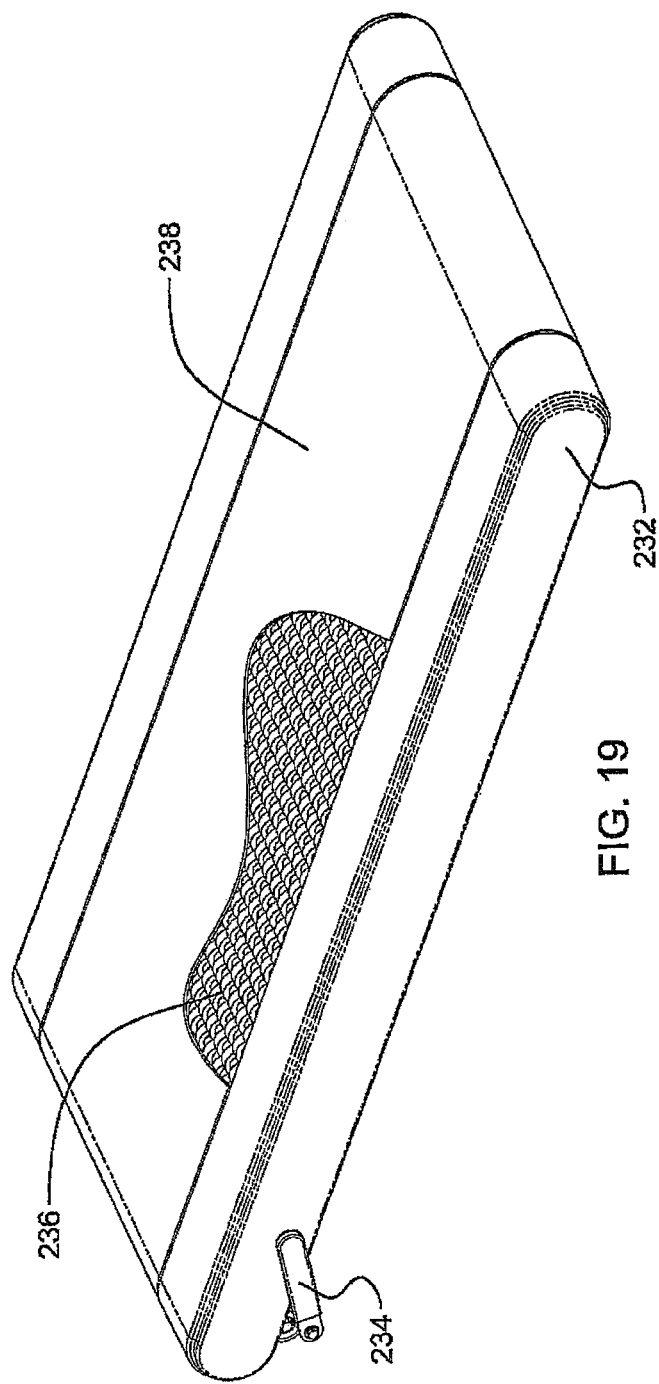
FIG. 19 is a perspective view of a flat treadmill with powered front strut using an array of nested wheels with a fabric belt.
Figure 20:
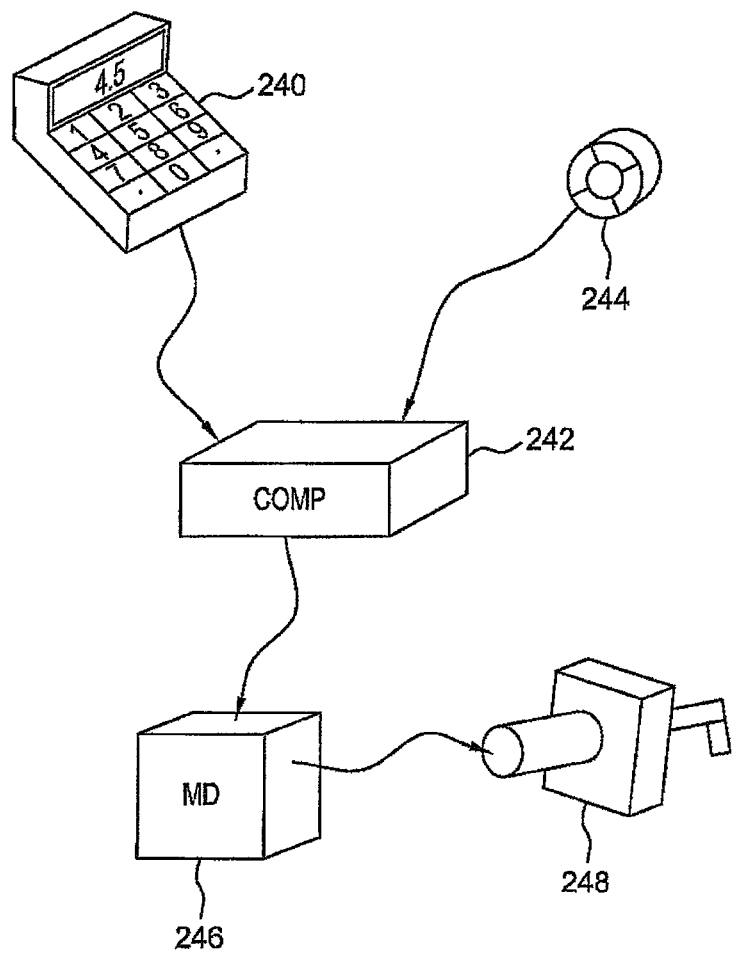
FIG. 20 is a block diagram of the major components of the elevation mechanism for the powered front strut of the flat treadmill of FIG. 19.
Figure 21:
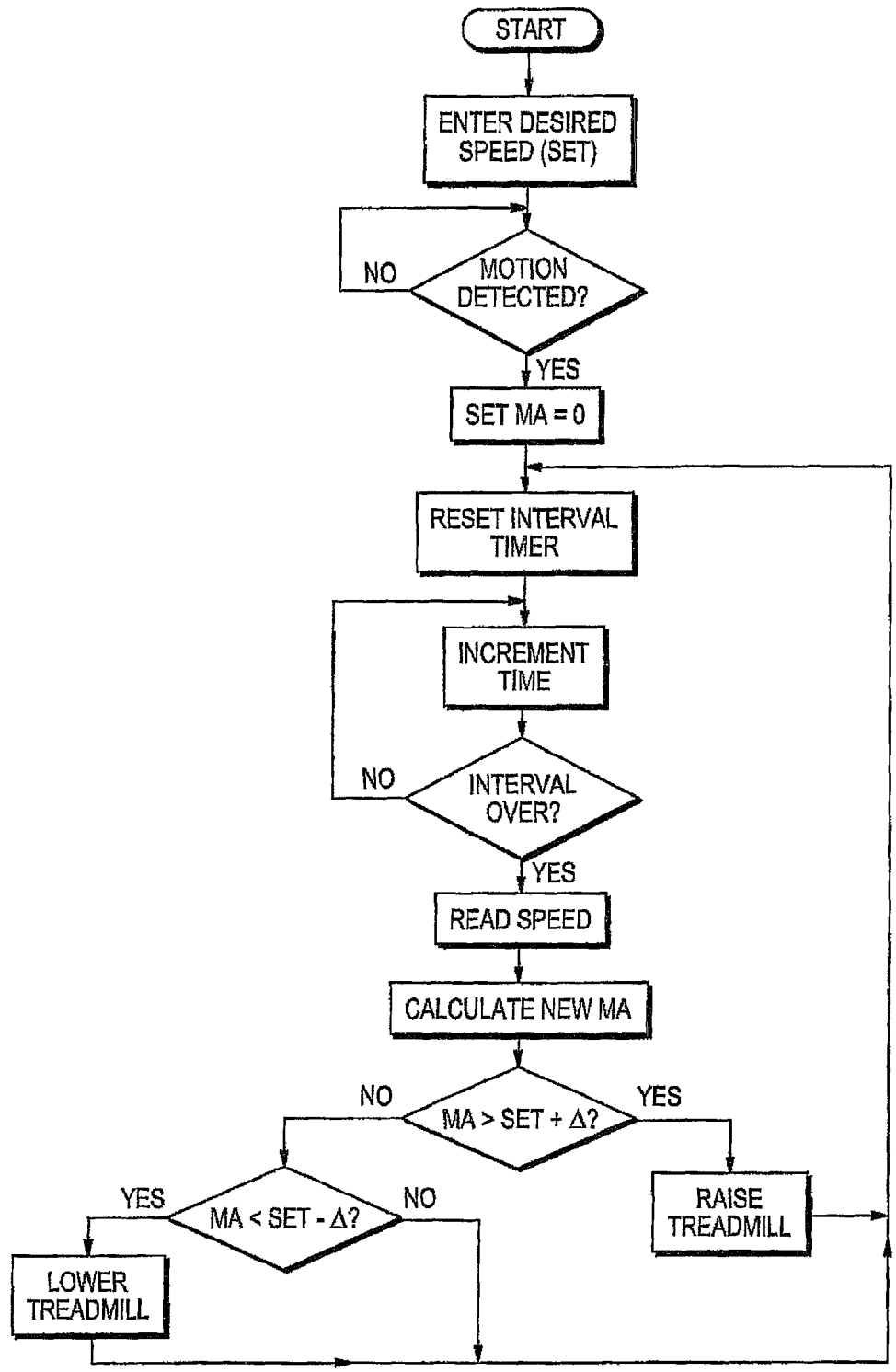
FIG. 21 is a high level flow chart of the control system for the elevation mechanism of FIG. 20.

FIG. 19 shows flat treadmill 230 that uses a flat array of nested wheels 236 with a light weight belt 239 coupling all wheels 184 in array 236. Note that belt 238 and array 236 need no magnetic elements to keep belt 238 snug against array 236 because a flat array poses no lift-off problem. However, since the technique of a runner choosing his "sweet spot" on a curved surface does not work on a flat surface, the elevation must be constantly changed as the effort changes if a constant speed is sought. Motorized dynamic front elevation strut 234 is provided. The computerized control is shown in FIG. 20 wherein numeric keyboard and display 240 is used to enter the desired speed. Speed sensor 244 monitors belt speed. Computer 242 runs a control algorithm as shown in FIG. 21 and signals motor driver 246 to drive motorized strut 248 in the appropriate direction to raise or lower the front of the treadmill. Either a reversible servo gearmotor or a stepper motor can be used to drive the strut through a non-backdriving gear set or linear drive such as a worm gear pinion or a lead screw. The flow chart of FIG. 21 is just one method that can be used to smooth out the control actions by calculating moving averages (MA) and only adjusting elevation if setting is out of the deadband around the desired speed setting (+–"delta").

FIGS. 22-26 illustrate three vehicle designs which derive their motive power from persons moving their legs on treadmill platforms built into the vehicles. The optional use of electric motor "hill assist" as powered from storage batteries is also included. Both curved and flat nested wheel arrays are used as drive platforms. Also, wheels 184 in the various platform arrays can be used with or without belt loop covers. If used without a belt loop cover, the timing belt coupling all array shafts is also used to convey power to the vehicle wheels. If a belt covering the platform array is used, the power to drive the vehicle wheels is delivered by the flat belt and no timing belt is used.

Figure 22:
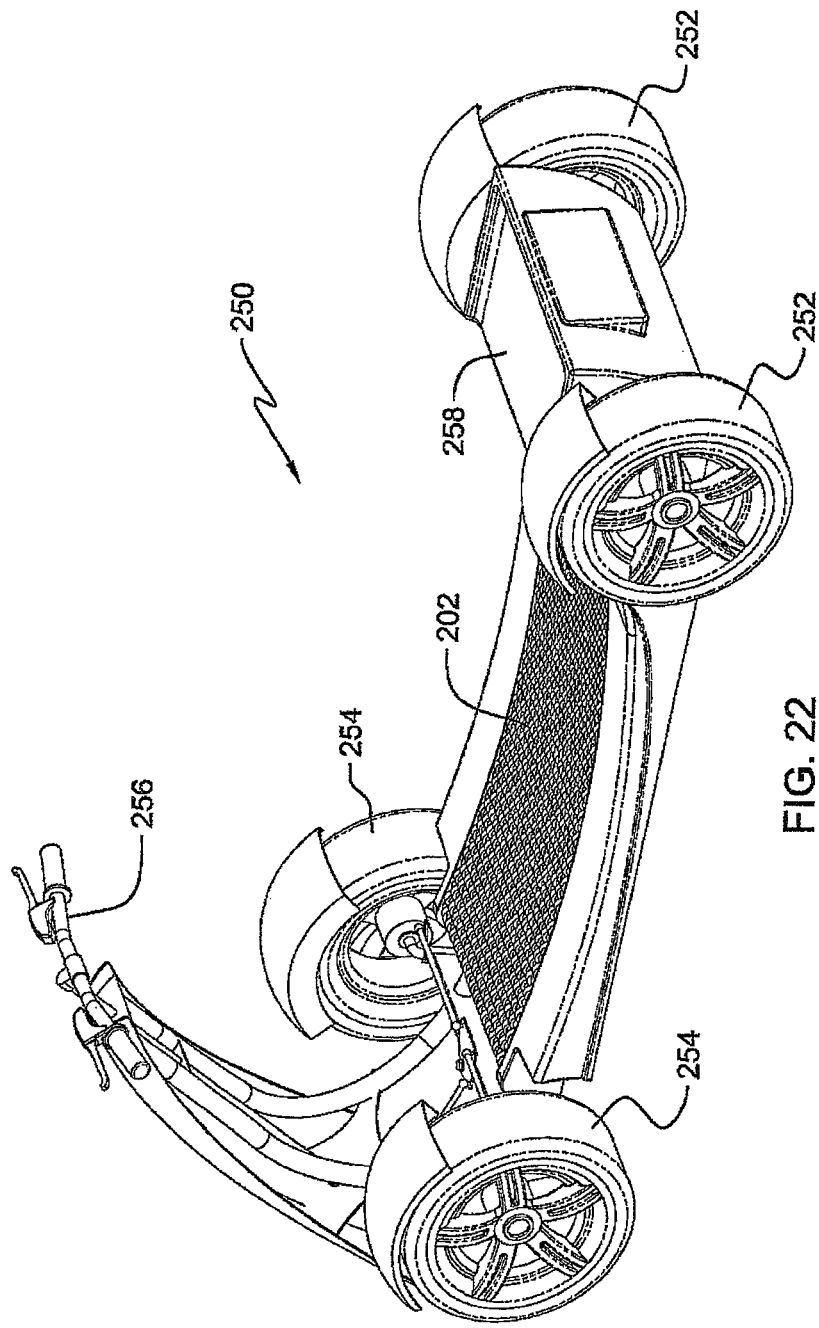
FIG. 22 is a perspective view of a single-person roadster vehicle using a curved array of wheels for its treadmill drive system.
Figure 23:
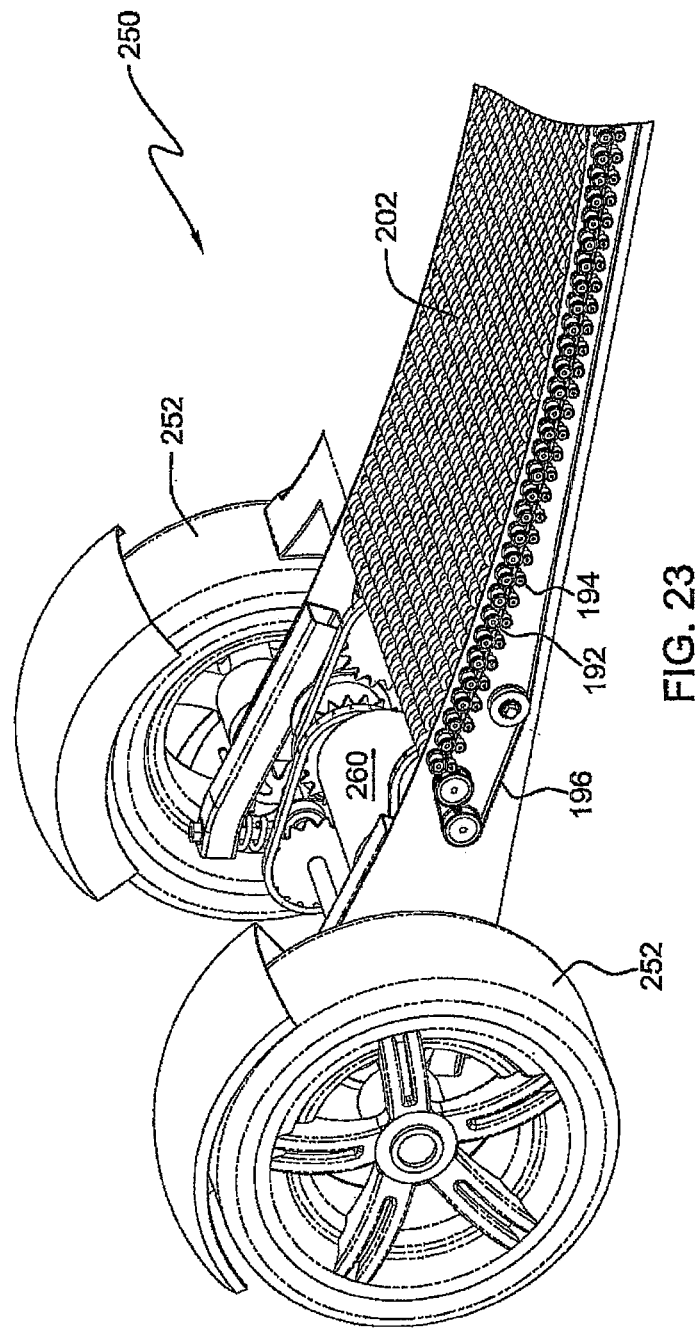
FIG. 23 is an interview of the rear of the roadster of FIG. 22 showing the timing belt.

FIG. 22 shows a one-person roadster 250 with front wheels 254, rear wheels 252, handle bars with brake levers 256 and "hill-assist" compartment 258. FIG. 23 is an internal rear detail showing "hill assist" motor 260 and timing belt coupling shafts of curved nested wheel array 202.

Figure 24:
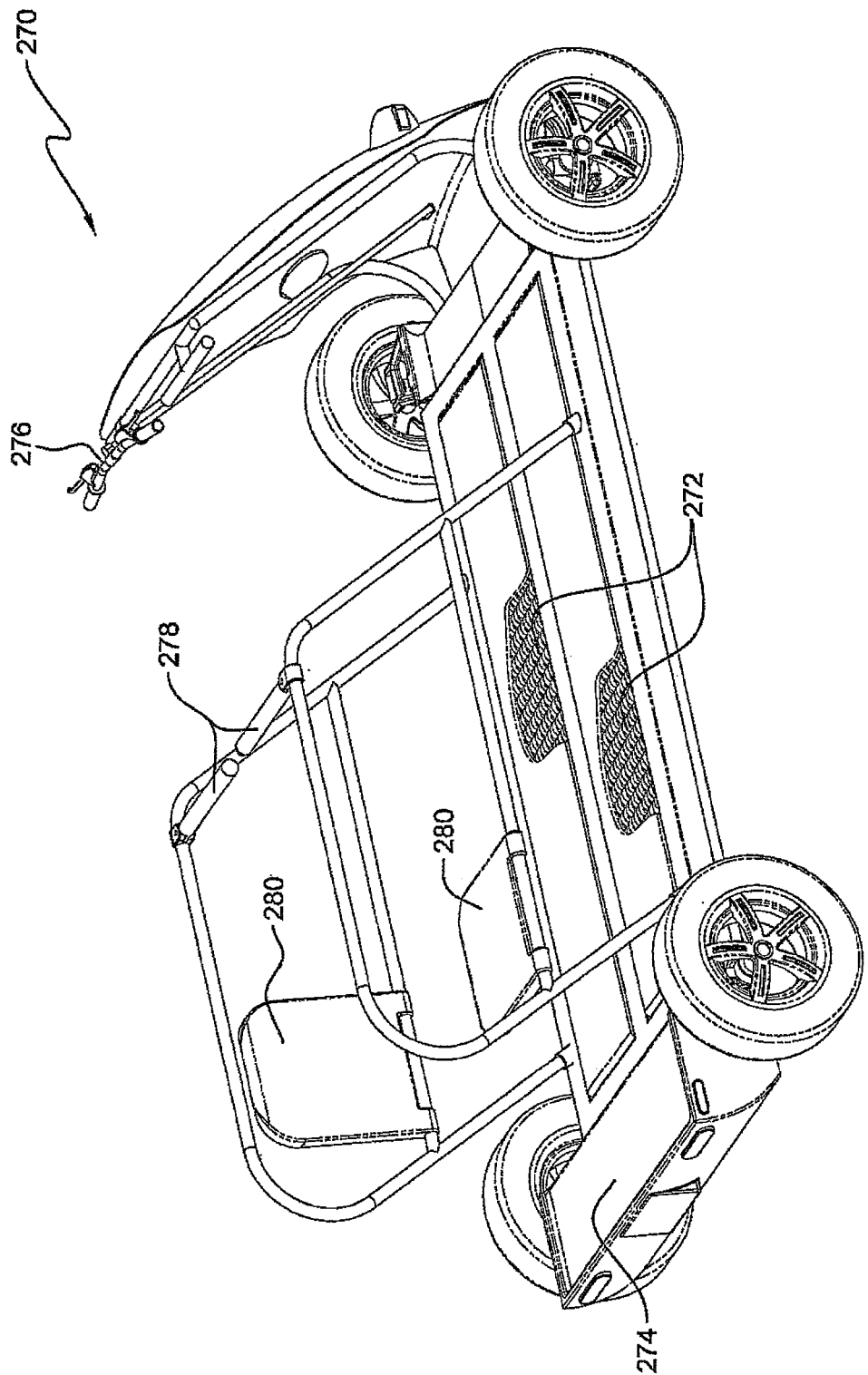
FIG. 24 is a perspective view of a 2-4 driver sedan vehicle with 2 seats for optional passengers.
Figure 25:
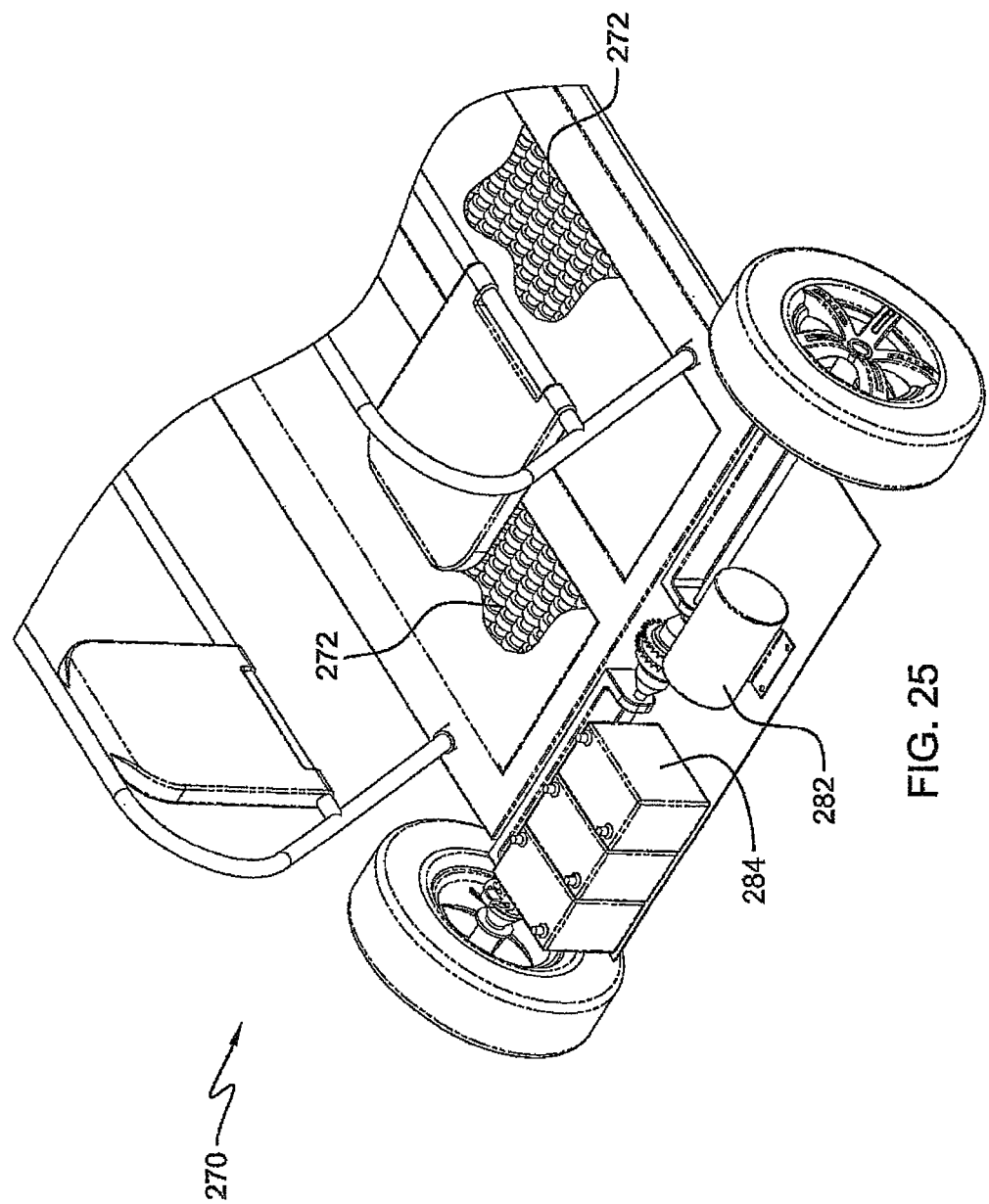
FIG. 25 is a perspective view of the rear section showing optional hill-assist motor and storage battery.

FIG. 24 shows a "sedan" 270 with places for four leg powering riders and two optional passengers. Two platforms 272 power the vehicle. Sedan 270 has steering handlebar 276 with brake caliper, passenger seats 280, and "hill-assist" motor/battery compartment 274. FIG. 25 shows the rear compartment cover removed revealing Battery pack 284 and motor 282.

Figure 26:
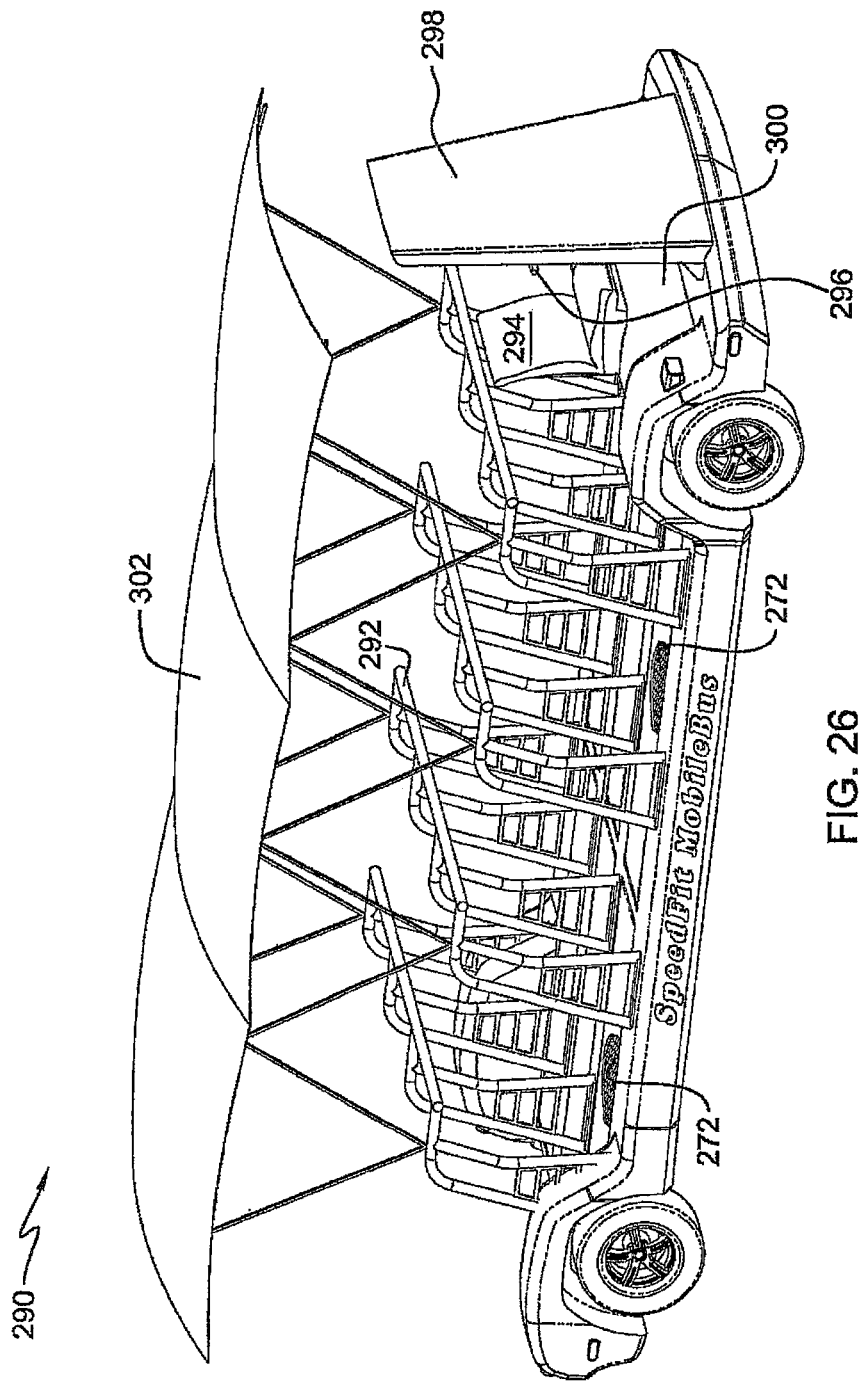
FIG. 26 is a perspective view of a leg-powered bus which can accommodate 12 leg-powering people with a separate driver for steering and brakes.

FIG. 26 shows a mini-bus 290 with places 292 for 12 individual leg powering riders, a separate driver's seat 294 with steering wheel 296 and windshield 298, "hill-assist" compartment 300 and a canopy 302.

While FIG. 25 shows battery pack 284 and motor 282 so that leg powered treadmill vehicles 270 and 290 can function to power the vehicles when desired, such as when encountering hills, or if the users need a rest, it is noted that such a hybrid dual power situation can be optionally provided with any of the treadmills in FIGS. 1-24 and 27 also. This is especially true for senior citizens who may want to switch from powering the treadmill by leg power, to a power assist mode during use, whether the treadmill is stationary as in FIGS. 1-23 and 27, or is a wheeled vehicle as in FIGS. 24-26.

As a further option related to motor 282, electric motor 282 can be placed over the front or back shaft of the front or rear pulley pairs, and is not connected to the belt directly, which can help older people to move the belt. But if the user touches the belt (any kind of belt, with the treads or roller wheels or otherwise) with the user's hand, the belt will stop, similar to the principle of a fan in a house, where if the user touches the palette of the fan, the fan stops. In this case with a treadmill, the motor 282 is added to help not to directly drive the belt; actually motor 282 is not directly connected to the belt. Motor 282 is just mounted over one of the pulley shafts, with zero friction and motor 282 can be used to help propel the tread belt or regular belt or can be used to create energy to power a generator, such as a dynamo, by converting the mechanical power and converting it to low voltage direct current (DC). Power or high voltage (AC) to power at least one load, such as small appliances, for example, lights. Alternatively, if the motor 282 is not used at all, the mechanical power produced by the moving treadmill belt can power a generator to create electricity, such as low voltage direct current (DC) Power or high (AC) voltage.

A further method of keeping the lower portion of the belt taut while permitting the upper portion to be slack is to slow down the rear roller wheel by exerting resistance via magnets or otherwise to the rear roller wheel.

Figure 27:
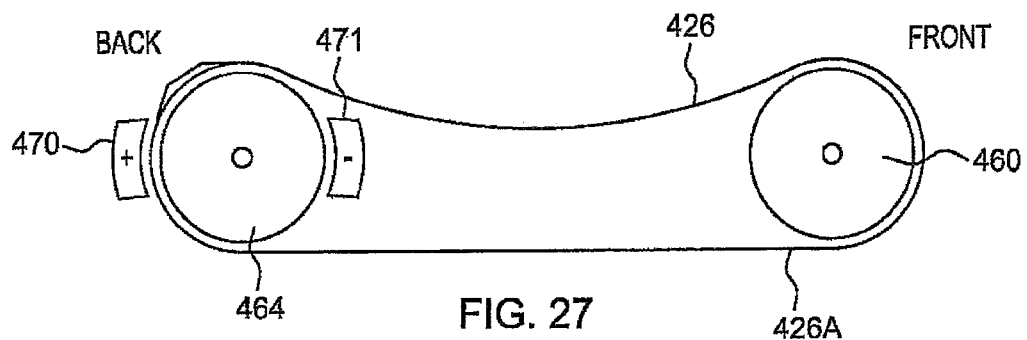
FIGS. 27, 27A and 27B are diagrammatic side views of an alternate embodiment for implementing the present invention.
Figure 27A:
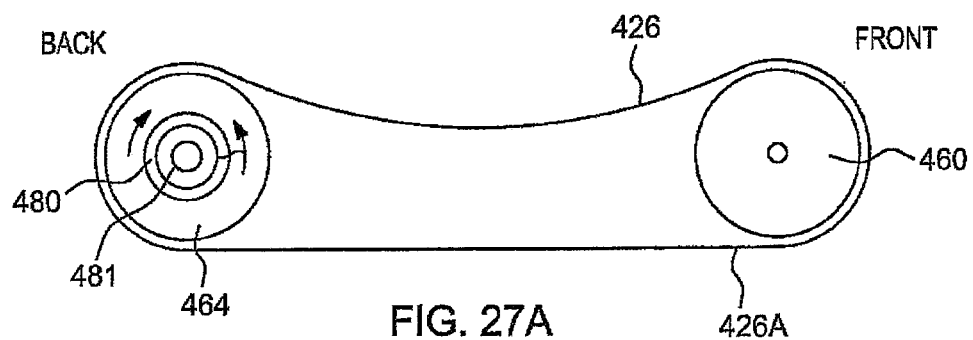
Figure 27B:
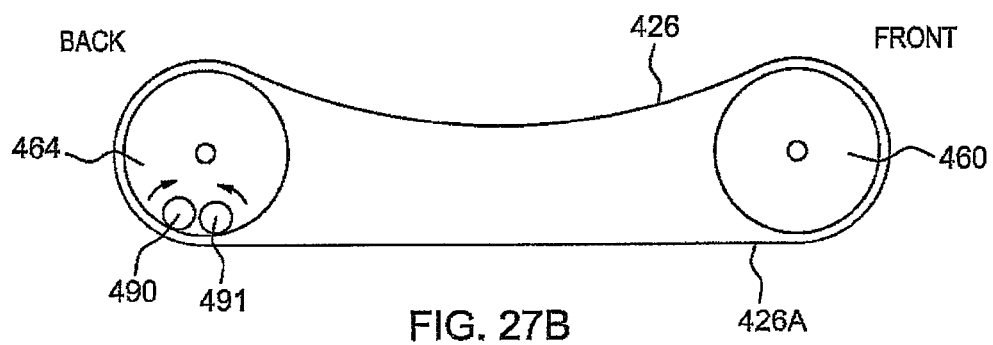

FIGS. 27, 27A and 27B are diagrammatic side views of an alternate embodiment for implementing the present invention.

In another method shown in FIGS. 27, 27A and 27B, the lower portion of 426A of continuous treadmill belt 426 is kept taut while upper portion 426B is slack by providing resistance to rear roller 464 by opposing magnet pairs 470, 471; 480, 481 or 490, 491, where opposing magnet pairs exert magnetic resistance against rear roller 464, so that rear roller 464 rotates slower than front roller 260.

In FIG. 27, opposite magnet pairs 470, 471 are analogous to wheel brake calipers, providing resistance to rear roller 464, so that it moves slower than front roller 460, which quickly pull lower portion 426A of treadmill belt 426, rendering it taut. Likewise, because rear roller 464 moves slower, top treadmill portion 426B is slowed down, and is rendered slack and concave until it wraps around slower rear roller 464.

In FIG. 27A, magnets 480, 481 rotate in parallel planes adjacent to rear roller 424.

In FIG. 27B, the opposite magnets 490, 491 roll adjacent to each other to impart magnetic resistance to slower rear roller 424.

Figure 28:
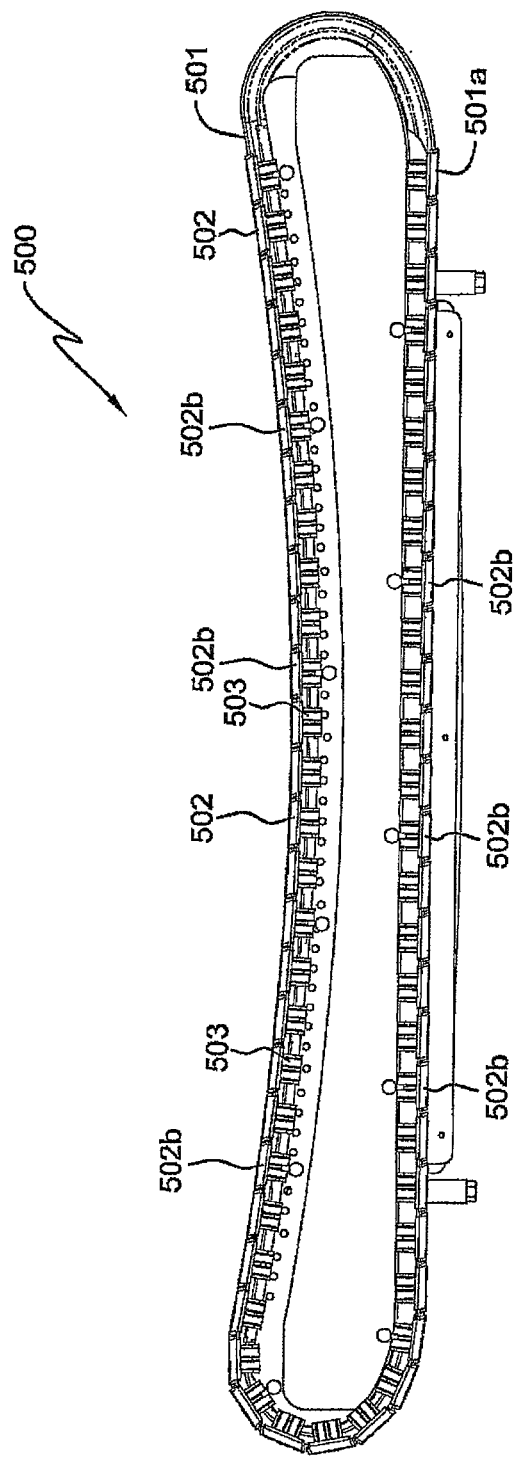
FIG. 28 is a side elevation view of an alternate embodiment for a tread belt system which keeps the lower portion of a rotating belt horizontally oriented, thereby minimizing vertical height required above the floor upon which the treadmill is placed.
Figure 28A:
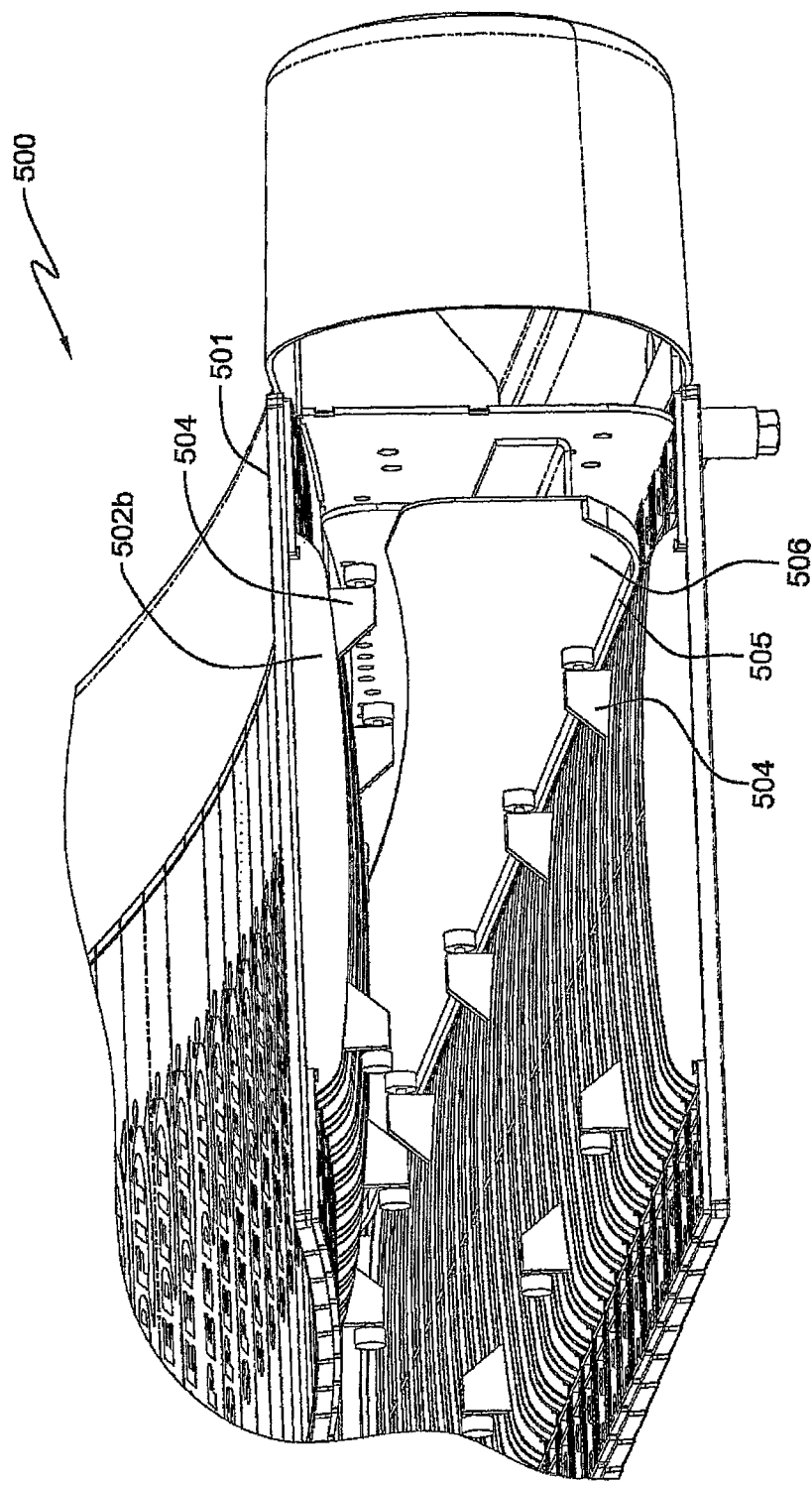
FIG. 28A is a close-up detail view of the tread belt system of FIG. 28.
Figure 28B:
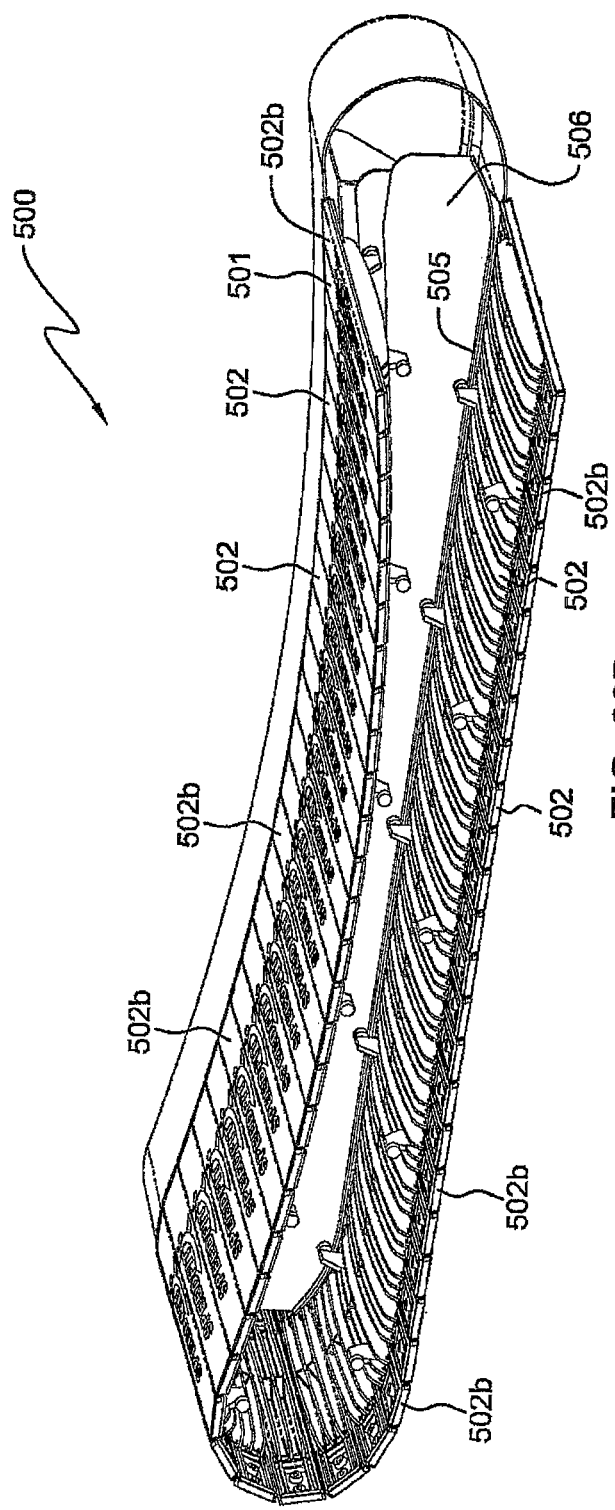
FIG. 28B is a perspective view in partial cutaway cross-section of the tread belt system of FIG. 28.

In an alternate embodiment shown in FIGS. 28, 28A and 28B, a system 500 is provided to keep the bottom of the belt 501 flat, so that the drooping portion does not take up significant height above the floor upon which the treadmill 500 is placed.

Therefore this embodiment for a tread belt system provides the running surface for a non motorized treadmill, where the running surface is made up of a plurality of molded treads 502 (i.e. slats), connected on each end of the tread (i.e. slat) with a flexible continuous belt, that is supported along the top (running) surface of the treadmill by a plurality of fixed bearings 503 that contact the continuous belt 501 and thus support the weight of the runner.

At each end of the treadmill, a set of pulleys support the continuous belt 501 and provide a continuous path. With this system, the lower half 501a of the belt 501 hangs underneath the frame in a uniform catenary manner. This invention serves to support the lower half 501a of the belt tread (i.e. slat) system, such that the lower half 501a fauns a flat uniform surface and does not droop or hang below the frame of the treadmill. While as few as one pair can be used, preferably some of the treads 502b (an equal number such that some uniform number are evenly distributed) are equipped with a bearing roller appendage 504 on each end of the tread (i.e. slat) that will serve to support the tread belt system as it hangs below the frame of the device. A supporting rail with a bearing support flange 505 is provided on each side of the frame 506 of the device to provide a running surface for the tread bearing rollers, such that the tread belt system is supported and prevented from hanging in a catenary fashion between the treadmills end pulleys. The flanged surface 505 at each end of the supporting rail is provided with a runout surface such that the recirculating treads 502 and 502b (i.e. slats) make a smooth transition from support provided by the end pulleys to the flat surface 505 provided by the supporting rail.

Figure 28C:
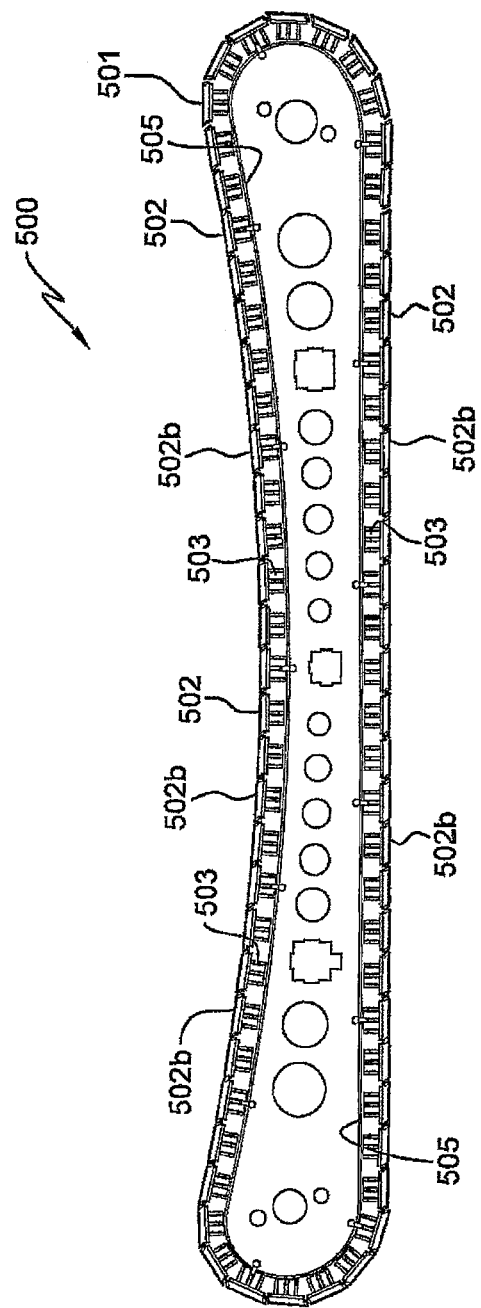
FIG. 28C is a side elevation of the embodiment of FIG. 28, showing the complete continuous loop bearing support flange.

FIG. 28C shows the treadmill of FIG. 28, but with all of the outer surface removed, so that all of the continuous loop flange 505 is displayed.

Figure 28D:
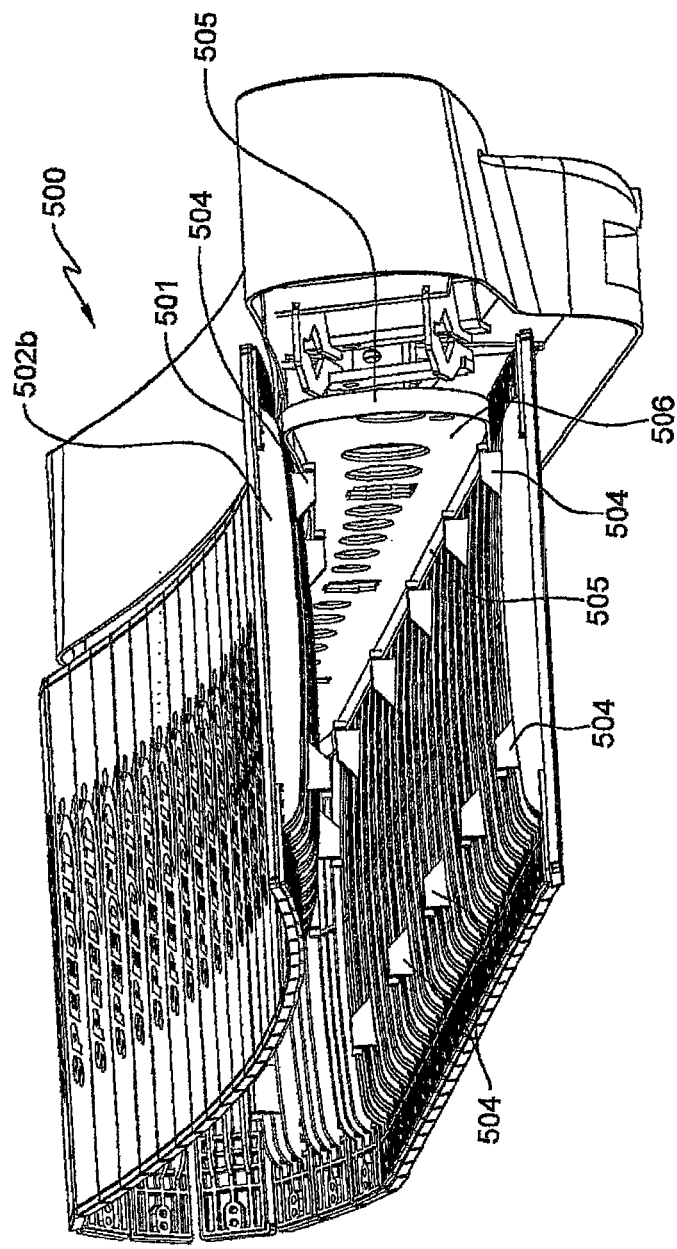
FIG. 28D is a close-up detail view of the embodiment shown in FIG. 28C.

While the partial crossectional view of FIG. 28A shows the lower flat portion of the continuous loop flange 505 supporting the lower displayed bearing roller appendages 504, in FIG. 28D there is shown the full forward appendages portion 505a of the continuous loop flange 505, as well as a portion of the top of continuous loop flange 505, supporting respective bearing roller appendages 504 of slat trends 502b as they traverse the curved upper portion of the treadmill belt 501 of treadmill 500, having fixed bearings 503.

Figure 28E:
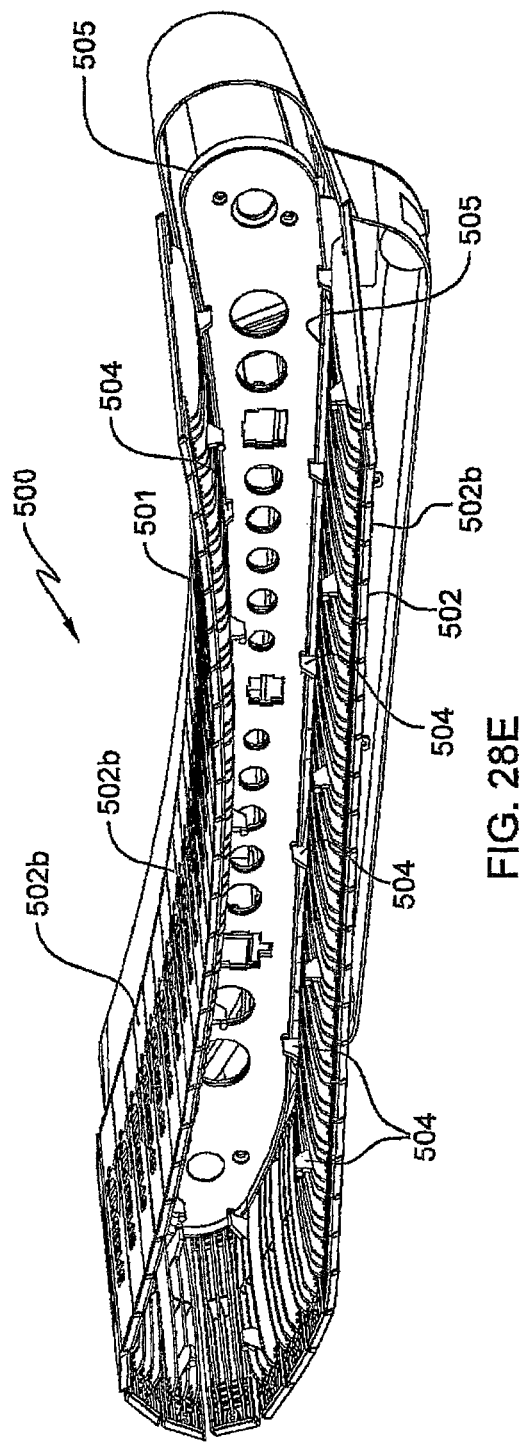
FIG. 28E is a perspective view of the embodiments of FIGS. 28C and 28D, showing the complete continuous loop bearing support.

FIG. 28E shows the treadmill belt system 500, as in FIG. 28B, but where more of the continuous loop flange 505 is exposed, supporting the bearing roller appendages 504 on all portions of the flange 505, including on the flat bottom portion thereof and the curved top potion thereof.

Figure 29:
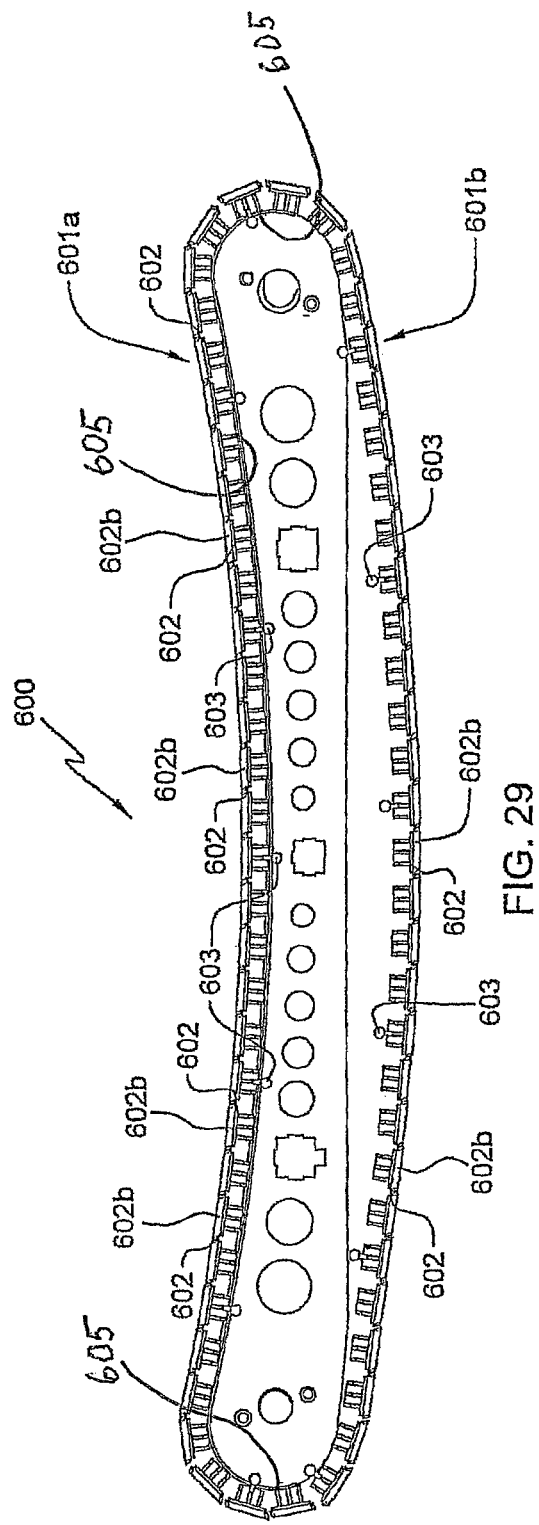
FIG. 29 is a side elevation view of an alternate embodiment for a tread belt system which keeps the lower portion of a rotating belt drooping in a catenary curve.
Figure 29A:
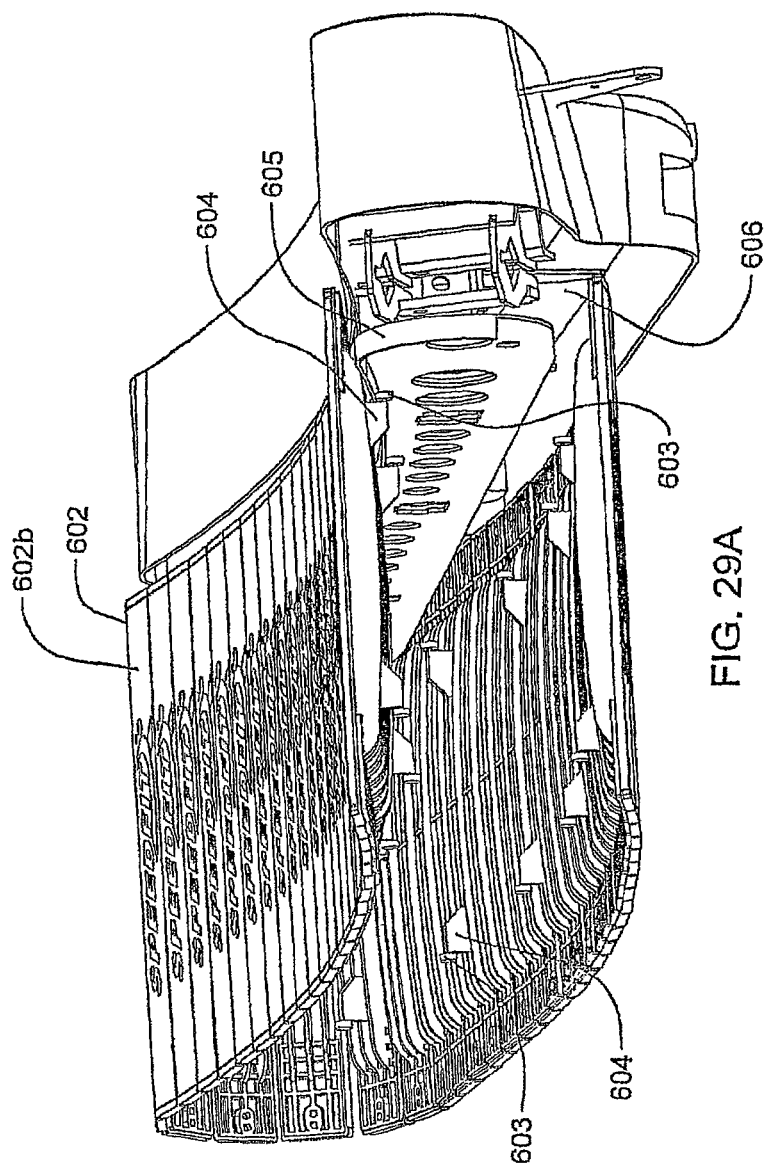
FIG. 29A is a close-up detail view of the tread belt system of FIG. 29.
Figure 29B:
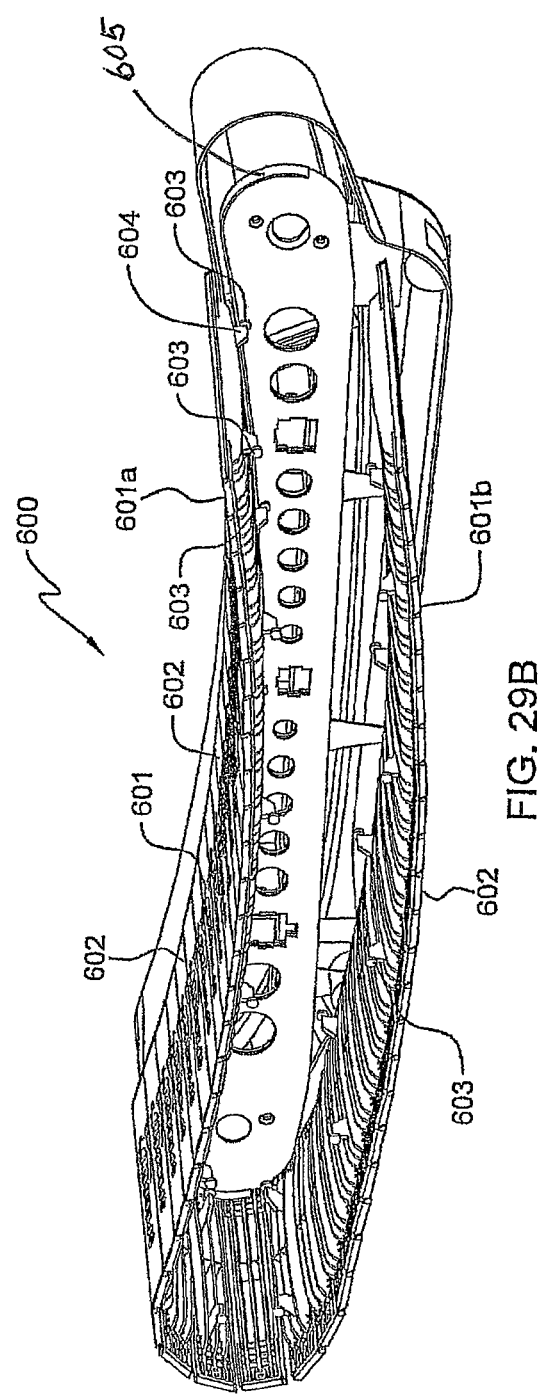
FIG. 29B is a perspective view in partial cutaway cross-section of the tread belt system of FIG. 29.

FIGS. 29, 29A and 29B show an alternate embodiment for a tread belt system 600 which keeps the lower portion of a rotating belt drooping in a catenary curve. This occurs because the partial loop flange 605 is not a continuous loop flange, like continuous loop flange 505 of FIGS. 28, 28A, 28B, 28C, 28D and 28E, which is adjacent to the upper and lower portions of the treadmill belt 501 of tread belt system 500. In contrast, the partial loop flange 605 is only adjacent to an upper portion 601a of belt 601 of tread belt system 600. In that manner, the lower portion 601b of treadmill belt 601 droops below in a catenary curve, similar to the catenary curved lower portion 157 of treadmill belt 150 of FIG. 9, or the catenary curved lower portion of treadmill belt 174 of FIG. 10.

Therefore this alternate embodiment for a tread belt system 600 provides the curved upper running surface for a non motorized treadmill, where the running surface is made up of a plurality of molded treads 602 (i.e. slats), connected on each end of the tread (i.e. slat) with a flexible continuous belt, that is supported along the top (running) surface of the treadmill by a plurality of fixed bearings 603 that contact the continuous belt 601 and thus support the weight of the runner.

Therefore this embodiment for a tread belt system 600 provides the running surface for a non motorized treadmill, where the running surface is made up of a plurality of molded treads 602 (i.e. slats), connected on each end of the tread (i.e. slat) with a flexible continuous belt, that is supported along the top (running) surface of the treadmill by a plurality of fixed bearings 603, each with bearing roller appendage 604, that contact the continuous belt 601 and thus support the weight of the runner.

At each end of the treadmill, a set of pulleys support the continuous belt 601 and provide a continuous path. With this system, the lower half 601*a* of the belt 601 hangs underneath the frame in a uniform catenary manner. In this alternate embodiment, the lower half 601*b* of the belt tread (i.e. slat) system, forms a drooping catenary curve, suspended below the frame of the treadmill. While as few as one pair can be used, preferably some of the treads 602*b* (an equal number such that some uniform number are evenly distributed) are equipped with a bearing roller appendage 604 on each end of the tread (i.e. slat) that will serve to support the upper portion 601*a* of belt 601 as it moves in the curved upper configuration. A supporting rail with a bearing support flange 605 is provided on each side of the frame 606 of the device to provide a running surface for the tread bearing rollers, such that the tread belt system is supported and prevented from hanging in a catenary fashion between the treadmills end pulleys. The flanged surface 605 at each end of the supporting rail is provided with a runout surface such that the recirculating treads 602 and 602*b* (i.e. slats) make a smooth transition going around the end pulleys.

FIG. 29A shows a close-up detail view of the tread belt system of FIG. 29.

FIG. 29B shows a perspective view in partial cutaway crossection of the tread belt system of FIG. 29.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. An exercise treadmill comprising:
   a treadmill frame
   supporting a continuous treadmill running surface belt moving over a set of pulleys communicating with the continuous treadmill running surface belt and forming a continuous treadmill running surface, the
   continuous treadmill running surface belt being a closed loop array of a plurality of transverse parallel slats,
   wherein each of the transverse parallel slats comprises parallel upper and lower flanges, with respective upper and lower flange surfaces and a single web fin extending substantially vertically between, and in a substantially perpendicular relation, to the lower surface of the parallel upper flange and the upper surface of the parallel lower flange,
   wherein the upper flange surface of the parallel upper flange is part of the continuous treadmill running surface, and
   wherein the single web fin and the parallel upper and lower flanges form an I-beam shape in cross-section that resists undesirable bending forces imposed upon the continuous treadmill running surface during operational use of the treadmill.

2. The exercise treadmill as in claim 1, wherein the lower surface of the parallel lower flange is a bulging arcuate surface extending substantially an entire length of parallel lower flange.

3. The exercise treadmill as in claim 2 wherein the entire length of the parallel lower flange is formed in three (3) sections: a first end section, a second end section opposite the first end section and a middle section separating the first and second end sections, wherein the first and second end sections have respective widths larger than a width of the middle section.

4. The exercise treadmill as in claim 1, wherein a width of the parallel upper flange is greater than a width of the parallel lower flange.

5. The exercise treadmill as per claim 1, wherein the upper surface of the parallel upper flange has a horizontal length that extends continuously over substantially an entire length of each of the parallel transverse slats between the opposing peripheral sides of the treadmill frame.

6. The exercise treadmill as in claim 1, wherein the continuous treadmill running surface belt moving over the set of pulleys is powered by the legs of a treadmill user.

7. The exercise treadmill as in claim 1, wherein the continuous treadmill running surface belt moving over the set of pulleys is powered by a motor.

8. A treadmill slat formed for use as part of a continuous treadmill running surface, the treadmill slat comprising:
   an upper flange with an upper surface and a lower surface, the upper surface formed for use as part of the continuous treadmill running surface;
   a lower flange with an upper surface and a lower surface, wherein the upper and lower surfaces of the upper and lower flanges are substantially in parallel; and
   a single web fin with opposing first and second ends;
   wherein the single web fin extends substantially vertically from the fin's opposing first end, in a substantially perpendicular attached relation with the lower surface of the upper flange, to the upper surface of the lower flange in a substantially perpendicular attached relation with the fin's opposing second end; and
   wherein the single web fin and the upper and lower flanges form the treadmill slat with a cross-section substantially in a shape of an I-beam.

9. The treadmill slat as in claim 8, wherein the lower flange has a bulge extending substantially perpendicularly from a central axis of the lower flange.

10. The treadmill slat as in claim 9, wherein a length of the lower flange comprises three (3) sections: a first end section, a second end section arranged opposite the first end section and a middle section extending between the first end section and the second end section, wherein a width of the middle section is narrower that a width of the first and second end sections.

11. The treadmill slat as in claim 8, wherein a width of the upper flange is greater than a width of the lower flange.

12. The treadmill slat as in claim 8, wherein the single web fin has a horizontal extents that extends substantially continuously and in parallel with substantially an entire length of the upper surface of the upper flange of each of the treadmill slats.

13. The treadmill slat as in claim 8, wherein the upper and lower flanges of the I-beam shaped slats resist bending and shear forces that can be exerted against the slats during intended use.

* * * * *